(12) United States Patent
Vantrease et al.

(10) Patent No.: US 11,123,915 B2
(45) Date of Patent: Sep. 21, 2021

(54) THERMOFORMING PLATEN HAVING DISCRETE LOAD PATHS AND METHOD

(71) Applicant: Irwin Research and Development, Inc., Yakima, WA (US)

(72) Inventors: Dale L. Vantrease, Naches, WA (US); Jere F. Irwin, Yakima, WA (US)

(73) Assignee: Irwin Research and Development, Inc., Yakima, WA (US)

( * ) Notice: Subject to any disclaimer, the term of this patent is extended or adjusted under 35 U.S.C. 154(b) by 174 days.

(21) Appl. No.: 16/107,897

(22) Filed: Aug. 21, 2018

(65) Prior Publication Data

US 2019/0329478 A1     Oct. 31, 2019

Related U.S. Application Data

(60) Provisional application No. 62/667,336, filed on May 4, 2018, provisional application No. 62/662,613, filed on Apr. 25, 2018.

(51) Int. Cl.
| | |
|---|---|
| *B29C 51/20* | (2006.01) |
| *B29C 51/38* | (2006.01) |
| *B29C 51/08* | (2006.01) |

(52) U.S. Cl.
CPC ............ *B29C 51/082* (2013.01); *B29C 51/20* (2013.01); *B29C 51/38* (2013.01); *B29C 2791/002* (2013.01)

(58) Field of Classification Search
CPC ....... B29C 51/082; B29C 51/38; B29C 51/20; B29C 2791/002; B30B 1/14
See application file for complete search history.

(56) References Cited

U.S. PATENT DOCUMENTS

| | | | |
|---|---|---|---|
| 3,677,675 A | 7/1972 | Brown | |
| 4,878,826 A | 11/1989 | Wendt | |
| 5,002,479 A | 3/1991 | Brown | |
| 5,385,465 A | 1/1995 | Greiwe et al. | |
| 6,055,904 A | 5/2000 | Chun et al. | |
| 8,356,990 B2 | 1/2013 | Keeley | |
| 8,790,108 B2 | 7/2014 | Lakatos | |
| 2003/0090041 A1 | 5/2003 | Nemeskeri | |
| 2004/0250709 A1 | 2/2004 | Schlepp | |
| 2010/0278957 A1* | 11/2010 | Keeley | B29C 51/38 425/451.6 |
| 2013/0049242 A1 | 2/2013 | Vantrease | |

(Continued)

FOREIGN PATENT DOCUMENTS

| | | |
|---|---|---|
| DE | 2900901 | 8/1980 |
| WO | WO | 8/2019 |
| | PCT/US2019/028181 | |

*Primary Examiner* — Nahida Sultana
(74) *Attorney, Agent, or Firm* — Keith D. Grzelak; Wells St. John P.S.

(57) ABSTRACT

A thermoforming platen is provided having a tooling support plate and a plurality of discrete load paths. The tooling support plate has a top tooling surface, a bottom surface, and an outer periphery. The plurality of discrete load paths interconnect the bottom surface with one or more external load sources operative to distribute and centralize load deformation of the top plate from forming loads. The load paths are provided laterally inboard of the top tooling surface at one of a plurality of inboard locations to impart minimized tooling surface deformation along the top plate tooling surface. A method is also provided.

21 Claims, 50 Drawing Sheets

(56) References Cited

U.S. PATENT DOCUMENTS

| | | | |
|---|---|---|---|
| 2013/0119584 A1* | 5/2013 | Vantrease | B29C 51/38 264/322 |
| 2013/0152660 A1* | 6/2013 | Frey | B21D 37/16 72/379.2 |
| 2013/0174970 A1* | 7/2013 | Mizoguchi | B29C 51/428 156/196 |
| 2017/0080629 A1* | 3/2017 | Vantrease | B29C 51/38 |
| 2018/0229438 A1* | 8/2018 | Hoelzel | B29B 13/08 |
| 2019/0322029 A1* | 10/2019 | Vantrease | B30B 1/14 |

* cited by examiner

THERMOFORMING PLATEN HAVING DISCRETE LOAD PATHS AND METHOD

RELATED PATENT DATA

This patent claims priority to U.S. Provisional Patent Application Ser. No. 62/667,336, entitled, "Thermoforming Platen Having Discrete Load Paths and Method", which was filed May 4, 2018, and which is hereby incorporated herein by reference; and also claims priority to U.S. Provisional Patent Application Ser. No. 62/662,613, entitled, "Thermoforming Platen Having Discrete Load Paths and Method", which was filed Apr. 25, 2018, and which is hereby incorporated herein by reference.

TECHNICAL FIELD

The disclosure pertains generally to thermoforming apparatus. More particularly, this disclosure relates to thermoforming machines having a large forming loads configured with adjustable or relocatable load paths that enable maximization of flatness for contract surfaces of die plates affixed to respective platens.

BACKGROUND OF THE DISCLOSURE

The use of large tonnage thermoforming frames and drive mechanisms is known where pneumatic pressure is being applied to a heated sheet of thermoformable material during an article forming operation. Where large arrays of articles are provided on die plates on a platen, the surface area subject to pneumatic pressure and/or vacuum generates very large loads on the kinematic drive linkages and frame of a thermoforming machine. Improvements are needed in order to enable forming using very large loads without requiring further increases in the size and strength of traditional frames and linkages of a thermoforming machine while mitigating forming problems resulting from elastic deformation of thermoforming machine components, particularly when forming newer plastic sheet materials and/or article geometries that require greater forming pressures and loads. Furthermore, there is a need to impart precision control on rim formation of thermoformed articles during a forming operation.

One problem caused by large forming loads, such as pneumatic and vacuum forming loads between die plates is tooling surface deformation that causes the contact surfaces of adjacent die plates to deform or flex in waves, caused by the discrete loads paths used to hold the dies in position during forming. Secondly, when different sized and shaped die plates are added to a platen, these loads paths are in different locations relative to the overall surface area being loaded during a forming operation. This results in different deformation modes and shapes being imparted to the new die plates. There exists a need to adjust the load path positions as die plates are changed out between different sets of die plates in order to maximize flatness of the contact surfaces between co-acting die plates during forming operations.

Other aspects and implementations are contemplated.

SUMMARY OF THE INVENTION

A thermoforming machine is provided having one or more inboard load path connections. In one case, the load path locations can be adjustable. The thermoforming machine also has a compound load path with a top plate, a bottom plate, and laterally repositionable load paths extending between the top plate and the bottom plate to provide load path locations that minimize deformation of a top plate tooling surface during application of forming loads through the platen. Degrees of freedom are provided by each load path with the top plate and the bottom plate.

According to one aspect, a thermoforming platen is provided having a tooling support plate and a plurality of discrete load paths. The tooling support plate has a top tooling surface, a bottom surface, and an outer periphery. The plurality of discrete load paths interconnect the bottom surface with one or more external load sources operative to distribute and centralize load deformation of the top plate from forming loads. The load paths are provided laterally inboard of the top tooling surface at one of a plurality of inboard locations to impart minimized tooling surface deformation along the top plate tooling surface.

According to another aspect, a thermoforming platen is provided having a plate and a plurality of load path attachment points. The plate has a top tooling surface, a bottom surface, and an outer periphery. The plurality of load path attachment points is provided about the bottom surface repositionable between one of a plurality of locations. The plurality of discrete load paths are each configured to affix to one of the attachment points.

According to yet another aspect, a method is provided for transferring load through a thermoforming platen. The method includes: providing a plate having a top tooling surface, a bottom surface, an outer periphery, and a plurality of load path attachment points provided about the bottom surface repositionable between one of a plurality of locations; and adjusting each load path attachment point in one of an inboard and an outboard lateral direction to change load distribution to the plate for a specific die plate that is to be mounted to the top plate tooling surface.

BRIEF DESCRIPTION OF THE DRAWINGS

Exemplary embodiments of the various disclosures are described below with reference to the following accompanying drawings. The drawings may be considered to represent scale.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

Figure 1:
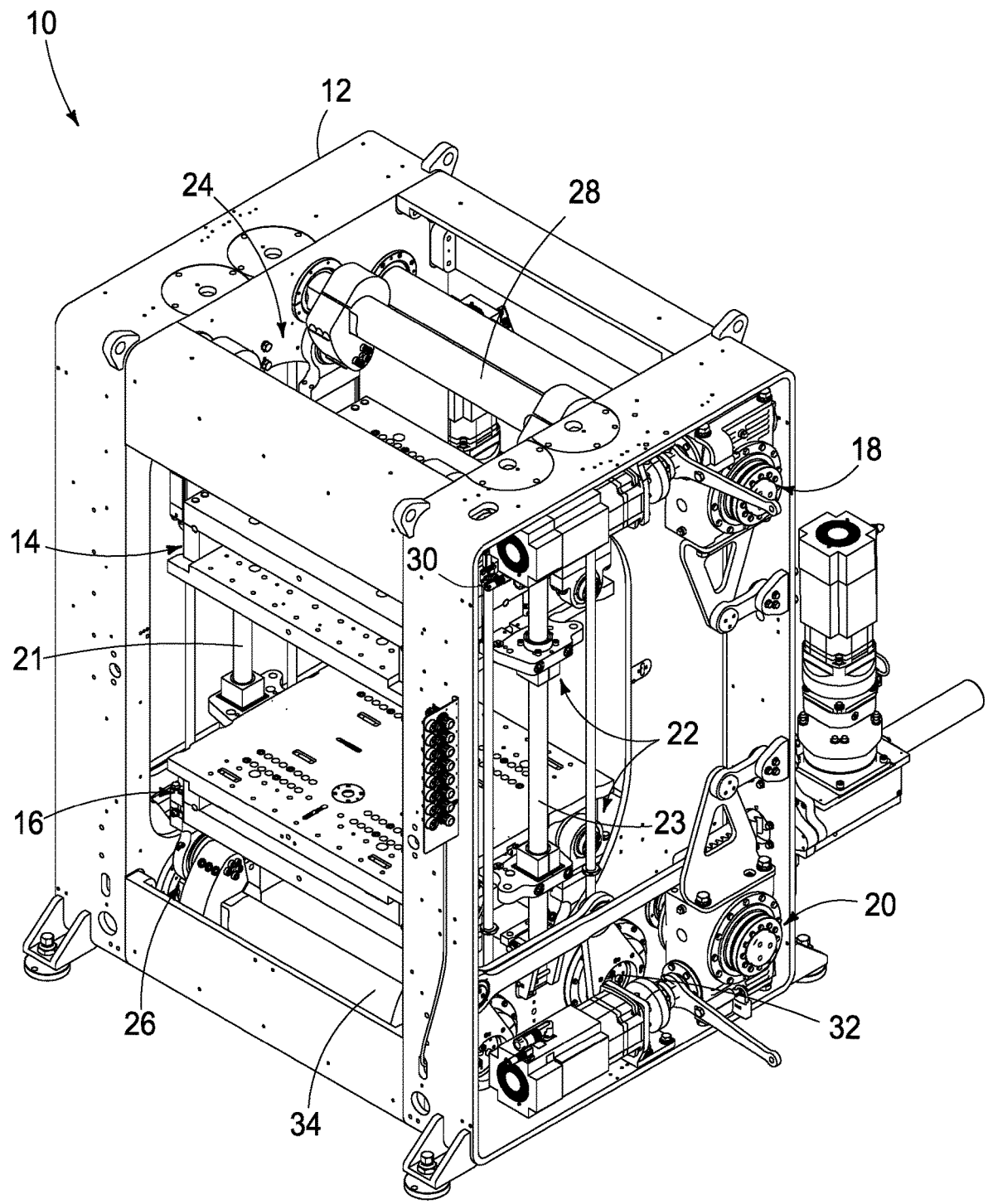
FIG. 1 is a right upstream end perspective view from above of a thermoforming machine having a differential load source with a Servo Actuated Shut Height (SASH) and platens having tooling support plates with discrete load paths.

FIG. 1 illustrates one suitable construction for a thermoforming machine 10 having an upper platen 14 and a lower platen 16. Although not shown, it is understood that conveyor rails pass completely through thermoforming machine 10 for conveying a heated sheet of thermoformable material there through during a forming operation from an upstream end on the left to a downstream end on the right. Thermoforming machine 10 has a differential load source, or servo actuated shut height (SASH) mechanism (not shown) that imparts an upward differential load to raise lower platen 16 when platens 14 and 16 are closed together during a forming operation. An upper platen drive assembly 18 cyclically drives upper platen 14 down and up while a lower platen drive assembly 20 drives lower platen 16 up and down in synchronization within a rigid steel frame 12. Upper platen drive assembly 18 has a servo motor that is configured to drive an upper gear box that drives a cross shaft to reciprocate toggle shafts 28 and 30, upper platen drive assembly 24 via reciprocation of platen drive toggle shafts 28 and 30 to raise and lower upper platen 14. Upper platen drive assembly 24 includes a crank arm, a drive arm or link, a connecting link or follower arm, and crank arms, and four connecting rods 44 driven up and down via reciprocating (rotating to and fro) toggle shafts 28 and 30.

Likewise, a lower platen drive assembly 26 is configured with a servo motor to drive a lower gear box that drives a cross shaft to reciprocate lower platen drive assembly 26 which reciprocates platen drive toggle shafts 32 and 34 (see FIG. 4) to raise and lower platen 16. Lower platen drive assembly 26 includes a shaft crank arm, a drive arm or link, a connecting link or follower arm, and crank arms, and four connecting rods driven up and down via reciprocating (rotating to and fro) toggle shafts 32 and 34 (see FIG. 4).

A pair of vertical die posts 21 and 23 guide platens 14 and 16 for vertical reciprocation via respective guide bushings provided on each side of platens 14 and 16. Guide posts 21 and 23 are removed from views below in order to facilitate viewing of other components of machine 10.

Figure 2:
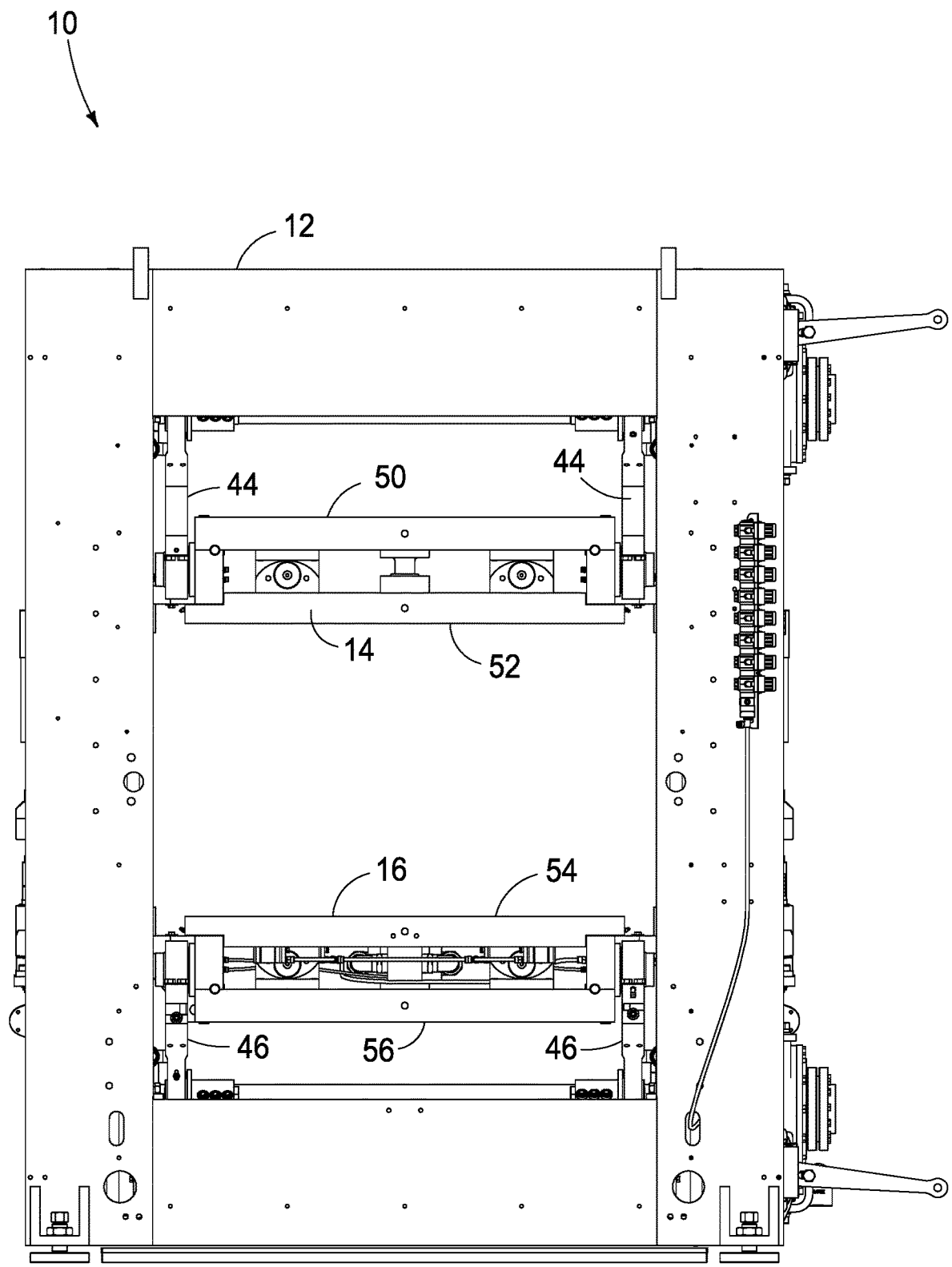
FIG. 2 is an upstream end elevational view of thermoforming machine of FIG. 1.
Figure 3:
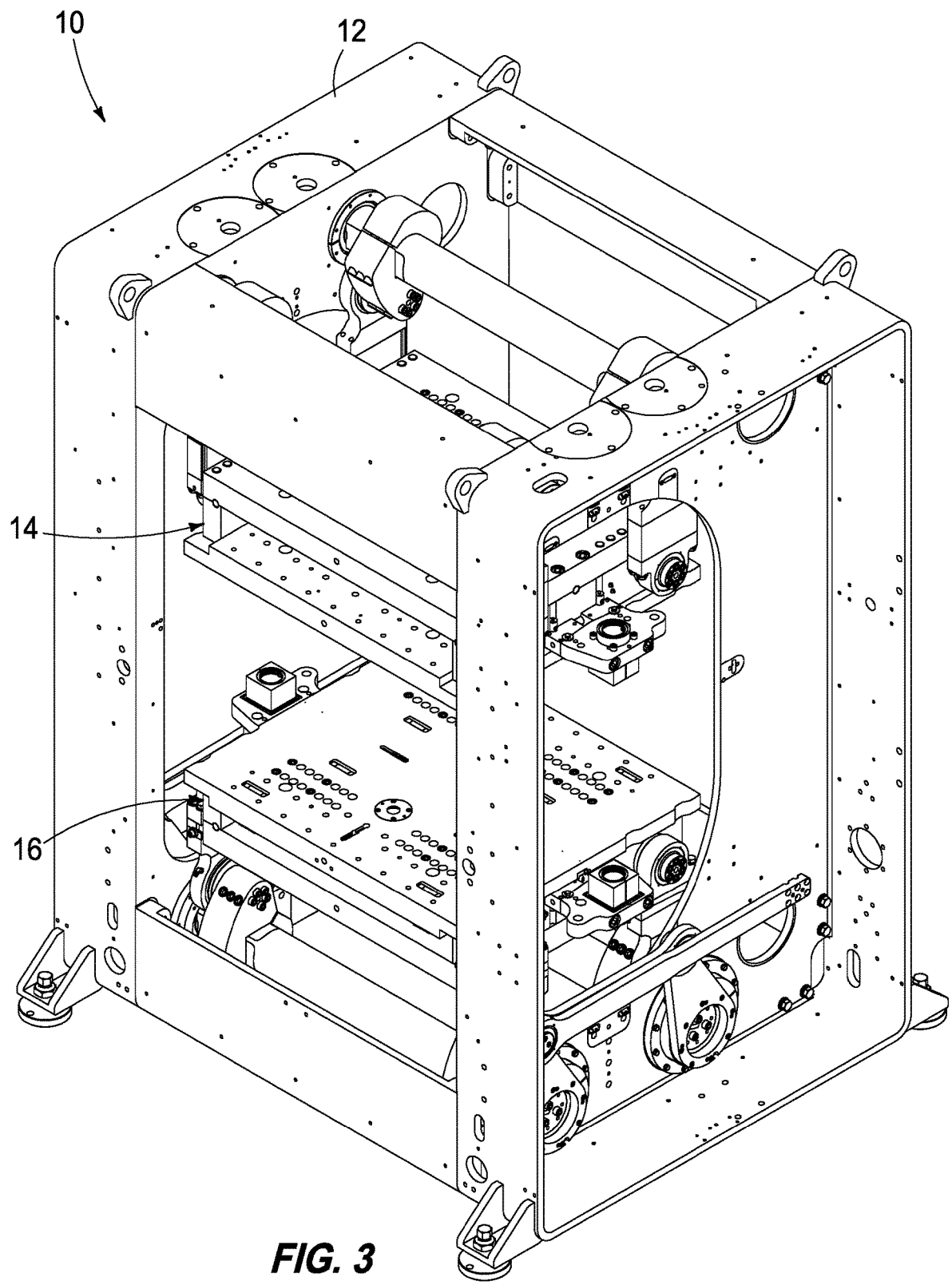
FIG. 3 is a right upstream end perspective view from above of the thermoforming machine of FIG. 1 but with platen drive and SASH drive components removed and with platens in a shut, or closed position.

FIG. 2 illustrates thermoforming machine 10 with top platen 14 and bottom platen 16 shown in a closed position carried for reciprocating motion by frame 12. Upper platen 14 includes a tooling support plate 52 configured to support a die plate (not shown) with a plurality of female dies. Likewise, lower platen 16 includes a tooling support plate 54 configured to support a die plate (not shown) with a plurality of complementary male dies, as is understood by one of ordinary skill in the art. The toggle shafts 28, 30 and 32, 34 (see FIG. 4) oscillate to and fro to drive pivot drive links 44 and 46 and move platens 14 and toward and away from each other. As shown in FIG. 2, platen 14 is formed as a compound structure having a leading tooling support plate 52 and a trailing, or back plate 50. Likewise, platen 16 is formed as a compound structure having a leading tooling support plate 54 and a trailing or back plate 56. Plates 52 and 50 of platen 13 and plates 54 and 56 of platen 16 are coupled together with a plurality of discrete load paths interconnecting the tooling plate back surface with the back plate front surface operative to distribute and centralize load deformation of the tooling plate from tooling loads, the load paths provided laterally inboard of the tooling plate front tooling surface to impart discretized and/or localized deformation along the tooling plate front tooling surface. FIG. 3 shows platens 14 and 16 closed in frame 12 of thermoforming apparatus 10.

Figure 4:
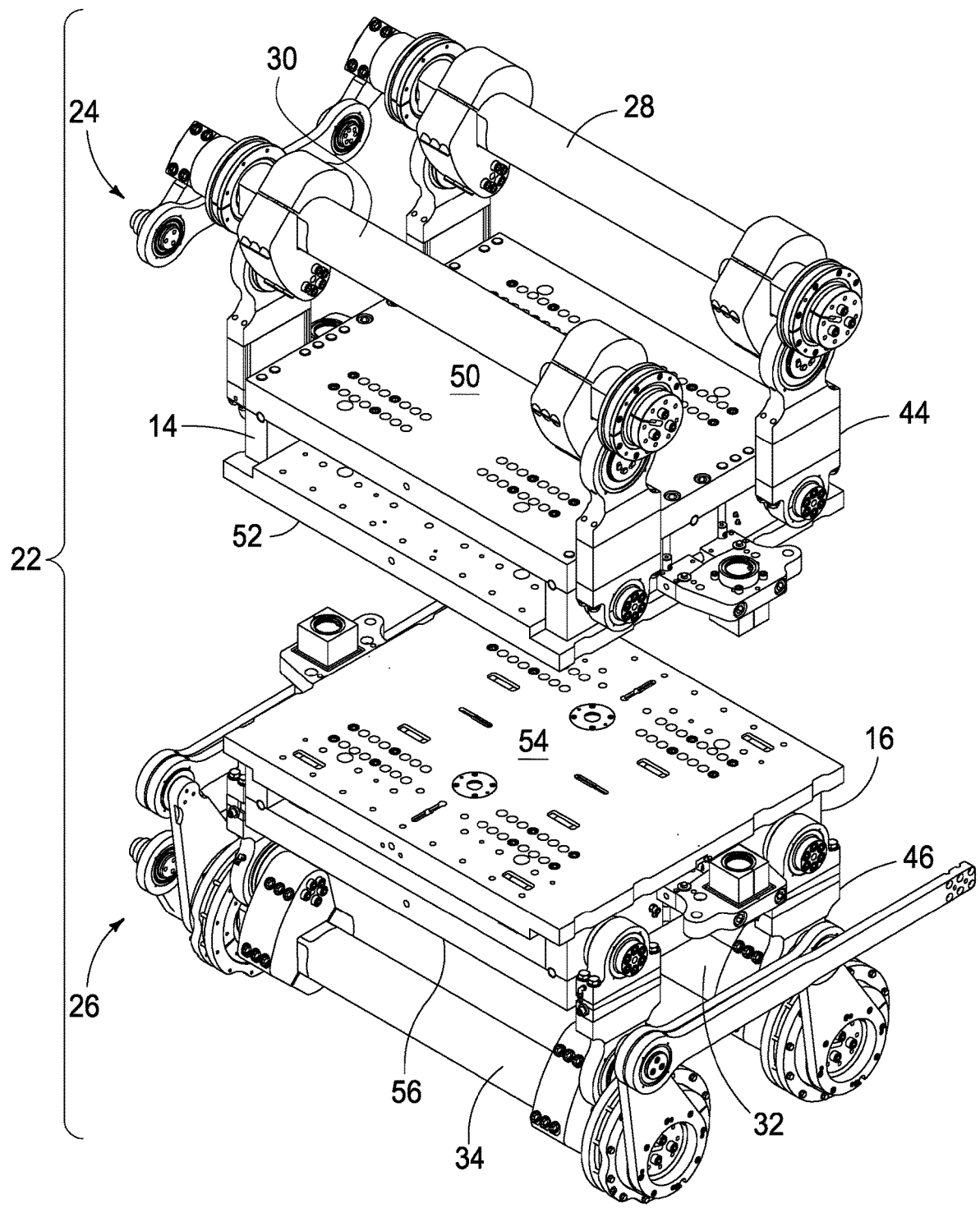
FIG. 4 is an enlarged upstream component perspective view of the platens and platen drive assemblies of FIG. 1.

As shown in FIG. 4, toggle shafts 28, 30, 32 and 34 are supported at each end with a rotary bearing assembly by the frame (not shown). Likewise, each end of drive arms 44 and 46 is affixed to a radial arm, or toggle on a respective toggle shaft 28, 30, 32 and 34 and one of platens 14 and 16 with a rotary bearing assembly. Furthermore, each end of drive arms 44 and 46 connect to a respective mounting location on platens 14 and 16 via a respective rotary bearing (not shown). Upper platen drive assembly 24 and lower platen drive assembly 26 each cooperate to form a kinematic linkage and platen assembly 22 for driving platens 14 and 16 between open and closed positions when carrying forming dies (not shown). Leading tooling support plates 52 and 54 and black plates 50 and 56 form platens 14 and 16, respectively.

Figure 5:
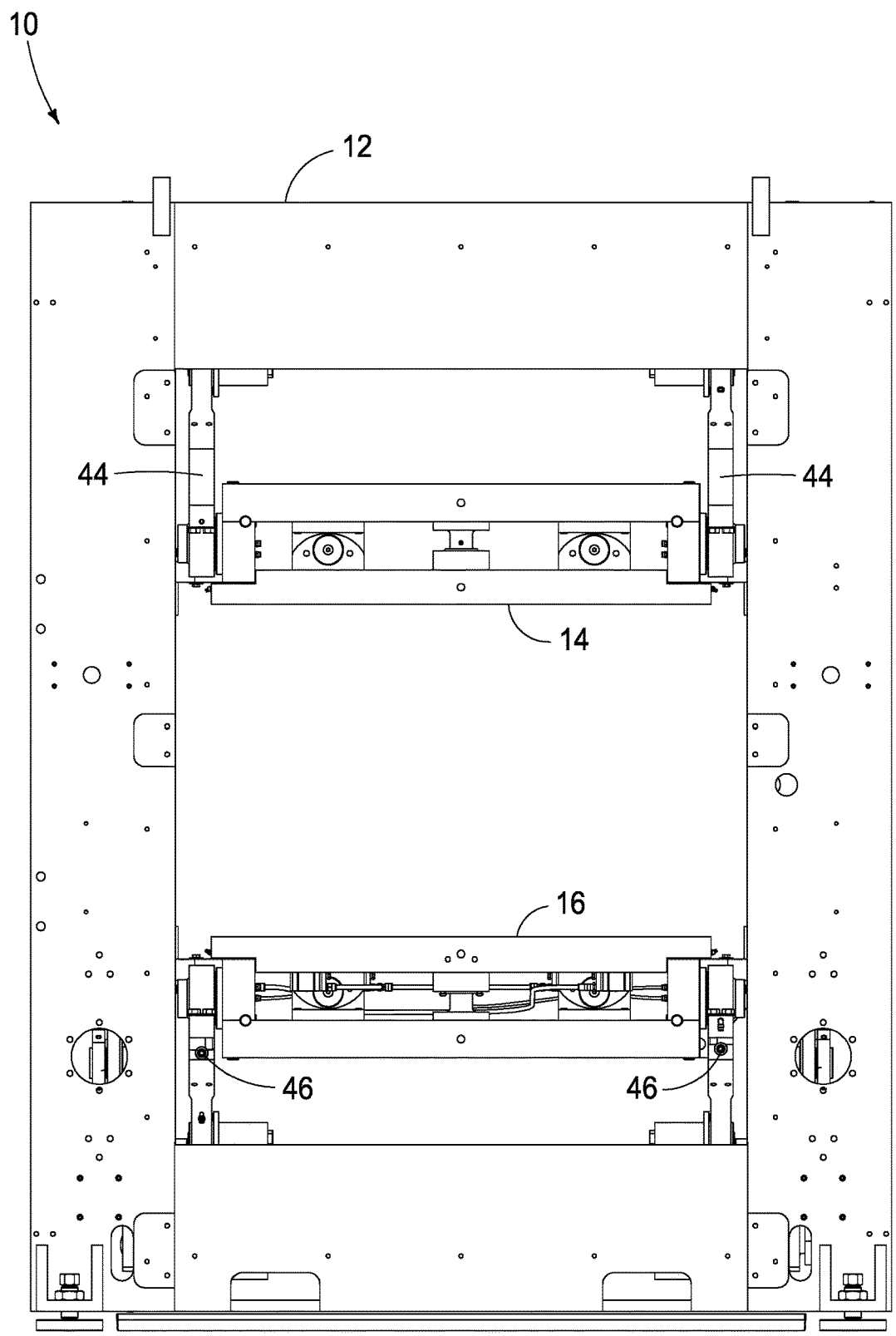
FIG. 5 is an upstream end view of the thermoforming machine of FIG. 1.

FIG. 5 is an upstream end view of the thermoforming machine of FIG. 1. More particularly, thermoforming machine 10 illustrates in upstream end view showing the pairs of drive arms 44 supporting upper platen 14 on each side and configured for reciprocation down and up relative to frame 12. Likewise, pairs of drive arms 46 support lower platen 16 on each side and configured for reciprocation up and down relative to frame 12 so as to close and open relative to platen 14.

Figure 6:
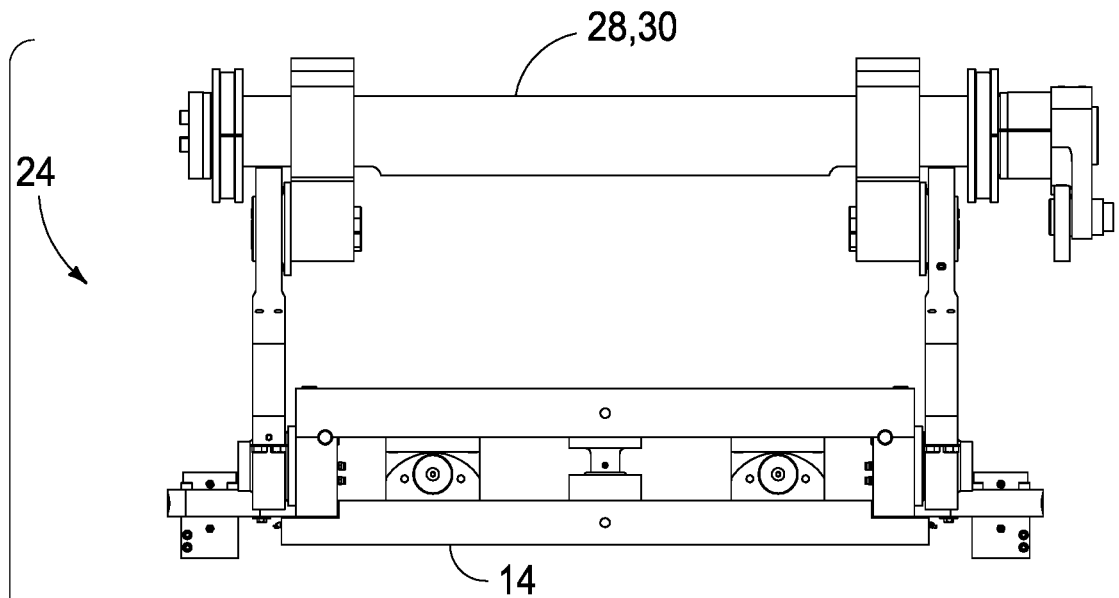
FIG. 6 is a downstream end view of the top platen and platen drive assembly of FIG. 4.

FIG. 6 is a downstream end view of the top platen 14 and platen drive assembly 24 forming one half of kinematic linkage and platen assembly 22 (also see FIG. 4). Upper, or top platen 14 is driven down and up by oscillation of toggle shafts 28 and 30.

Figure 7:
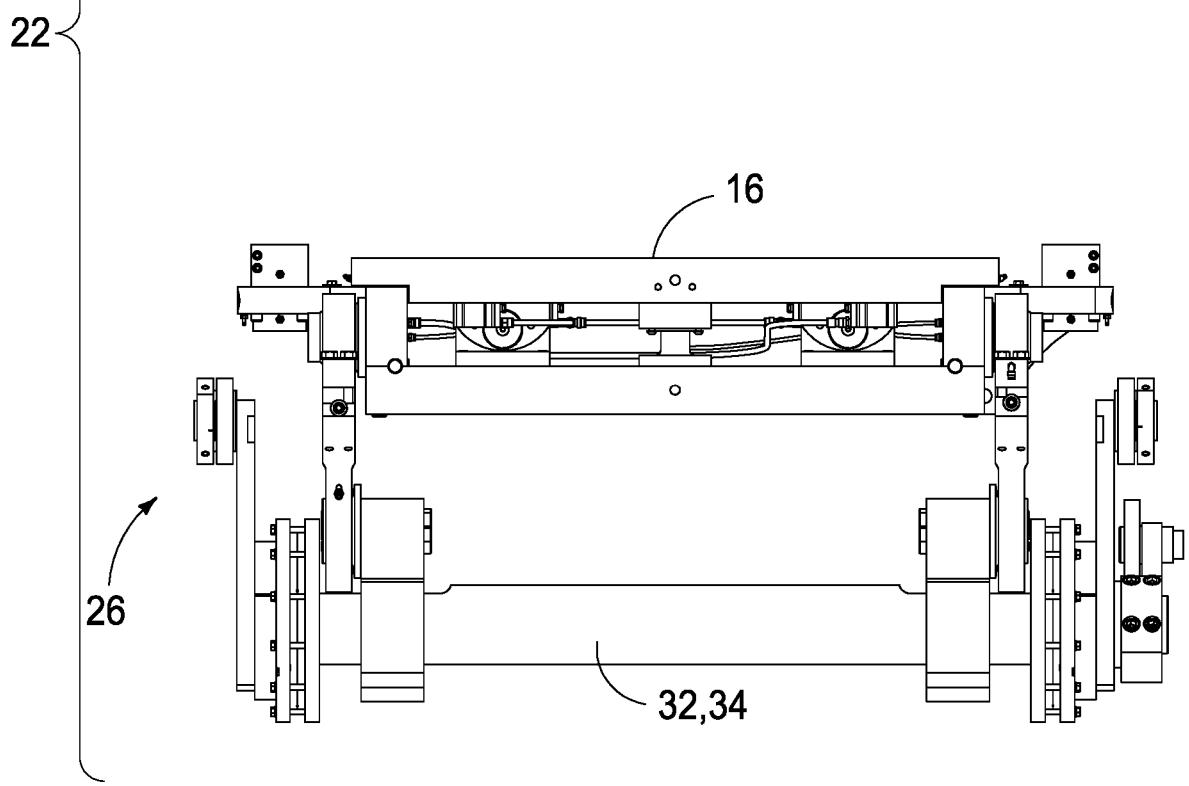
FIG. 7 is a downstream end view of the bottom platen and platen drive assembly of FIG. 4.

FIG. 7 is a downstream end view of the bottom platen 16 and platen drive assembly 26 forming one half of kinematic linkage and platen assembly 22 (also see FIG. 4). Lower, or bottom platen 16 is driven down and up by oscillation of toggle shafts 32 and 34.

Figure 8:
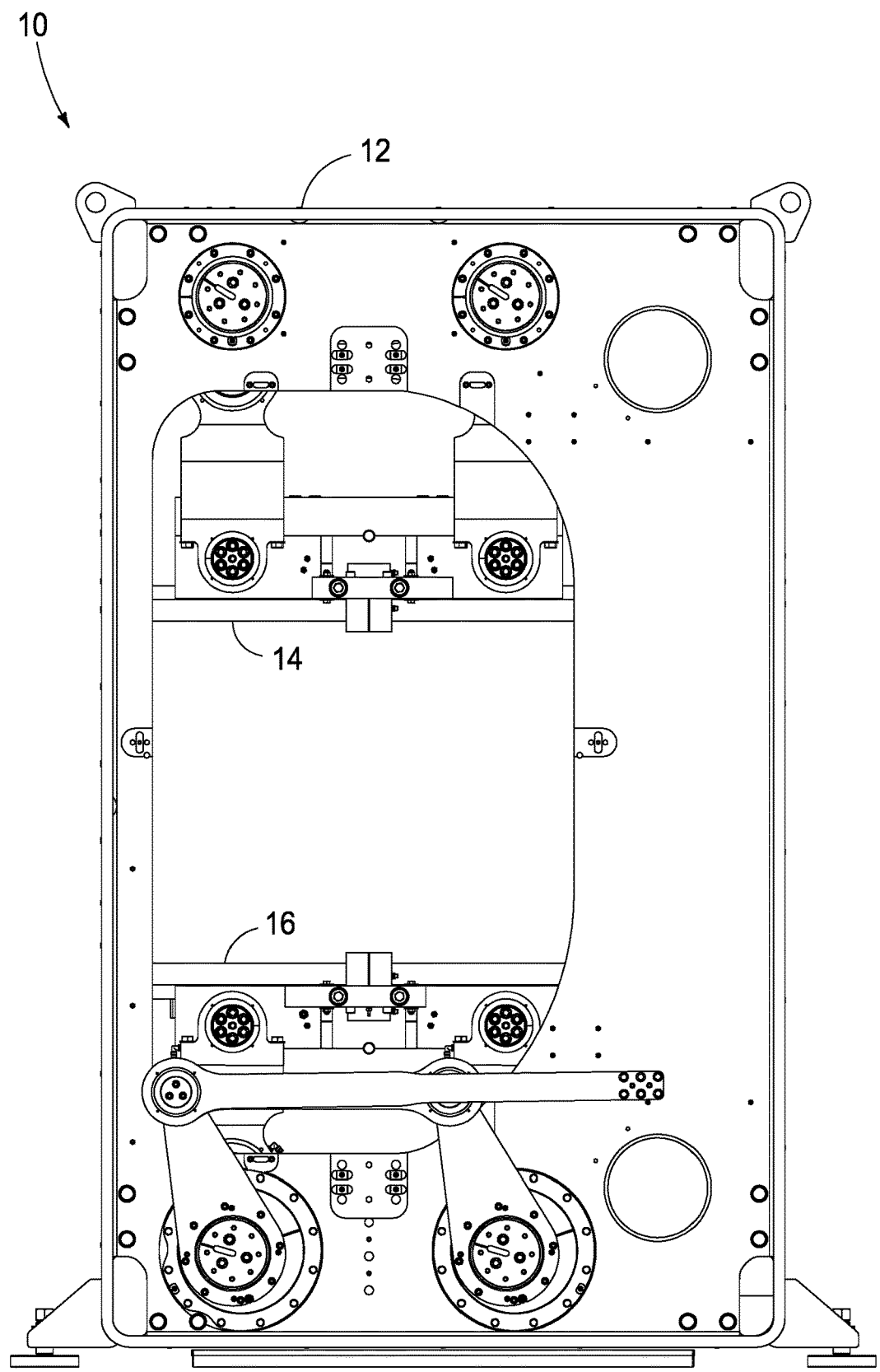
FIG. 8 is a right-side view of the thermoforming machine of FIGS. 2 and 3.

FIG. 8 is a right-side view of the thermoforming machine 10 of FIGS. 2 and 3 further showing closed positions of platens 14 and 16 relative to frame 12 and each other.

Figure 9:
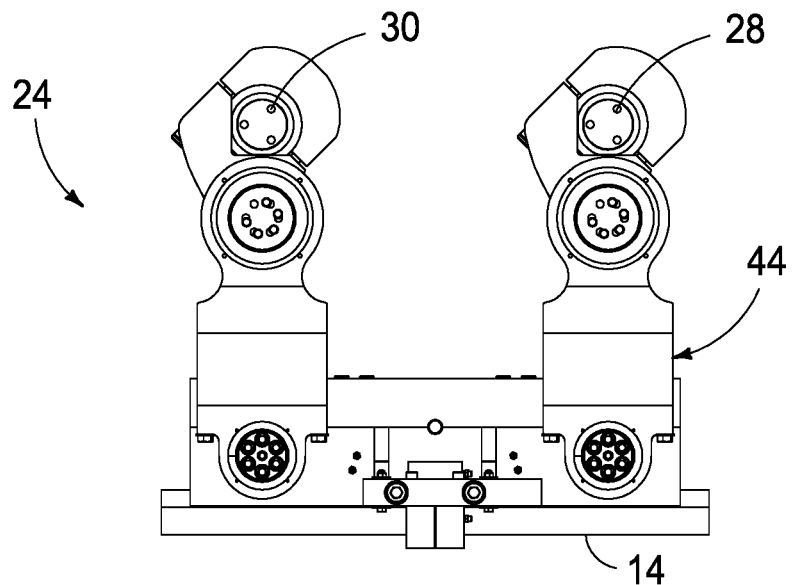
FIG. 9 is a right-side view of the top platen and platen drive assembly of FIG. 8.

FIG. 9 is a right-side view of the top platen 14 and platen drive assembly 24 of FIG. 8. Toggle shafts 28 and 30 are shown rotated in a lowered, or closed position which drops both pairs of drive arms 44 and platen 14 to a lowered, or closed position (with a die plate omitted for viewing).

Figure 10:
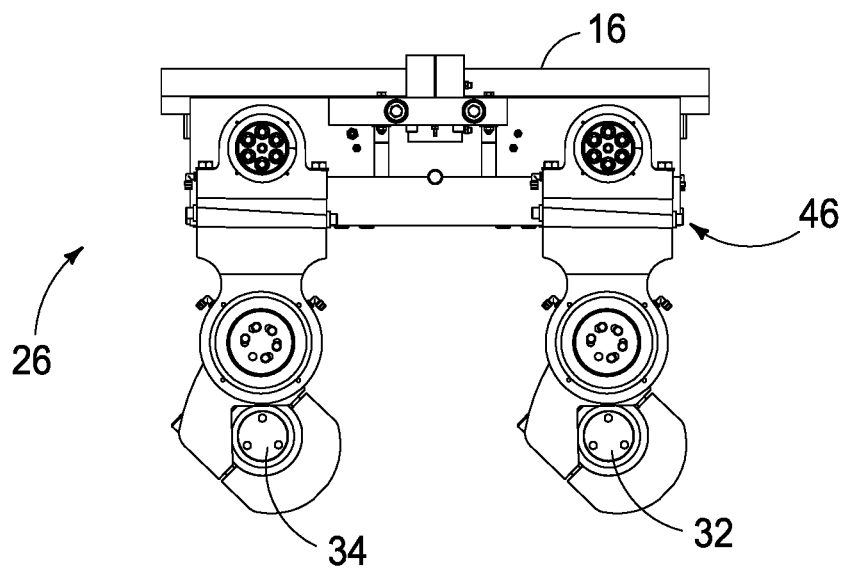
FIG. 10 is a right-side view of the bottom platen and platen drive assembly of FIG. 8.

FIG. 10 is a right-side view of the bottom platen 16 and platen drive assembly 26 of FIG. 8. Toggle shafts 32 and 34 are shown rotated in a raised, or closed position which drops both pairs of drive arms 46 and platen 10 to a raised, or closed position (with a die plate omitted for viewing).

Figure 11:
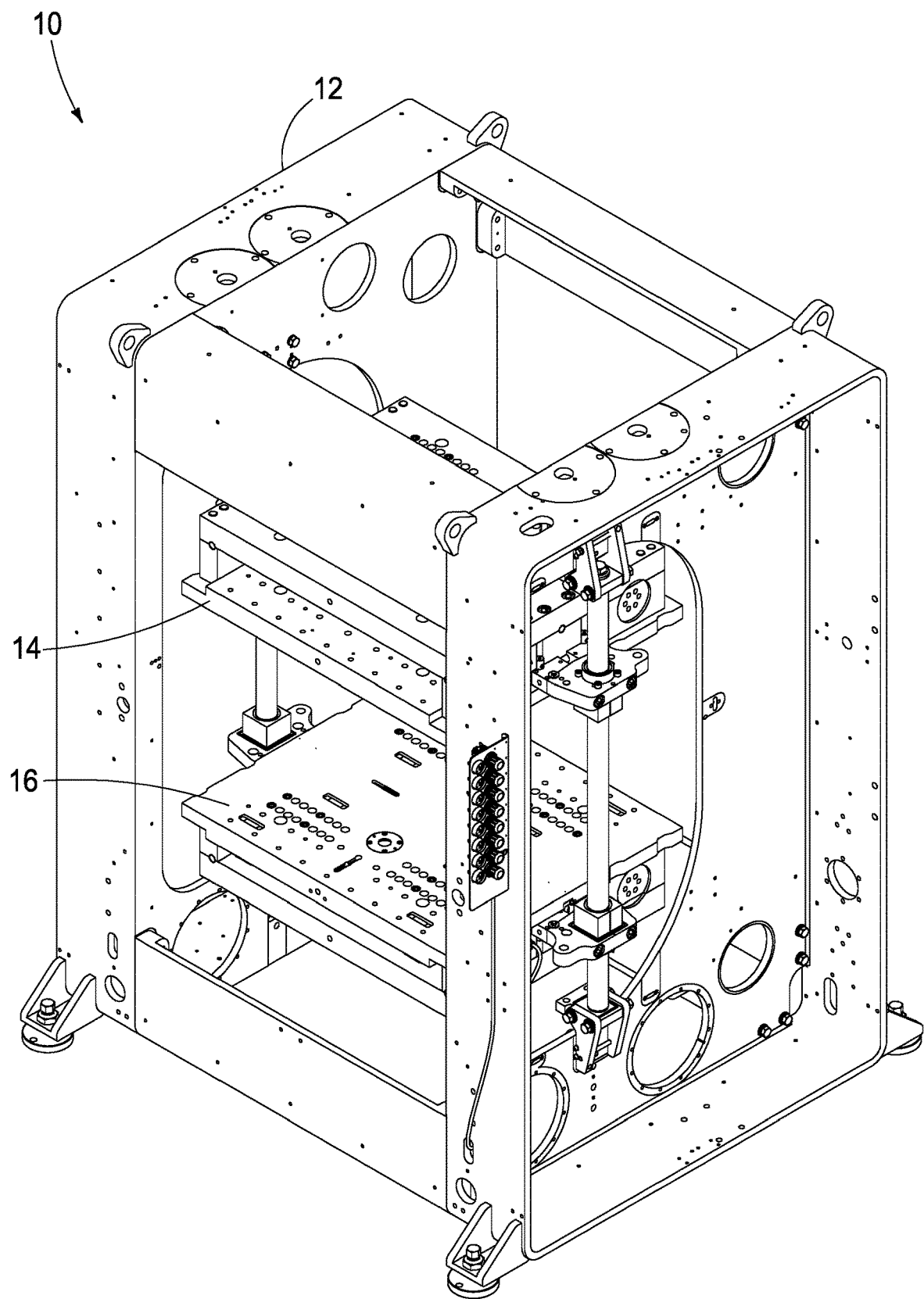
FIG. 11 is an upstream right-side perspective view of the thermoforming machine of FIG. 3 showing addition of the platens and drive assemblies of FIG. 4 with a pair of die posts.

FIG. 11 is an upstream right-side perspective view of the thermoforming machine 10 of FIG. 3 showing addition of platens 14 and 16 and drive assemblies in a closed position with a pair of die posts on each side configured to guide platens 14 and 16 for linear reciprocation relative to frame 12 and each other.

Figure 12:
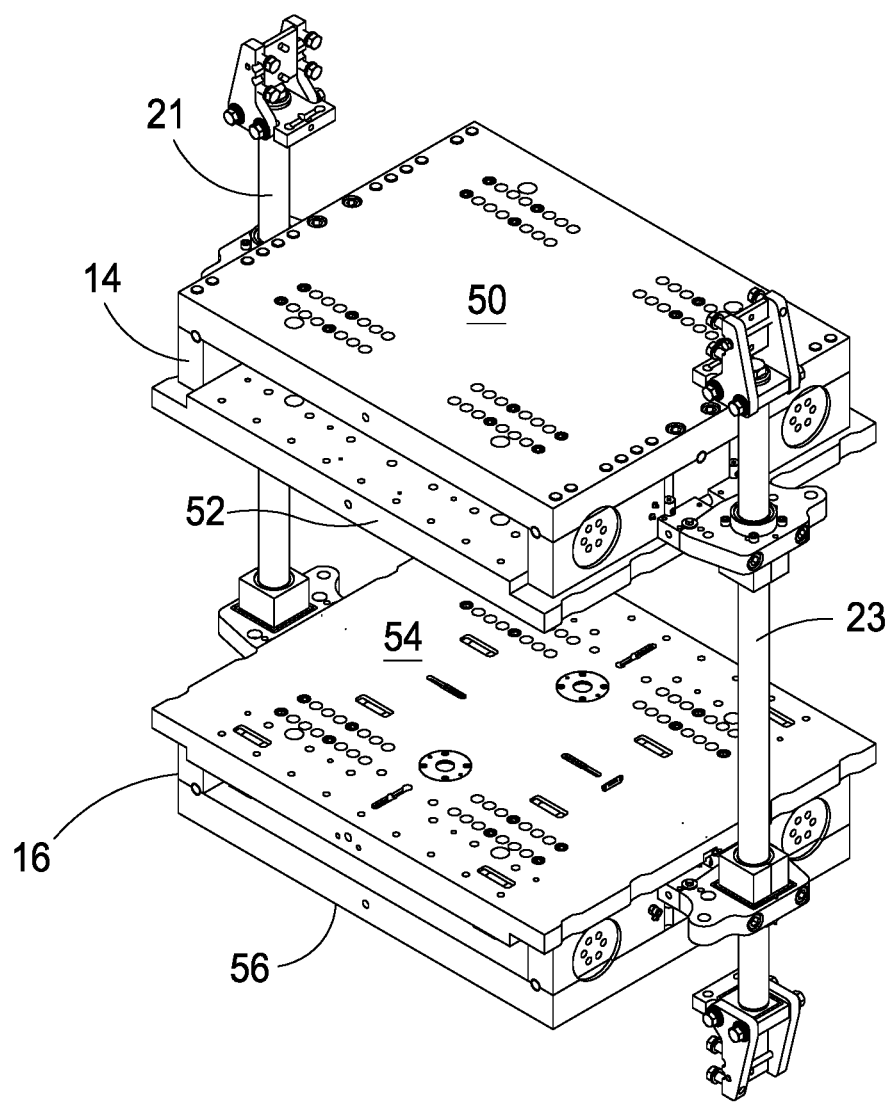
FIG. 12 is an upstream right-side perspective view of the platens and dies posts of FIG. 11.

FIG. 12 is an upstream right-side perspective view of a sub-assembly comprising the platens 14 and 16 and die posts 21 and 23 of FIG. 11. Each platen 14 and 16 includes a tooling support plate 52 and 54, respectively, configured to receive a die plate that is bolted onto the proximate surface of each plate 52 and 54 relative to one another. A back plate 50 and 56 on each platen 14 and 16, respectively, forms an opposed structural plate that transfers loads with plates 52 and 54 through a plurality of discrete load paths 72 (see FIG. 32) that interconnect the back plate 50 and 56 proximate surface with the tooling support plate 52 and 54 proximate surface operative to distribute and centralize load deformation of the tooling support plate from tooling loads, the load paths provided laterally inboard of the tooling plate 52 and 54 tooling surface to impart discretized/localized deformation along the tooling plate 52 and 54 tooling surface that reduces or eliminates platen and die plate (not shown) surface deformation resulting from load path transfer through the platens.

Figure 13:
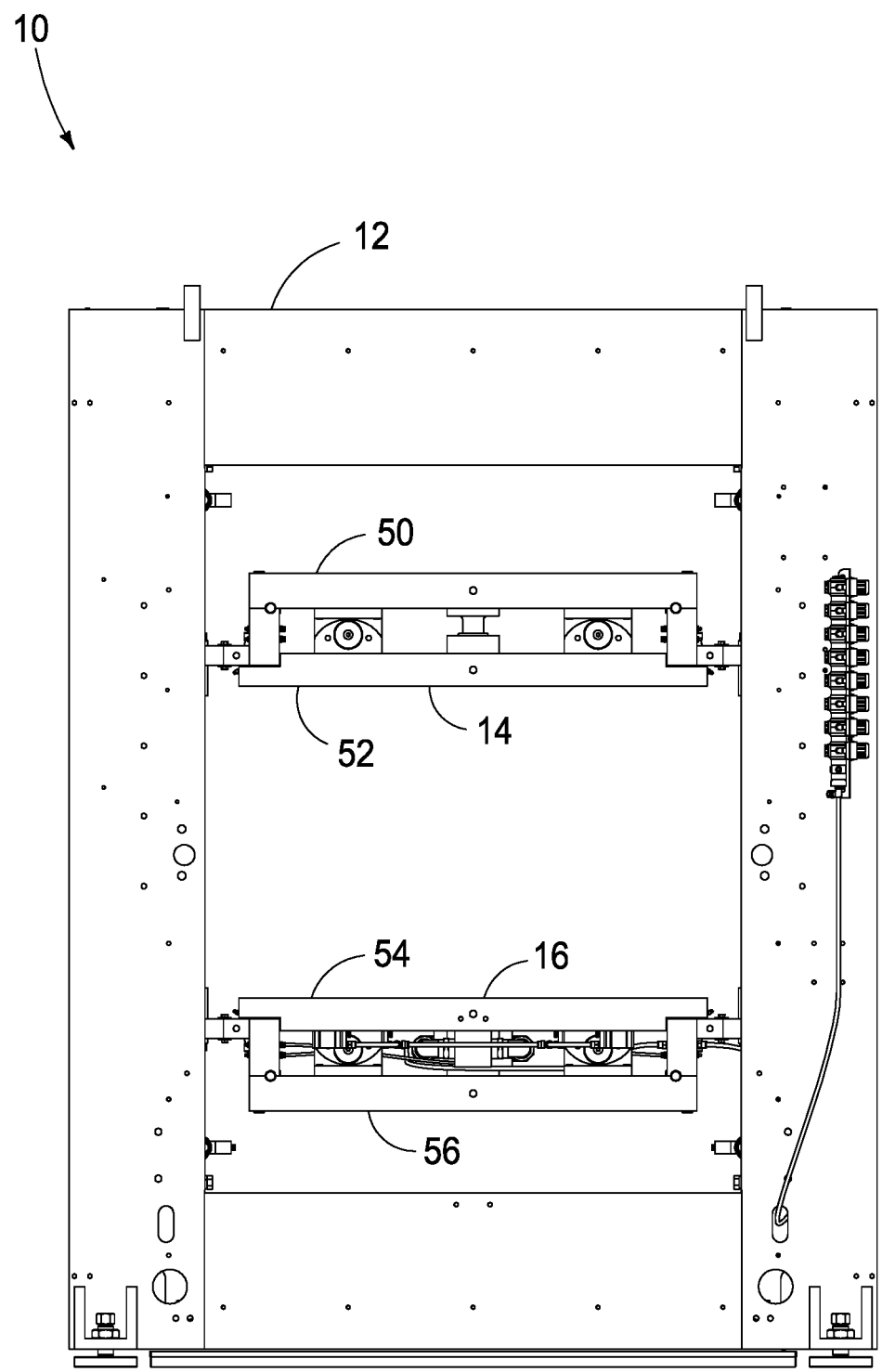
FIG. 13 is an upstream end view of the thermoforming machine of FIG. 11.

FIG. 13 is an upstream end view of the thermoforming machine 10 of FIG. 11. More particularly, platens 14 and 16 are shown in a closed position relative to frame 12 and each other. Tooling support plates are shown connected to back plates 50 and 56 via a plurality of discrete load paths 72 (see FIG. 32).

Figure 14:
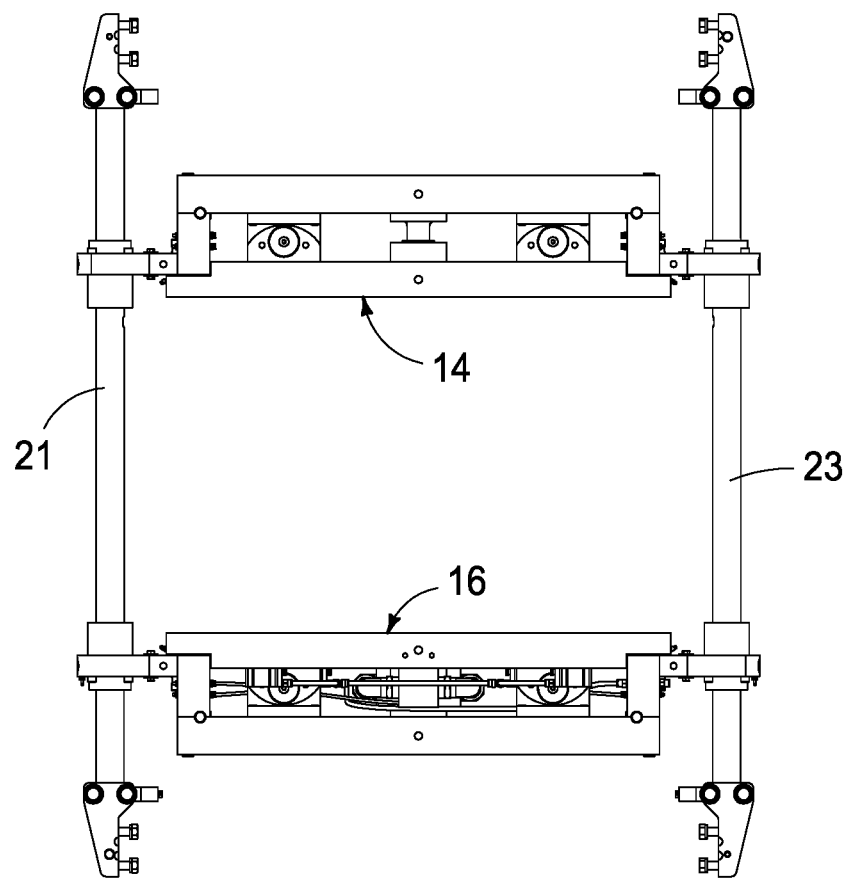
FIG. 14 is an upstream end view of the platens and dies posts of FIG. 13.

FIG. 14 is an upstream end sub-assembly view of the platens 14 and 16 and die posts 21 and 23 of FIG. 13.

Figure 15:
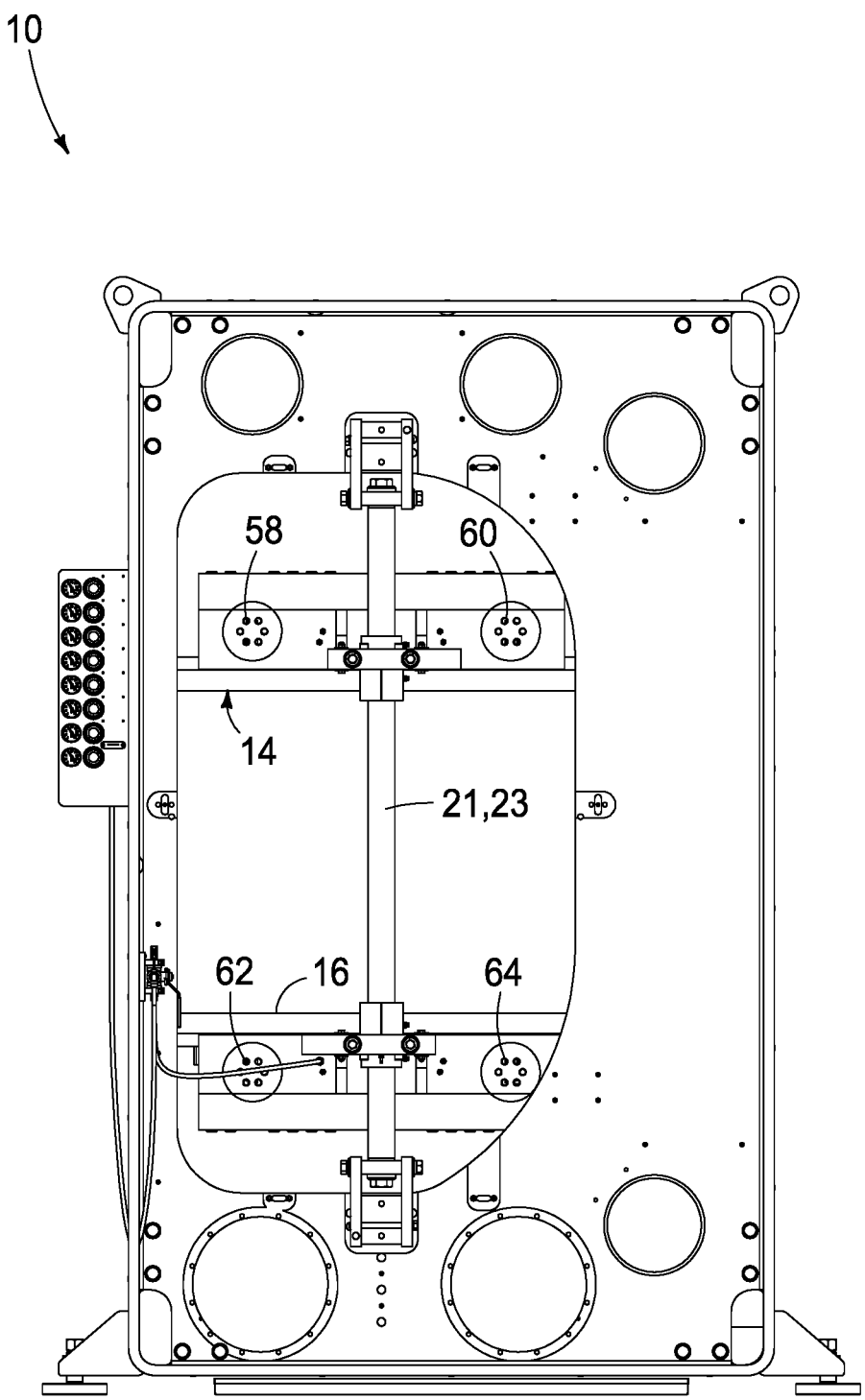
FIG. 15 is a right-side view of the thermoforming machine of FIG. 13.

FIG. 15 is a right-side view of the thermoforming machine 10 of FIG. 13. More particularly, platens 14 and 16 are shown in a closed position with die posts 21 and 23. Platen 14 has pairs of drive arm attachment points, or recesses 58 and 60 provided on each side. Likewise, platen 16 has similar pairs of drive arm attachment points, or recesses 62 and 64 provided on each side.

Figure 16:
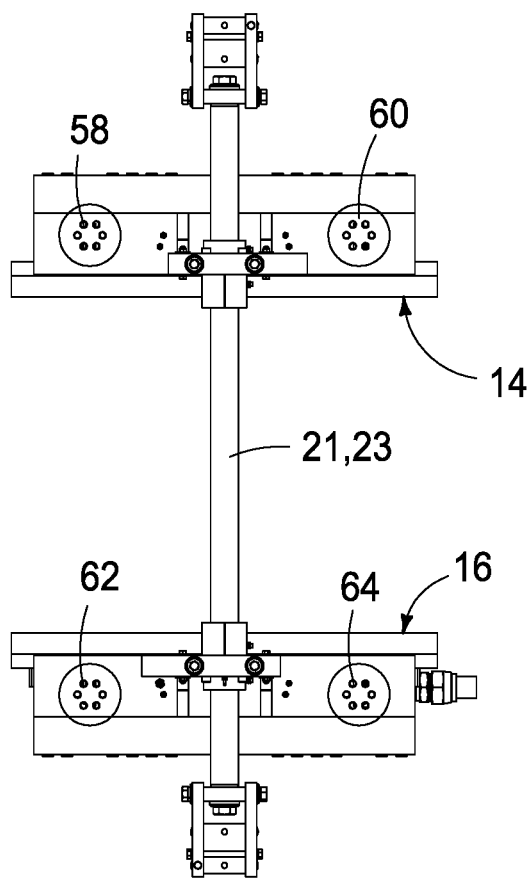
FIG. 16 is a right-side view of the platens and dies posts of FIG. 15.

FIG. 16 is a right-side view of the platens 14 and 16 and dies posts 21 and 23 of FIG. 15. Drive arm attachment points 58, 60 and 62, 64 are shown on one side of platens 14 and 16, respectively. Identical attachment points are provided on the opposite side of platens 14 and 16 for a mirror-image set of drive arms (driven by the respective toggle shafts (not shown).

Figure 17:
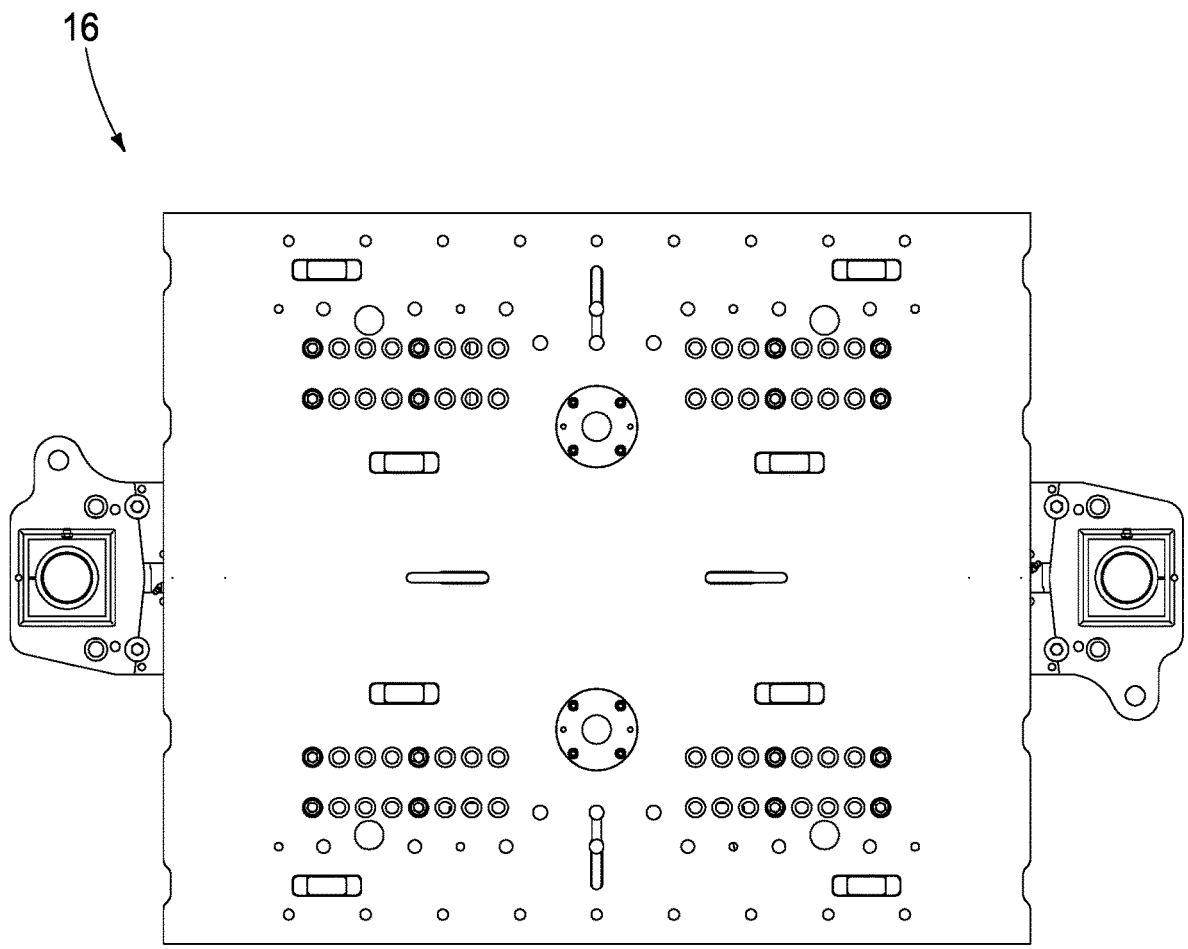
FIG. 17 is a plan view of a top surface of the bottom platen.

FIG. 17 is a plan view of a top surface of the bottom platen 16 showing layout of tooling surface components for connecting and coupling a die plate (not shown) onto platen 16.

Figure 18:
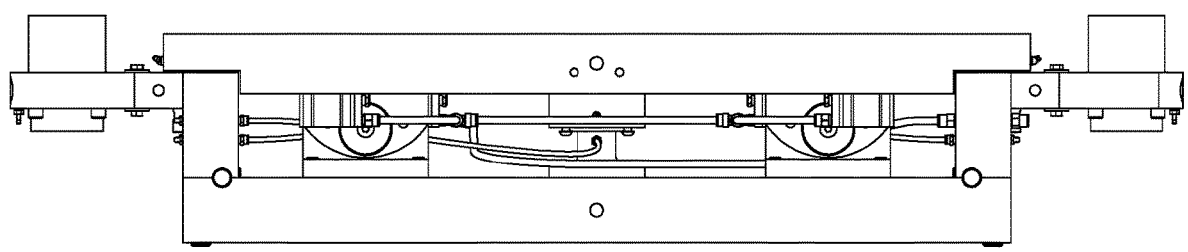
FIG. 18 is an upstream, or front-end view of the bottom platen of FIG. 17.

FIG. 18 is an upstream, or front-end view of the bottom platen 16 of FIG. 17 further showing details of the laminated, or compound construction with a plurality of discrete bridging load paths that can be relocated laterally in order to minimize load deformation of the tooling surface from forming loads generated by drive arms and pneumatic or vacuum application across die plates during an article forming operation and including grease lines and fittings for lubricating contact components.

Figure 19:
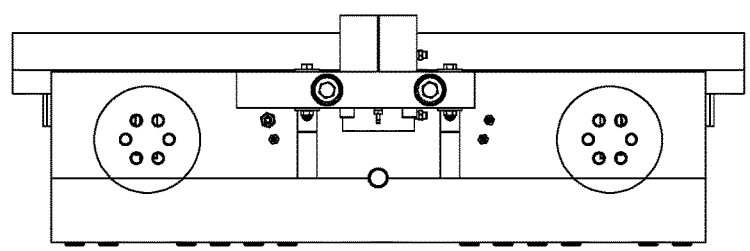
FIG. 19 is a right-side view of platen 16 of FIG. 22.
Figure 22:
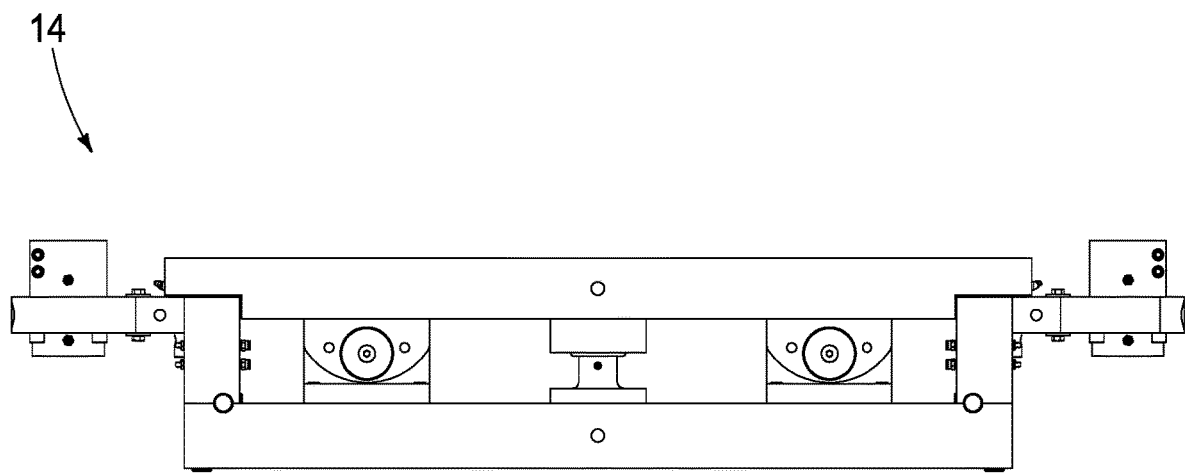
FIG. 22 is an upstream view of the top platen of FIG. 21 shown upside down.

FIG. 19 is a right-side view of platen 16 of FIG. 22.

Figure 20:
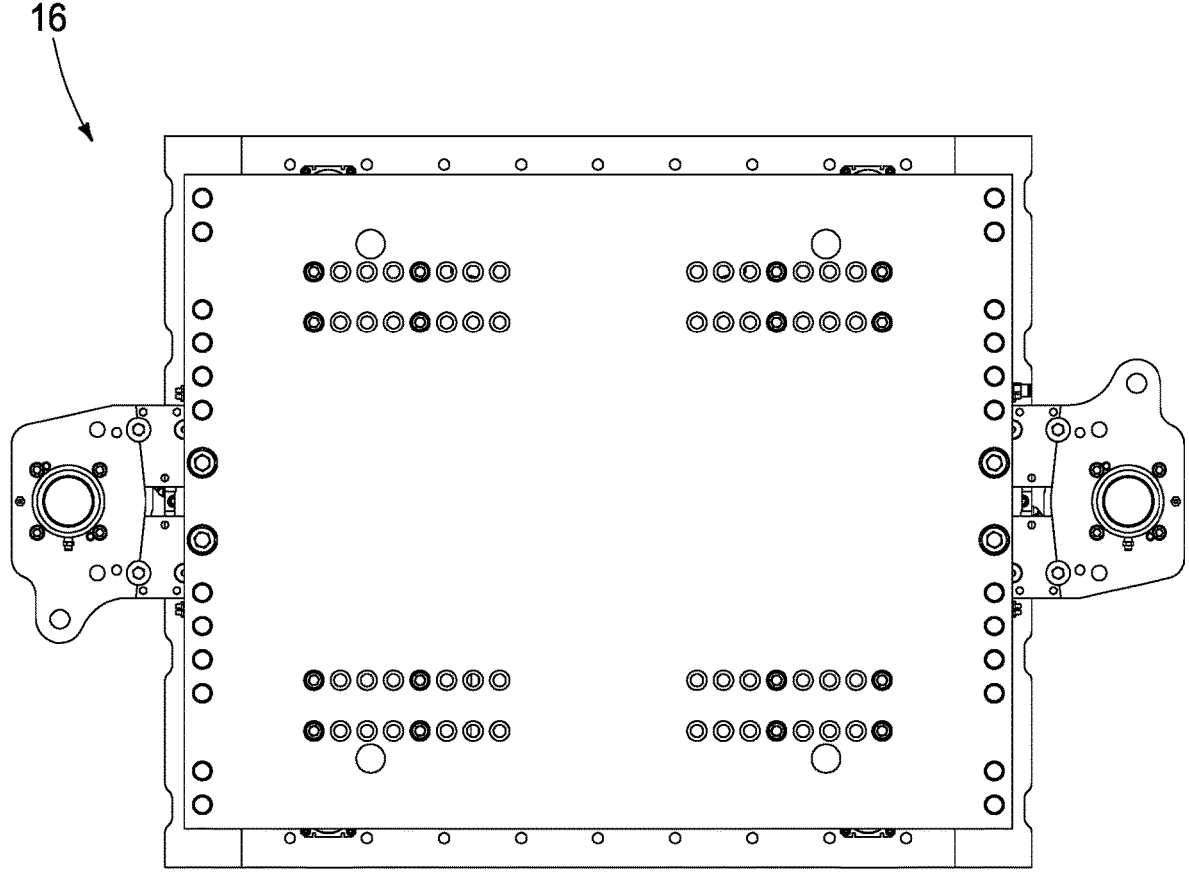
FIG. 20 is a plan view of a bottom surface of the bottom platen.

FIG. 20 is a plan view of a bottom surface of the bottom platen 16.

Figure 21:
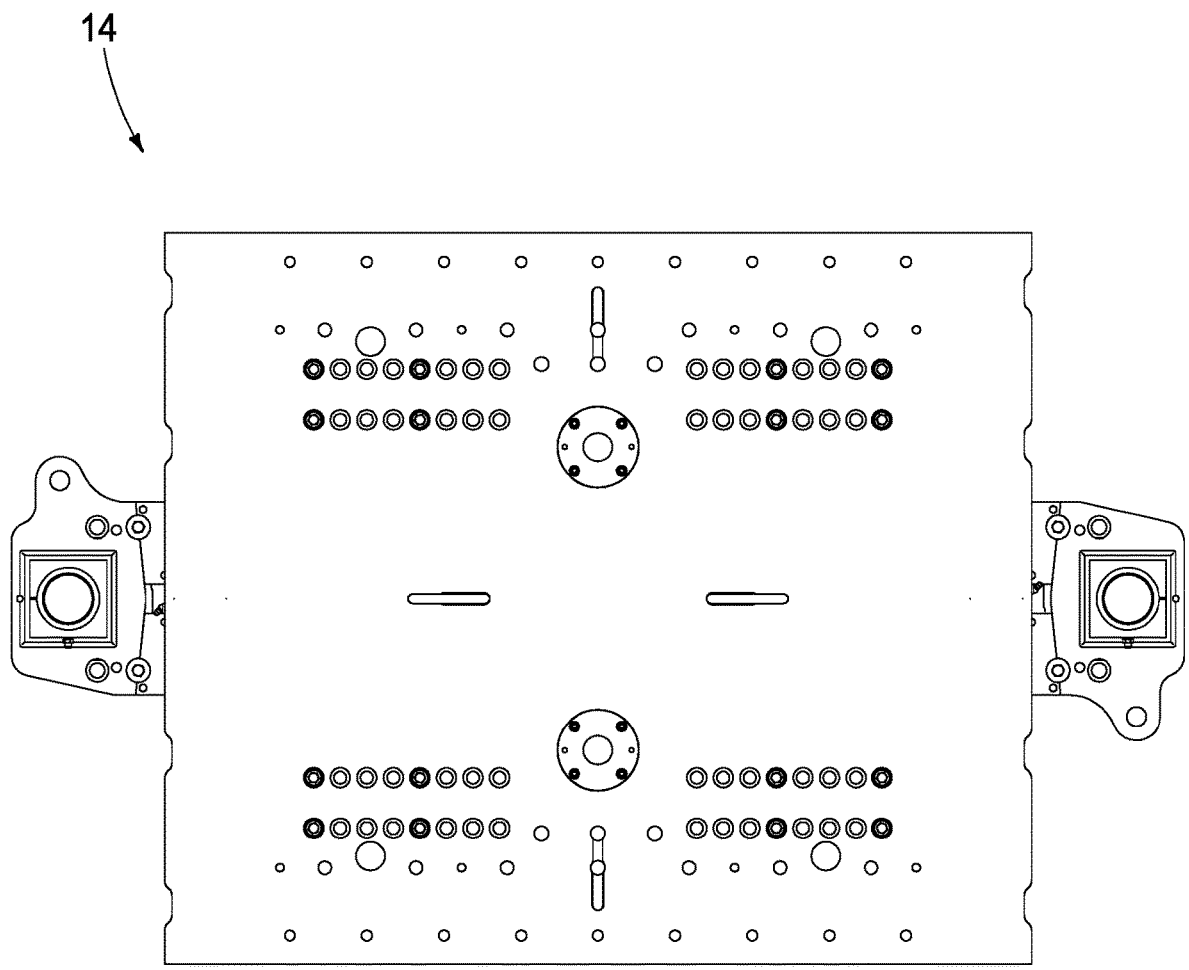
FIG. 21 is a plan view of a bottom surface on the top platen.

FIG. 21 is a plan view of a bottom tooling surface on the top platen 1.

FIG. 22 is an upstream view of the top platen 14 of FIG. 21 shown upside down.

Figure 23:
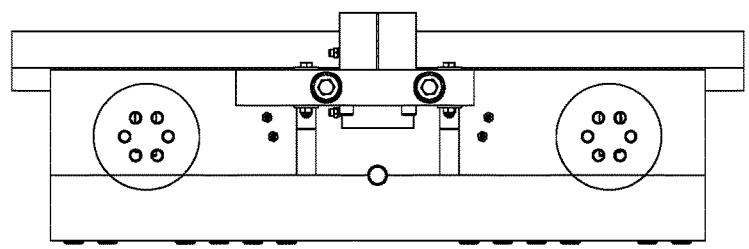
FIG. 23 is a right-side view of the top platen shown upside down.

FIG. 23 is a right-side view of the top platen 14 shown upside down.

Figure 24:
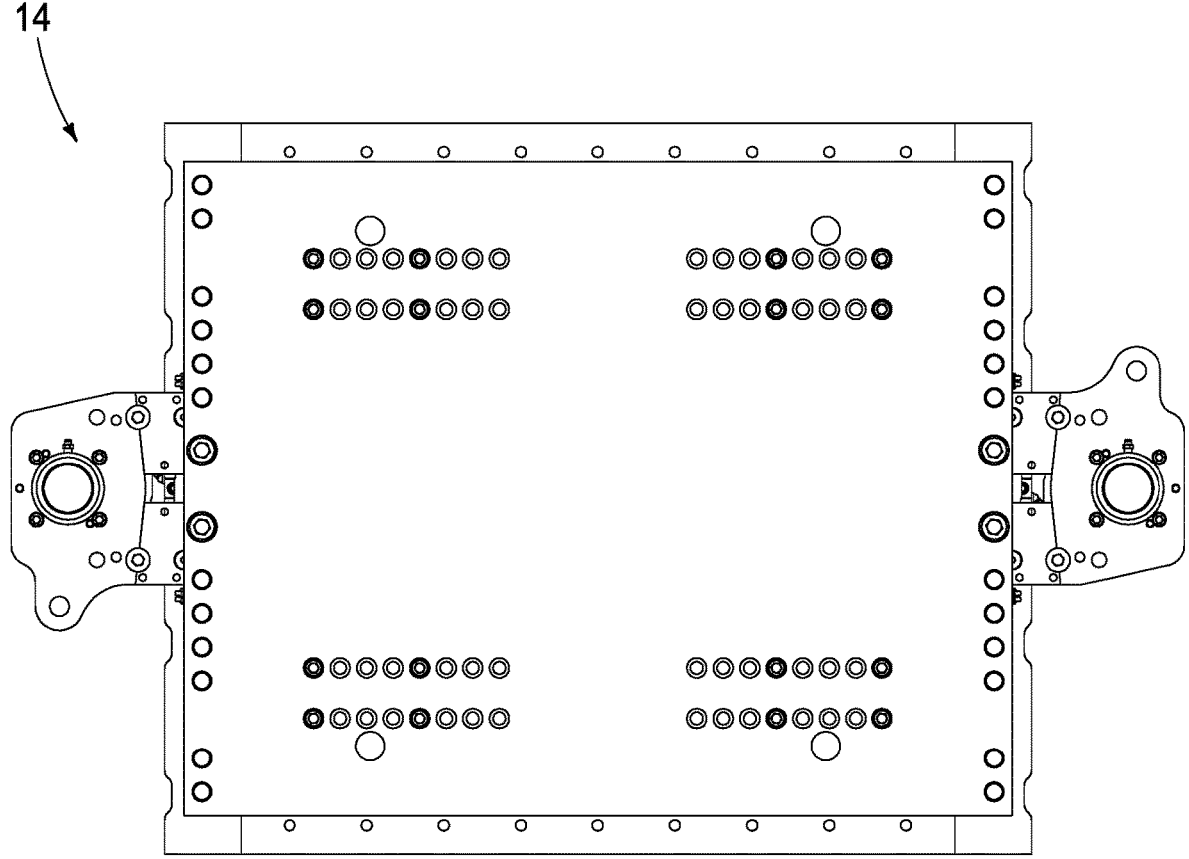
FIG. 24 is a plan view of a top surface of the top platen.

FIG. 24 is a plan view of a top surface of the top platen 14.

Figure 25:
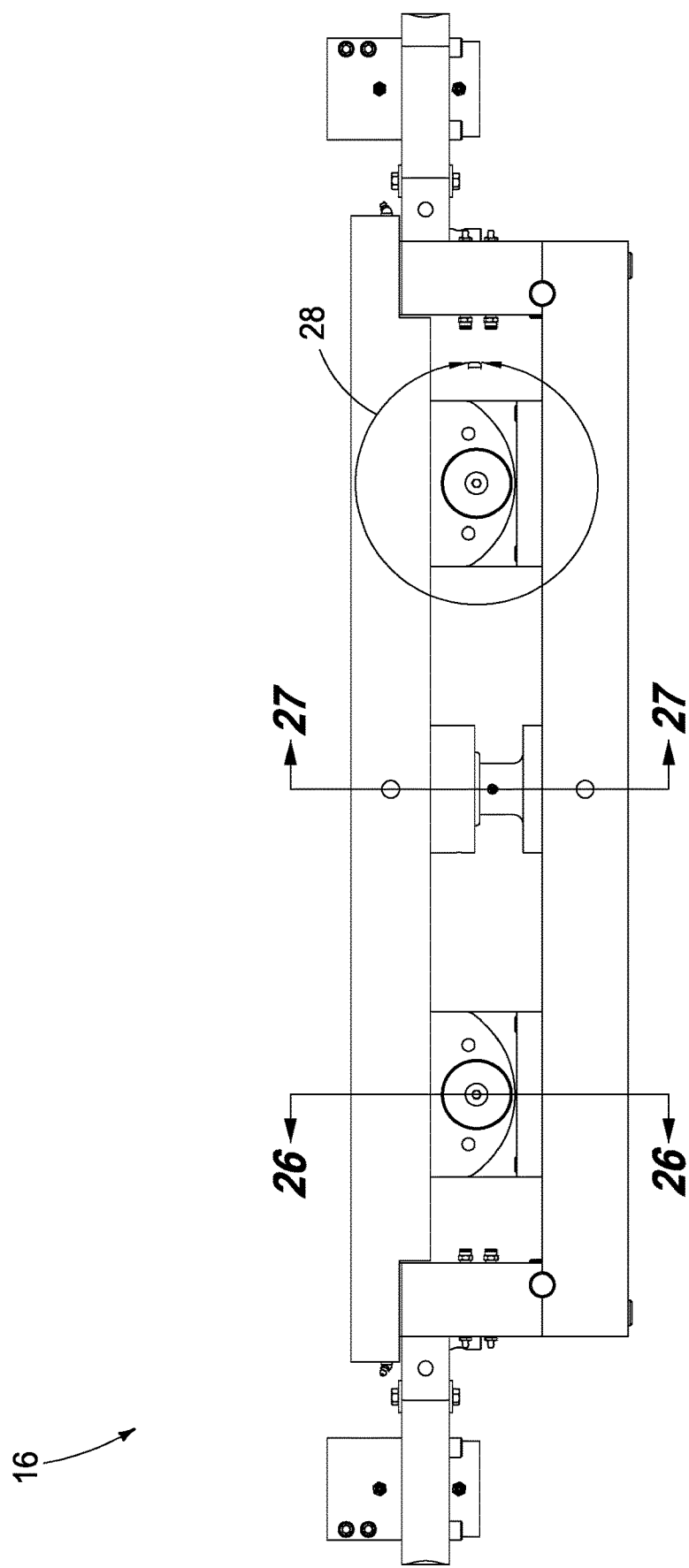
FIG. 25 is an upstream end view of the lower platen.

FIG. 25 is an upstream end view of the lower platen 16 showing enlarged details of the plurality of load paths provided in the laminated construction.

Figure 26:
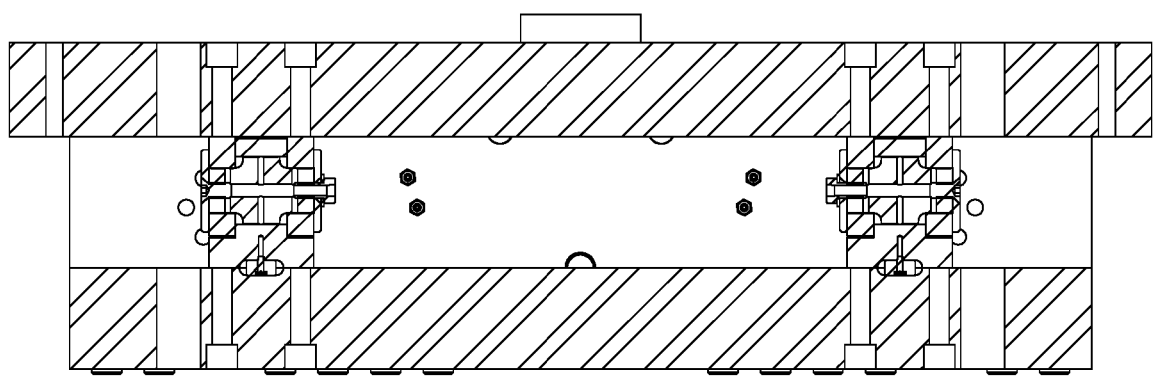
FIG. 26 is a vertical sectional view of the platen of FIG. 25 taken through line 26-26 of FIG. 25.

FIG. 26 is a vertical sectional view of the platen 16 of FIG. 25 taken through line 26-26 of FIG. 25 showing further details of the laminated construction and the discrete load paths.

Figure 27:
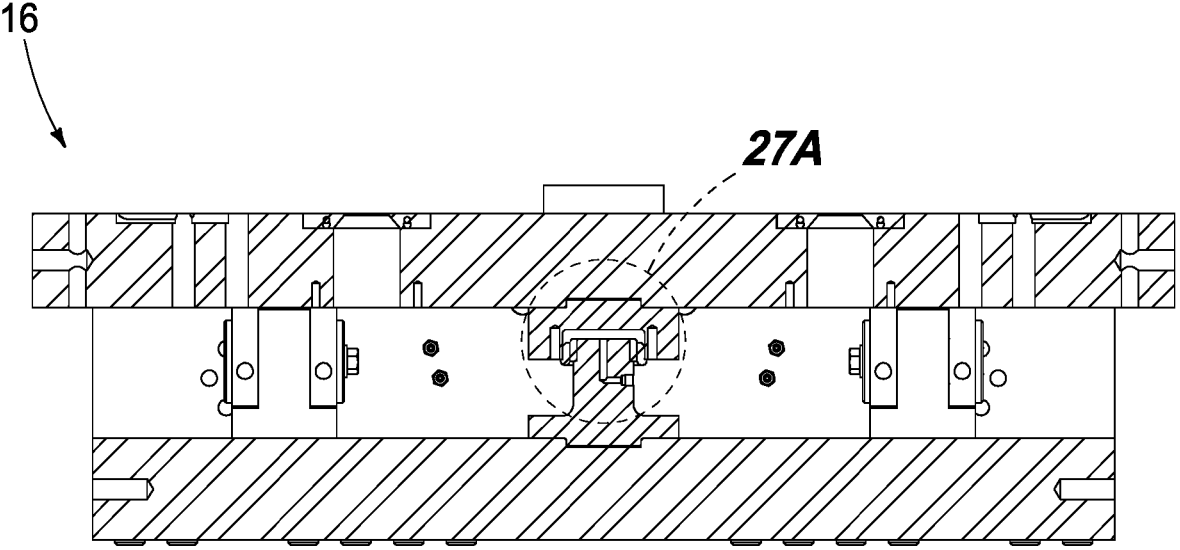
FIG. 27 is a vertical sectional view of the platen of FIG. 25 taken through line 27-27 of FIG. 25.

FIG. 27 is a vertical sectional view of the platen 16 of FIG. 25 taken through line 27-27 of FIG. 25 showing the laminated construction and the discrete load paths with a centering structure.

Figure 27A:
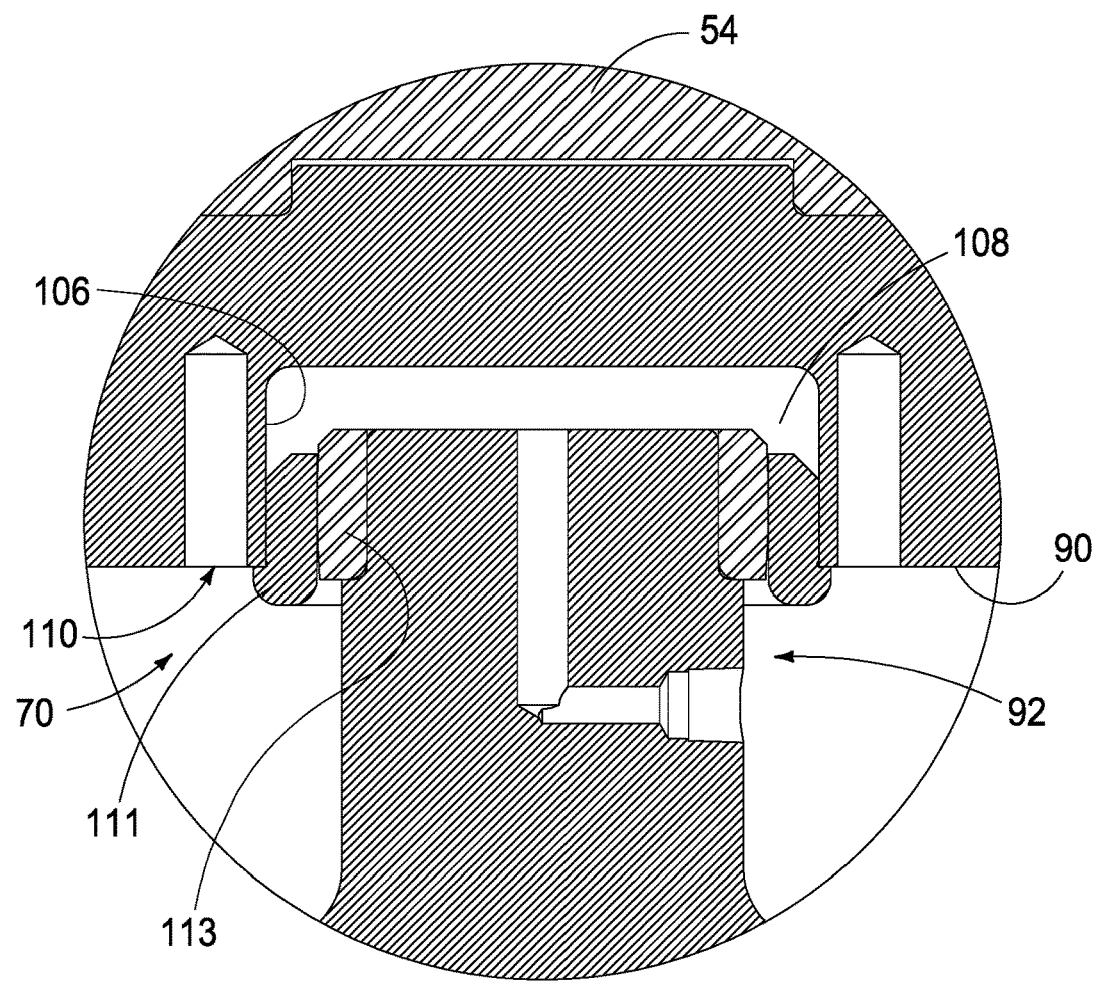
FIG. 27A is an enlarged partial sectional view taken from the encircled region 27A of FIG. 27.

FIG. 27A is an enlarged partial sectional view taken from the encircled region 27A of FIG. 27 showing the centering structure provided between a female alignment collar 90 and a male alignment pin, or post 92. More particularly, female alignment collar 90 is affixed to tooling support plate 54 with a plurality of threaded fasteners (see FIG. 54). A cylindrical female cavity, or bore 106 defines a clearance recess 108 into which pin 92 is received for coaxial movement. In this manner pin 92 constrains together plate 54 with plate 56 (see FIG. 31) preventing any lateral movement in the plane of plates 54 and 56, while prevent any axial loading from transferring between pin 92 and collar 90. A flanged hardened steel drill bushing 111 is received within cavity 106 and security with broad headed threaded fasteners (not shown) received in a plurality of threaded apertures 110 about an outer periphery of cavity 106, entrapping the outer peripheral flange on bushing 111 so as to retain bushing 111 in cavity 106. A standard hardened steel drill bushing 113 is affixed in press fit onto an end of pin 92. Bushing 113 has a radial outer surface that has a large spherical shape such that contact with an inner circumferential surface of bushing 111 forms a cylindrical line contact at the outermost location of bushing 113 that also allows for rotation, or pivoting between pin 92 and collar 90 so as to provide two degrees of rotational freedom there between pin 92, collar 90, cavity 106, and bushings 111 and 113 together form a center leg 70 that extends between plates 54 and 56 (see FIG. 31) to constrain lateral motion there between while allowing no axial transfer of load and providing for two degrees of rotational freedom at such location.

Figure 28:
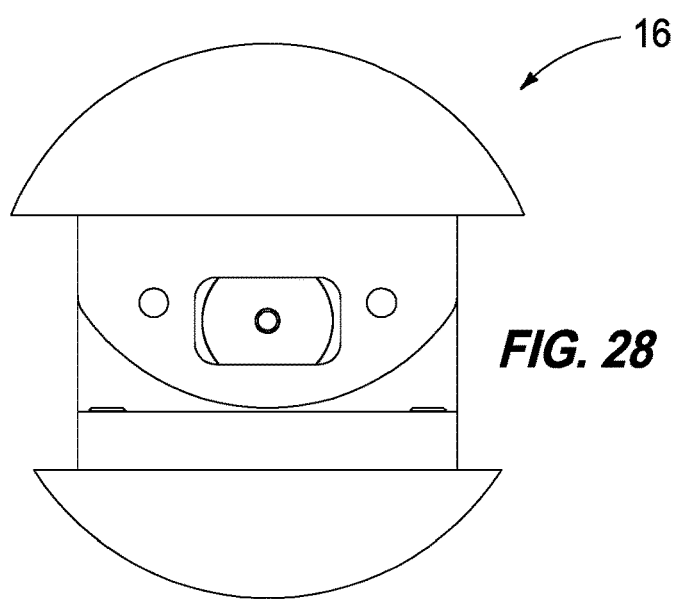
FIG. 28 is an enlarged partial view from the encircled region 28 of FIG. 25.

FIG. 28 is an enlarged partial view from the encircled region 28 of FIG. 25 showing a load path through the lamination of platen 16.

Figure 29:
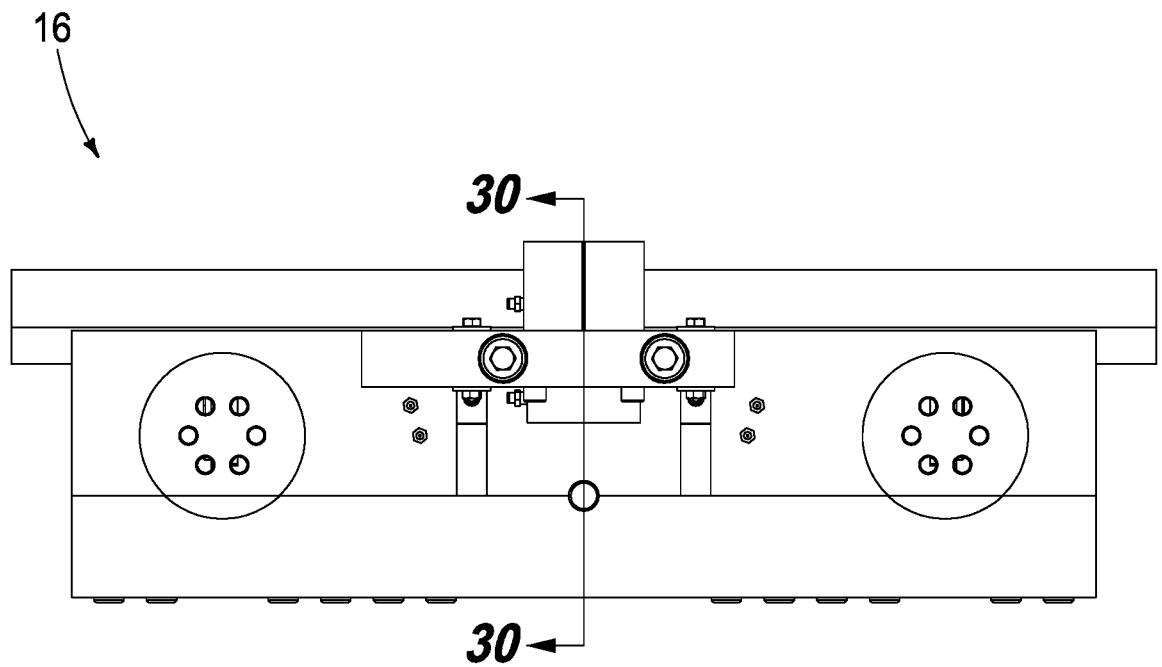
FIG. 29 is a right-side view of the lower platen.

FIG. 29 is a right-side view of the lower platen 16 showing in side view the platen die post bushings.

Figure 30:
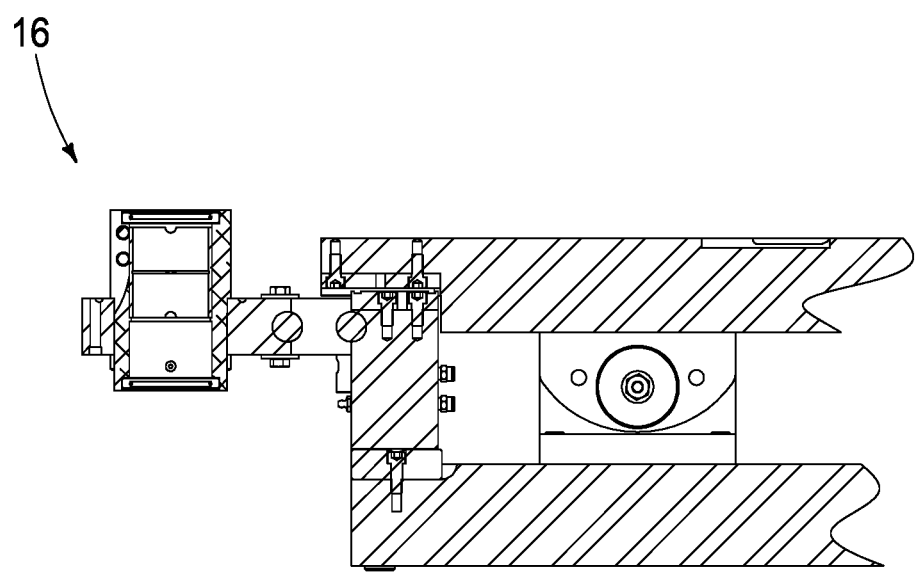
FIG. 30 is a partial vertical sectional view of the lower platen taken along line 30-30 of FIG. 29.

FIG. 30 is a partial vertical sectional view of the lower platen taken along line 30-30 of FIG. 29 showing in enlarged detail a removable die post bushing housing and removable bushing alignment plate.

Figure 31:
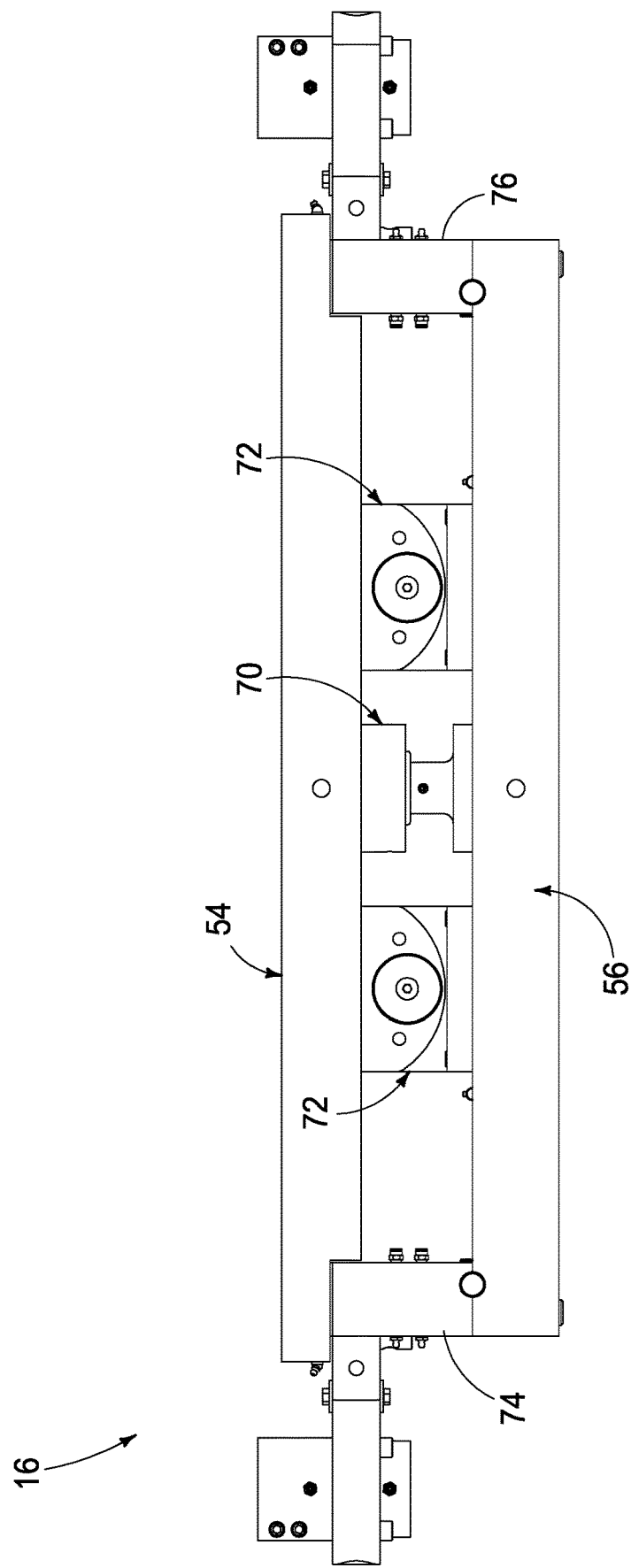
FIG. 31 is an upstream end view of the lower platen.

FIG. 31 is an upstream end view of the lower platen 16 showing one set of inboard positions for legs, or load paths 72. It is understood that there are four legs 72 equally-spaced in a square pattern about center leg 70. Optionally, a spaced-apart array of legs can be provided in any of a number of alternative patterns or quantity of legs. Leg 70 constrains plate 54 relative to plate 56 to prevent translation in-plane in any direction. A pair of structural side plates 74 and 76 affix to opposite edges of plate 56 and carry loads to the frame from edge connected drive arms (not shown) while load paths 72 transfer loads between plates 54 and 56 in a manner that maximizes flatness of the top tolling surface on plate 54 resulting from large loads that elastically deform related structural members. In this manner, plate 54 maintains under load a tooling surface that is more stable and flat due to load paths 72 (which can be moved laterally to accommodate different tool sizes).

Figure 32:
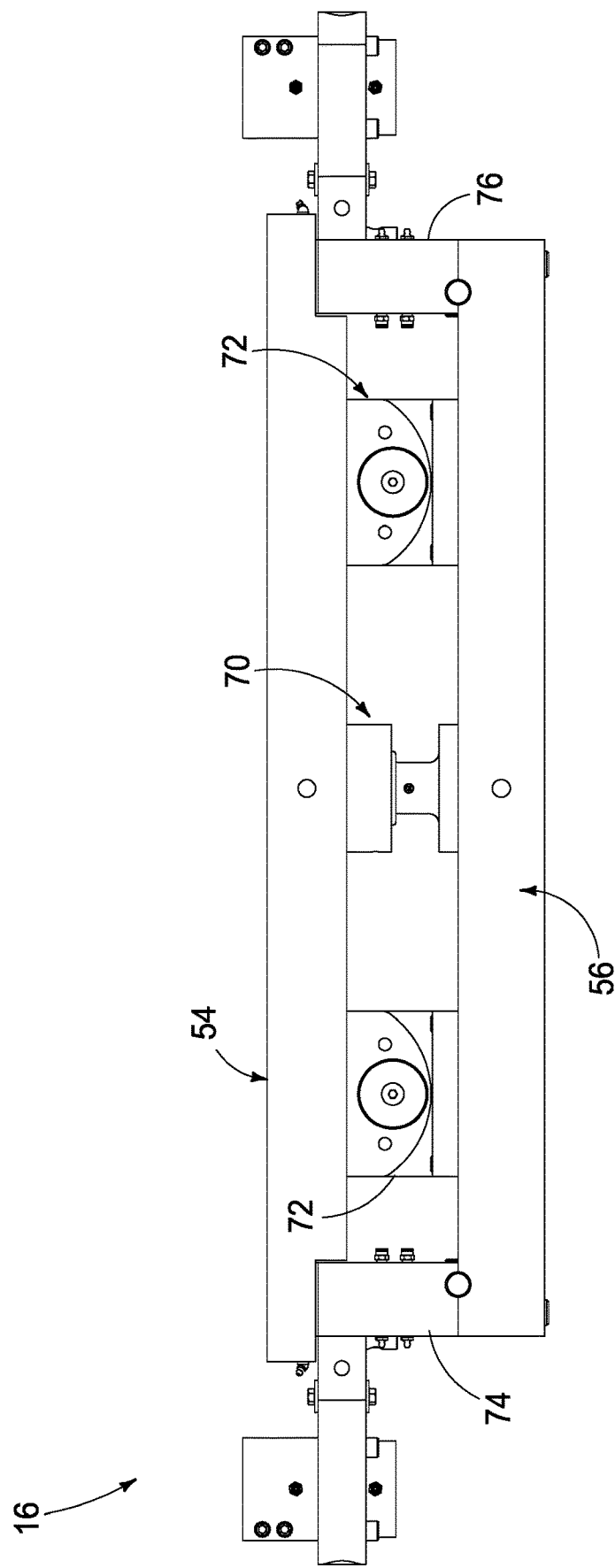
FIG. 32 is a downstream end view of the lower platen.

FIG. 32 is a downstream end view of the lower platen 16 showing plates 54 and 56, side plates 74 and 76, four load paths 72 and centering leg, or path 72.

Figure 33:
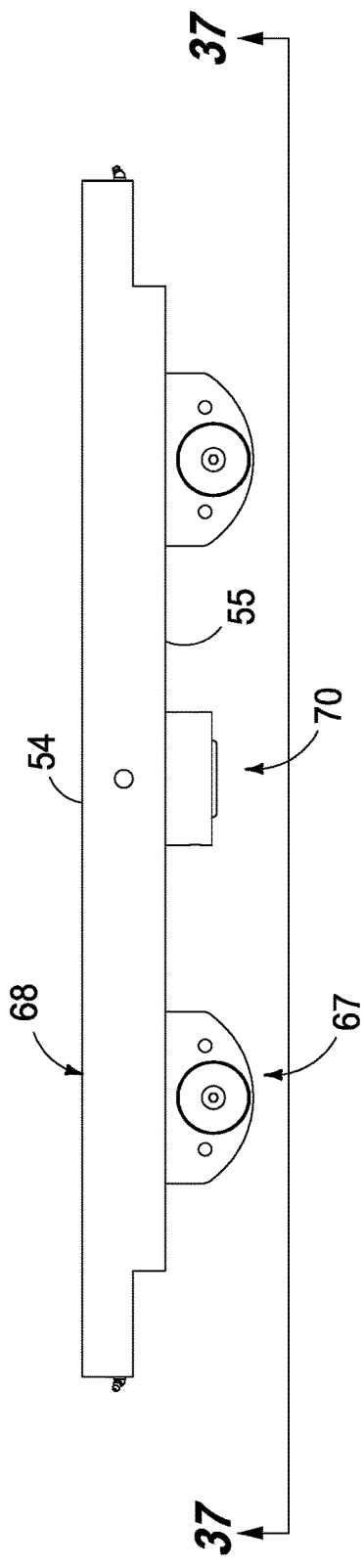
FIG. 33 is an upstream component view of the top tooling support plate of the bottom platen.

FIG. 33 is an upstream component view of the top, or tooling support plate 54 of the bottom platen. Respective portions of legs, or load paths 72 are affixed in a spaced-apart array onto a back surface 55 of tooling support plate 54 along with a respective portion of centering leg 70, providing tooling plate sub-assembly 68.

Figure 34:
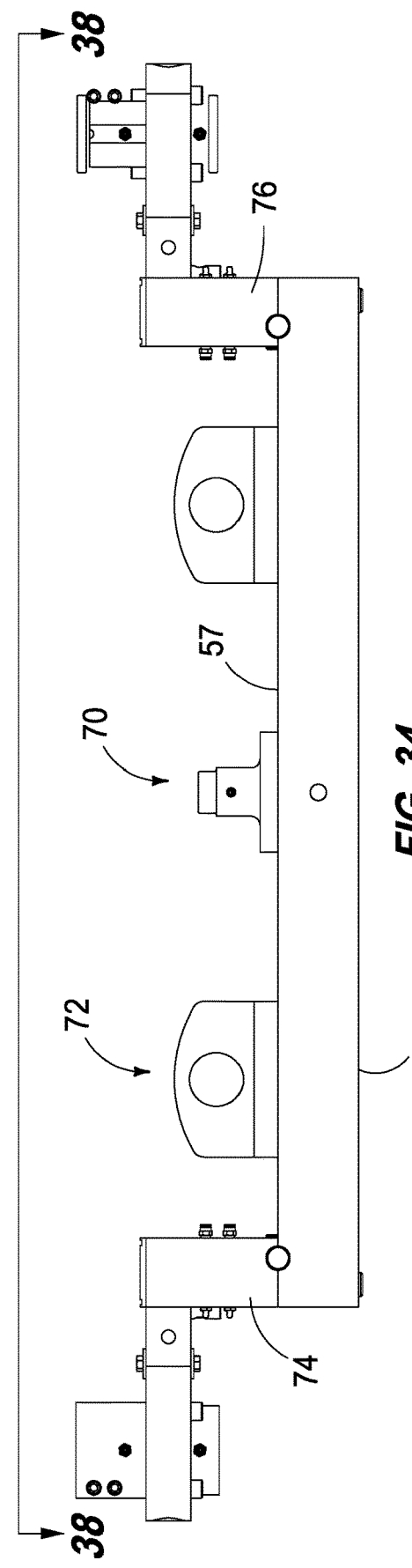
FIG. 34 is an upstream component view of the bottom plate of the bottom platen.

FIG. 34 is an upstream component view of the bottom, or back plate 56 of the bottom platen. Respective portions of legs, or load paths 72 are affixed in a spaced-apart array onto a back surface of back plate 56 along with a respective portion of centering leg 70.

Figure 35:
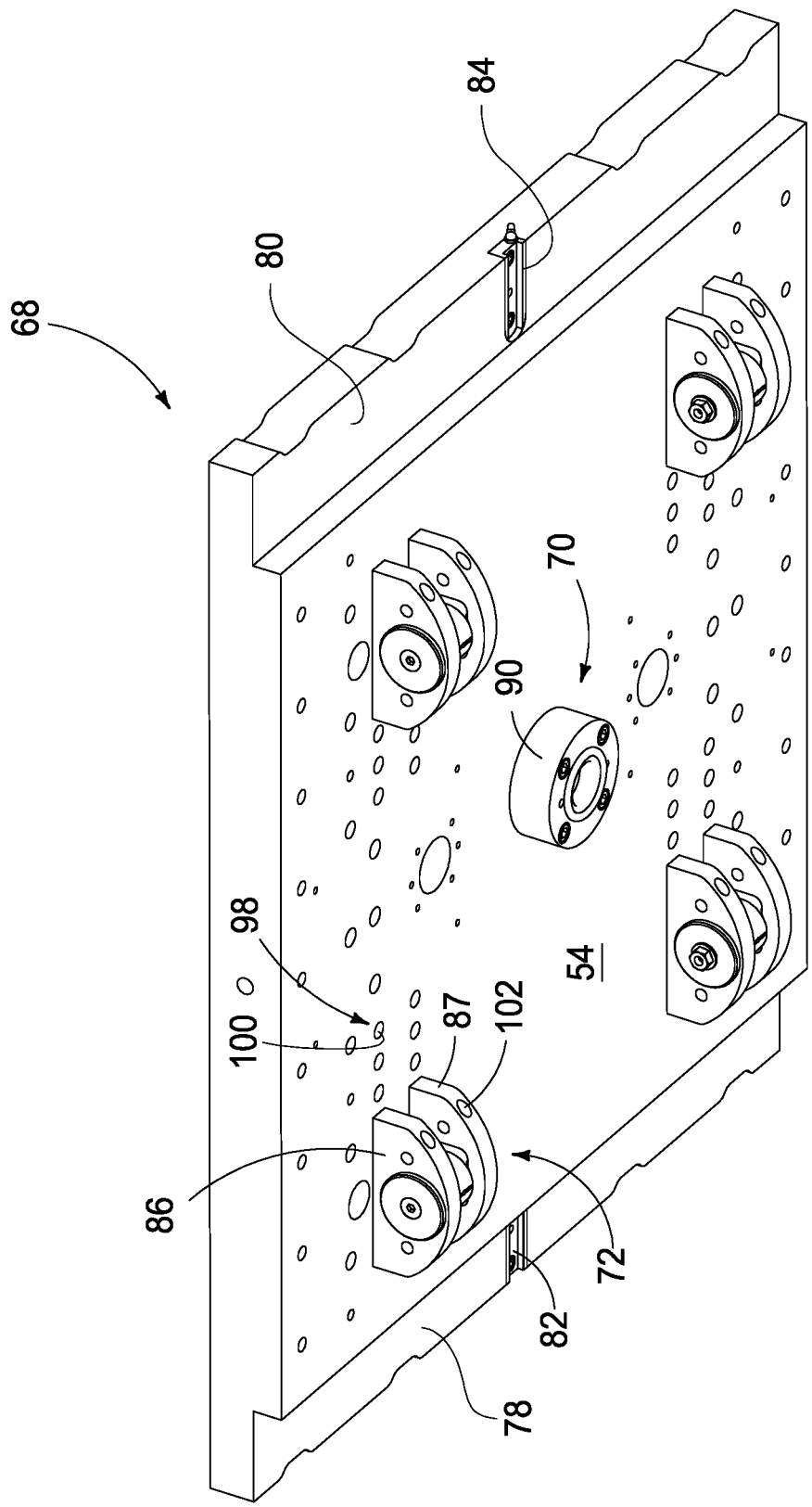
FIG. 35 is a perspective view from below showing the bottom surface of the top tooling support plate of the lower platen.

FIG. 35 is a perspective view from below showing the bottom surface of the top tooling support plate 54 of the lower platen. More particularly, a rectangular array 98 of threaded apertures 100 are provided in the bottom surface of plate 54 configured to enable lateral remounting of side legs, or load paths 72 to plate 54 in order to move the position of load paths for different, unique sized die plates (not shown) that are affixed atop plate 54. The relocation of load paths 72 is desirable in order to maximized flatness atop plate 54 (and for the attached die plate) during application of forming loads. It is understood that one desirable location is to place load paths 23% of the width of the die plate surface from an edge in order to achieve loaded elastically deformed die plates having a minimized deformation mode on the top, contacting die surface with a complementary die plate. Such an adjustable feature enables quick and easy change between different die plates while achieving a minimized deformation mode for the platens and die plates be being able to move the load paths inboard and outboard.

As shown in FIG. 35, top plate sub-assembly 68 includes a recessed edge flange 78 and 80 on opposed edges to provide clearance with the platen side plates 74 and 76 (see FIG. 36) without providing a load path therebetween. However, a pair of hardened steel female keyways are mounted into flanges 78 and 80 to provide anti-rotation stability between plate 54 and plate 56 (of FIG. 36) in assembly by interdigitating with hardened steel male keys 83 and 85 (see FIG. 36) provided on the top edge of side plates 74 and 76. Keyways 82 and 84 overlap keys 83 and 85 with a clearance in order to prevent axial load transfer there through.

More particularly, each load path 72 is formed by a pair of side brackets, or plates 86 and 87 each having a pair of spaced aperture bores 102 configured to receive a threaded fastener, or bolt into a respective one of holes 100. Female alignment collar 90 is secured with four equally spaced-apart fasteners that thread into corresponding threaded apertures in plate 54 to form a portion of center leg 70. Plate 54 and legs 70 and 72 combine to form tooling plate sub-assembly 68.

Figure 36:
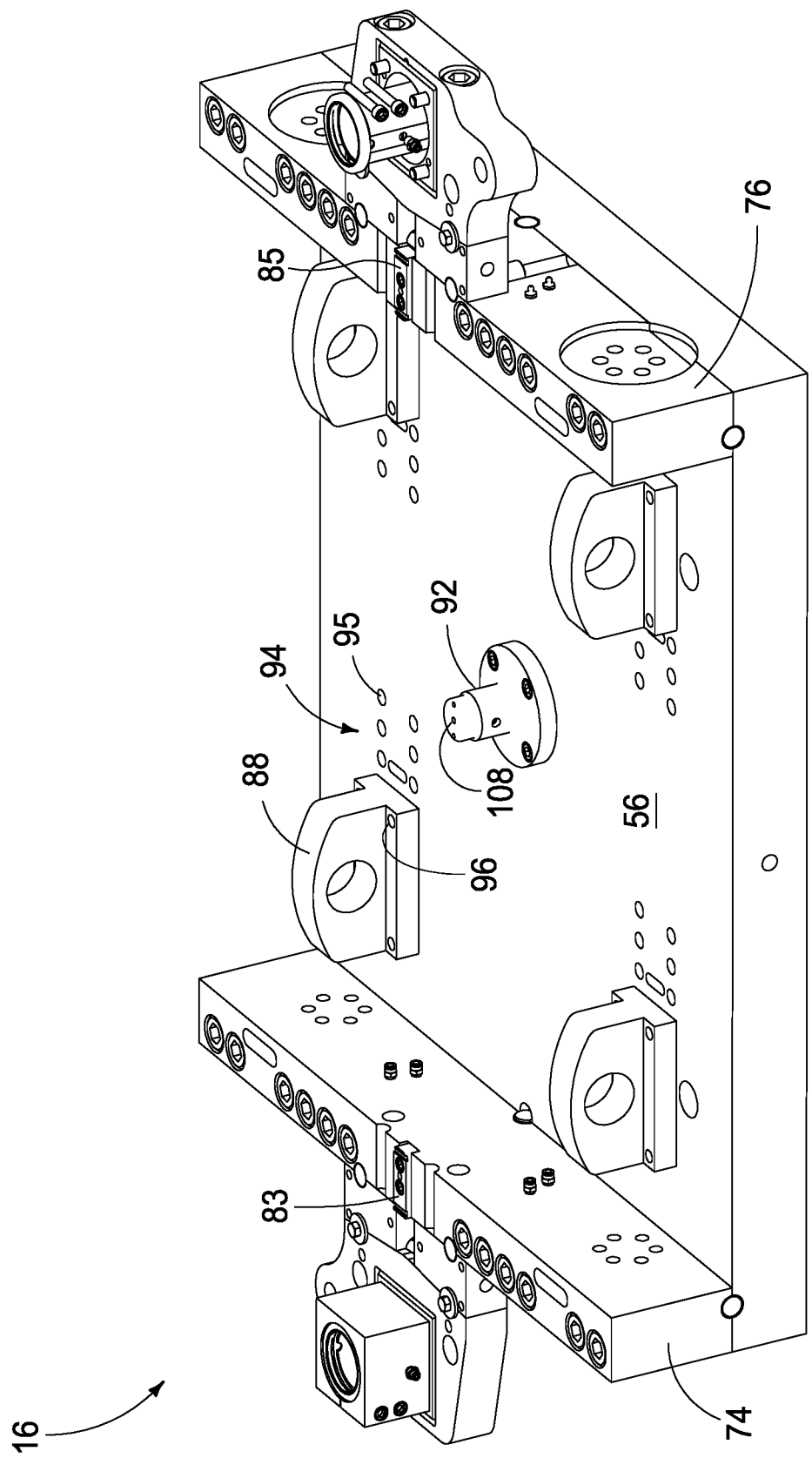
FIG. 36 is a perspective view from above of the top surface of the bottom plate of the bottom platen.

FIG. 36 is a perspective view from above of the top surface of the bottom plate 56 of the bottom platen 16. More particularly, medial brackets, or plates 88 affix with threaded fasteners (not shown) via bores 96 to corresponding desired threaded mounting apertures 95 provided in an adjustable array 94 corresponding with array 98 in FIG. 35. Such feature ensures that plates 88 can be mounted at a desirable location on plate 56 to present load paths at locations that minimize deformation of the tooling support plate 54 (of FIG. 35) during forming loads between platens and die plates. Male adjustment pin, or post 92 is similarly affixed via four threaded recessed fasteners into corresponding threaded apertures in plate 56 at a center location. Pin 92 includes a hemispherical head having a spherical outer peripheral head portion 108. In operation, drive arm loads transfer from side plates 74 and 76 into back plate 56, through load paths 70 (see FIG. 35) via plates 88 into tooling support plate 54 (of FIG. 35). Optionally, platens 14 and 16 can have one or more drive arms mounted inboard with load paths 70 provided outboard and/or inboard of such one or more drive arms. For example, a single central drive arms could be provided behind a platen with a cylindrical array of load paths (such as load paths 70) provided about the single central drive arm in order to mitigate deformation of the platen tooling mount surface. In such case, the central drive arm is located radially inward of an array of radially outward load paths.

Figure 37:
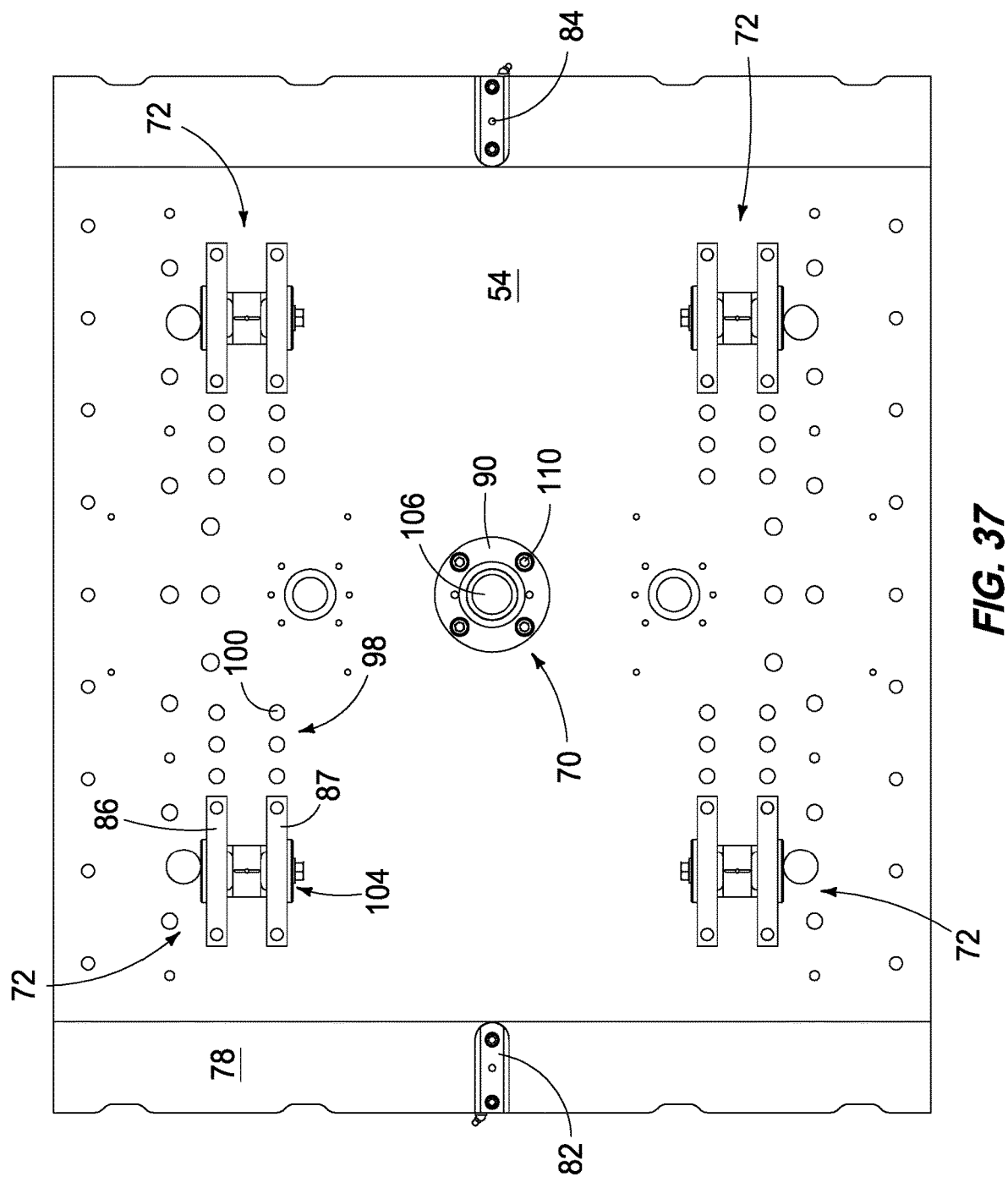
FIG. 37 is a plan view of the bottom surface of the top plate of the bottom platen shown in FIG. 35.

FIG. 37 is a plan view of the bottom surface of the top tooling support plate 54 of the bottom platen shown in FIG. 35. More particularly, a nearly square array of four adjustably spaced-apart load path assemblies 72 and a center located female alignment collar 90 for a center location leg, or assembly 70 are shown affixed to a bottom surface of tooling support plate 54 using selected threaded apertures 100 in array 98. Female cavity 106 of collar 90 is secured to a centered location on the bottom of plate 54 with a plurality of threaded fasteners, or bolts 110 provided in corresponding threaded apertures (not shown) in plate 54. A fastener assembly 104 affixes between plates 86 and 87 to capture plate 88 (see FIG. 36) there between. In assembly a slight gap is provided between plates 86, 87, and 88 which provides a limited degree of freedom along the axis of fastener assembly 104. Finally, a radial outward positioning of keyways 82 and 84 with threaded fasteners, or bolts to plate 54 about centered collar 90 is shown.

Figure 38:
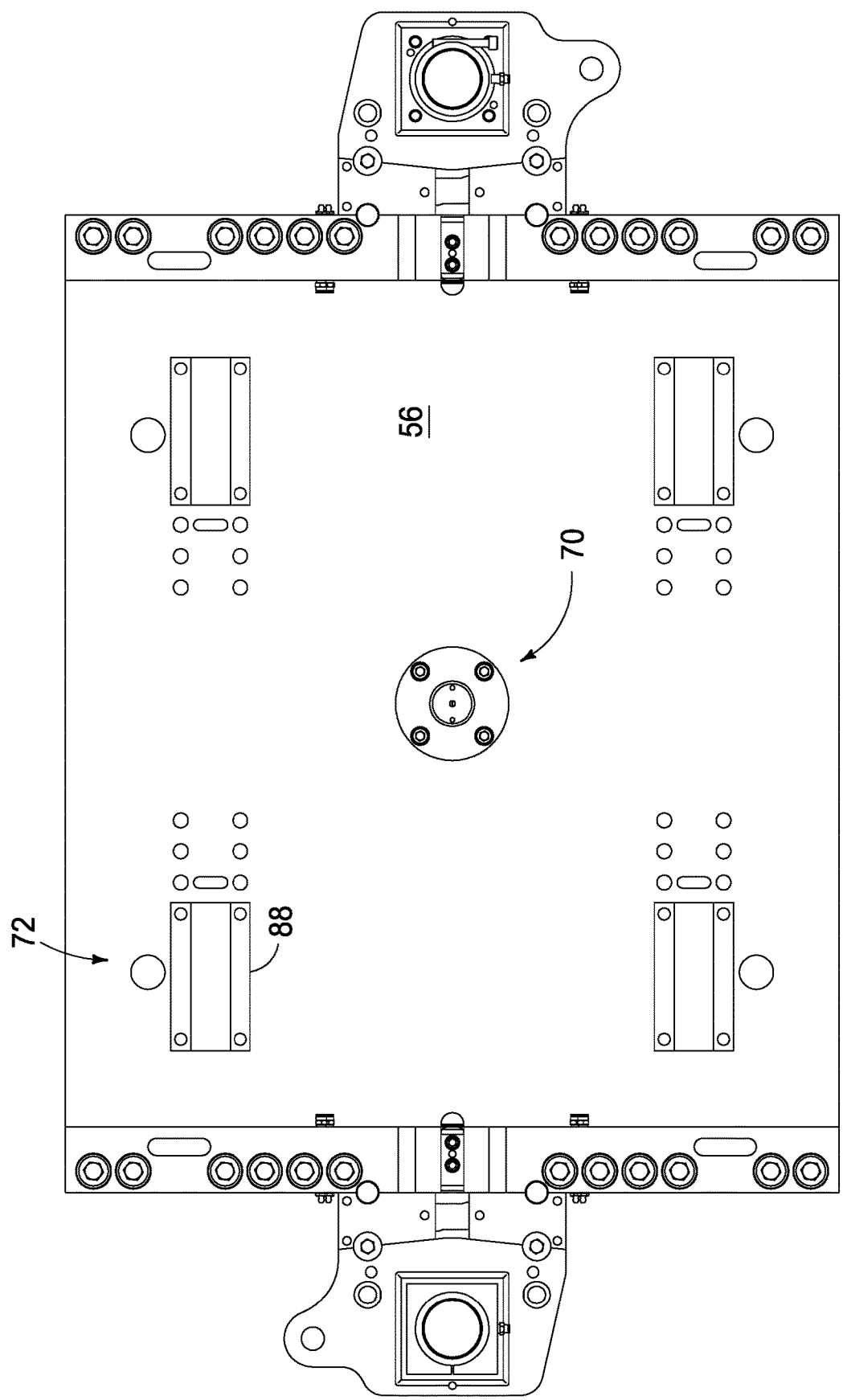
FIG. 38 is a plan view of the top surface of the bottom plate of the bottom platen shown in FIG. 36.

FIG. 38 is a plan view of the top surface of the bottom plate of the bottom platen 56 shown in FIG. 36. More particularly, an adjustably positionable array of side legs, or load paths 72 are shown affixed to plate 56, each having a central bracket or plate. Each load path member 72 is affixed equally distanced from centering leg 70.

Figure 39:
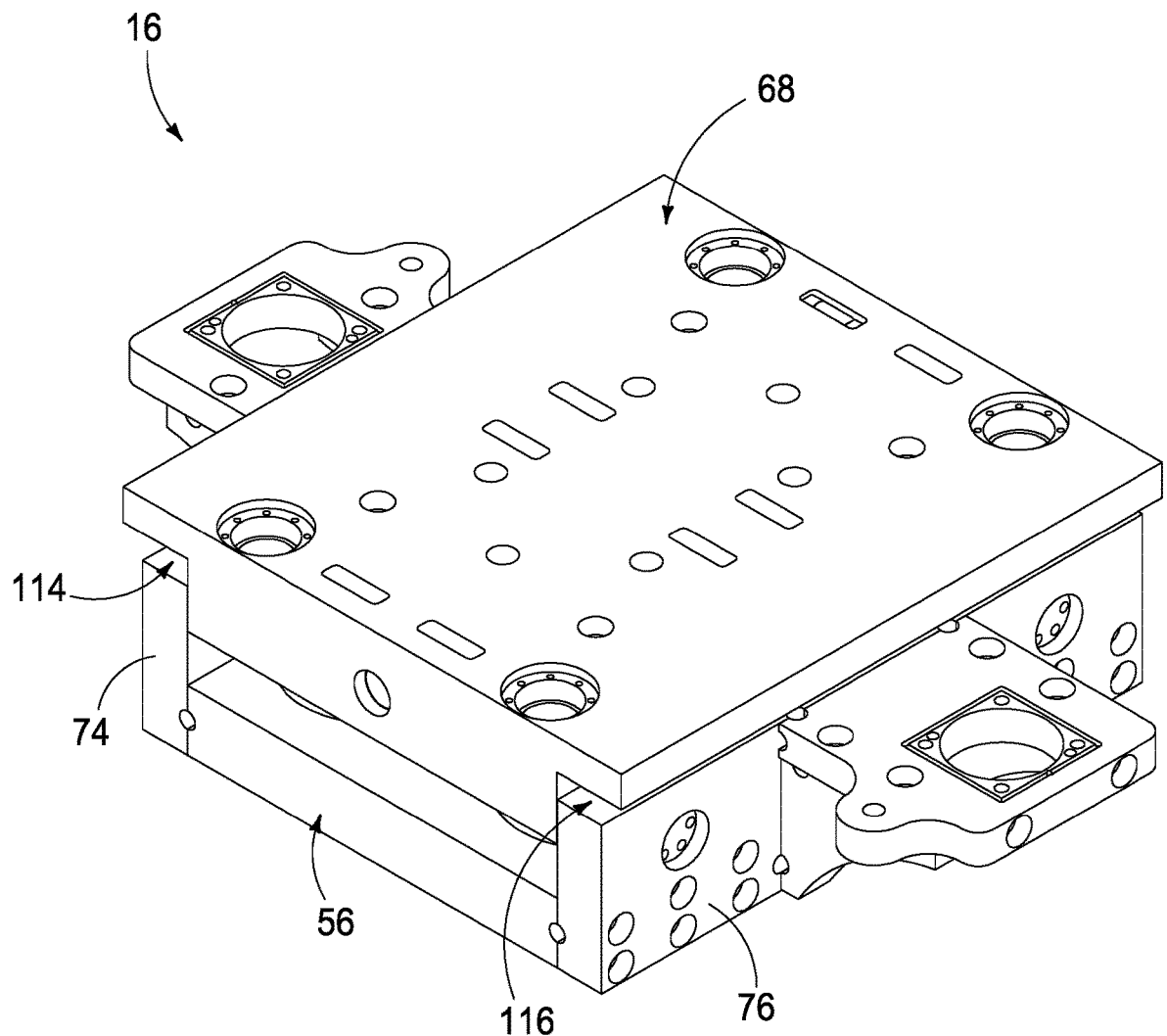
FIG. 39 is an optional configuration bottom platen having quick change tooling in a top surface of the bottom platen.

FIG. 39 is an optional configuration bottom platen having quick change tooling in a top surface of the bottom platen 16. Tooling plate sub-assembly 68 is shown affixed atop bottom plate 56 and side plates 74 and 76. Gaps 114 and 116 are sized to prevent any significant load path between assembly 68 and side plates 74 and 76.

Figure 40:
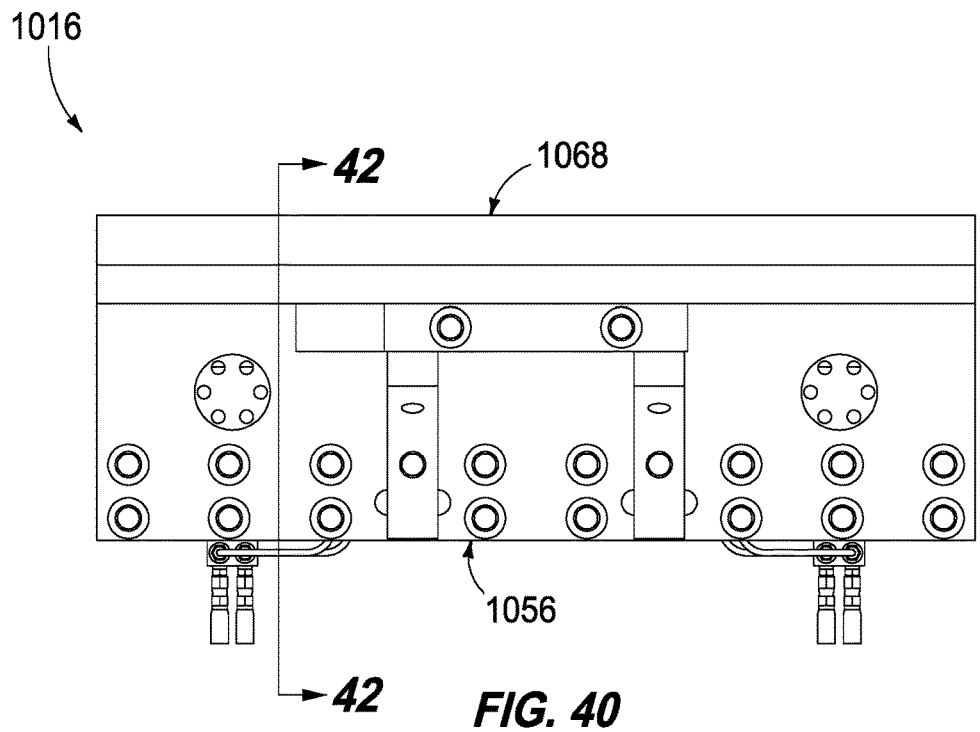
FIG. 40 is another optional configuration for a bottom, or lower platen shown in side view having hydraulic cylinders configured as discrete loads paths that can be relocated to minimize deformation of a tooling surface on the platen and also capable of generating a SASH differential load capable of adding extra load to counteract detected frame and component deformation.
Figure 41:
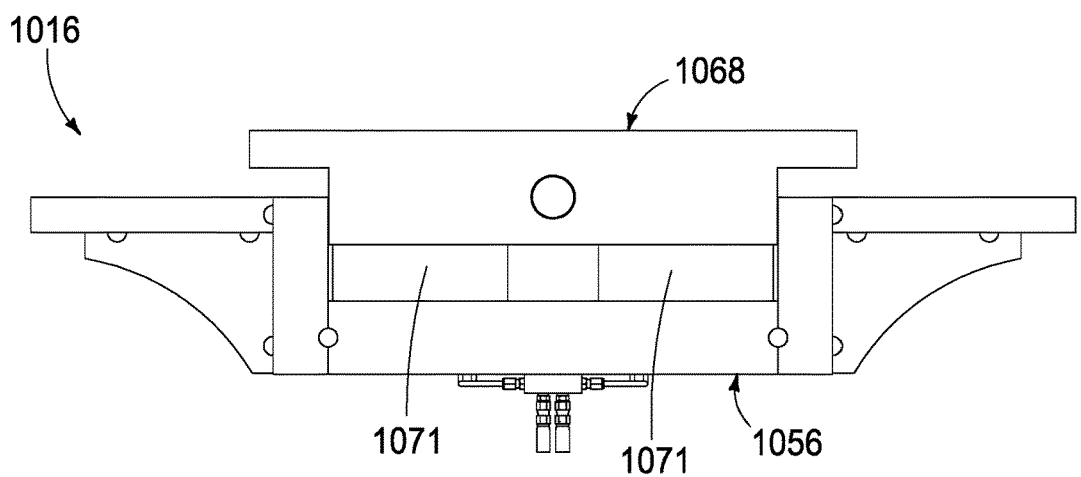
FIG. 41 is an upstream view of the platen of FIG. 40.
Figure 42:
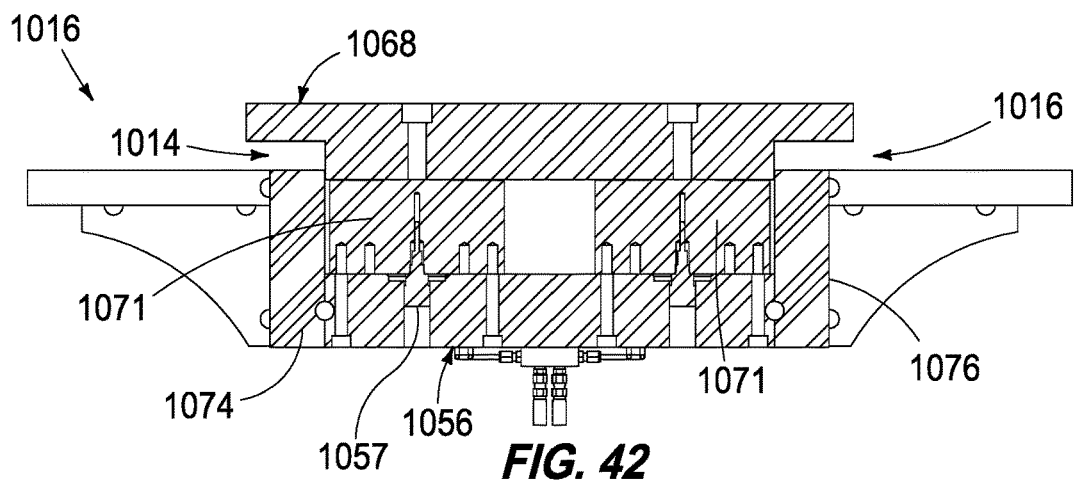
FIG. 42 is a vertical sectional view of the platen taken through line 42-42 of FIG. 40.

FIG. 40 is another optional configuration for a bottom, or lower platen 1016 shown in side view having four spaced apart hydraulic cylinders 1071 (see FIG. 41) configured as discrete loads paths atop a bottom, or back plate 1056 that can be relocated about the top surface of plate 1056 to minimize deformation of a tooling surface on the tooling support plate 1068 of the platen 1016 and also capable of generating a SASH differential load capable of adding extra load (via actuated hydraulic force from cylinders 1071) to counteract detected frame and component deformation, as shown in FIGS. 41 and 42.

FIG. 42 is a vertical sectional view of the platen 1016 taken through line 42-42 of FIG. 40 and showing cylinders 1017 in simplified view each having a linear transducer 1057 for detecting position of extension and retraction for the respective hydraulic cylinder 1071. Side plates 1074 and 1076 are provided on opposite outer edges of back plate 1056. Gaps 1014 and 1016 are shown between tooling support plate 1068 and side plates 1074 and 1076.

Figure 43:
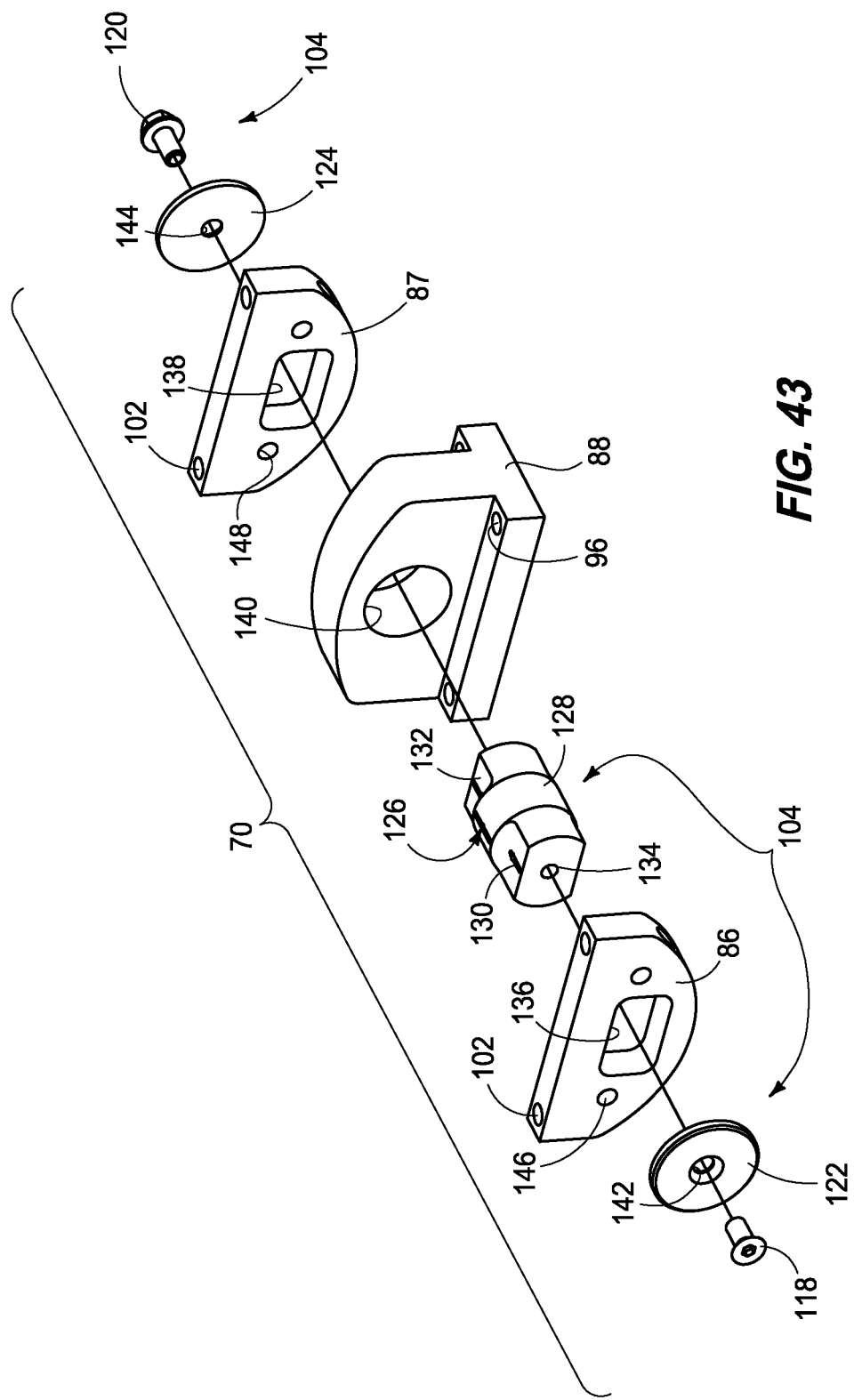
FIG. 43 is a moveable load path assembly having degrees of freedom.

FIG. 43 is a moveable load path assembly 70 having multiple degrees of freedom. More particularly, plates 86 and 87 affix on either side of plate 88 (preferably with a light excess gap). As explained previously, bores 102 and 96 are used to secure plates 86 and 87 and plate 88 to plates 54 (see FIG. 35) and 56 (see FIG. 36). Fastener assembly 104 entraps plate 88 between plates 86 and 87 in assembly. More particularly compound shaft 126 is inserted into cylindrical complementary bore 140 in plate 88 with cylindrical portion 128 seating for rotation in complementary relation within bore 140. Remaining flat portions 130 and 132 fit in lateral sliding relation within complementarily sized elongate through slots 136 and 138 in plates 86 and 87. Each end of compound shaft 126 includes a threaded bore 134 sized to receive one of threaded fasteners, or screws 118 and 120 while entrapping washers 122 and 124 via central holes 142 and 144. According to one construction, shaft '126 is made from case hardened steel. Likewise, brackets 86-88 are made from case hardened steel.

Figure 44:
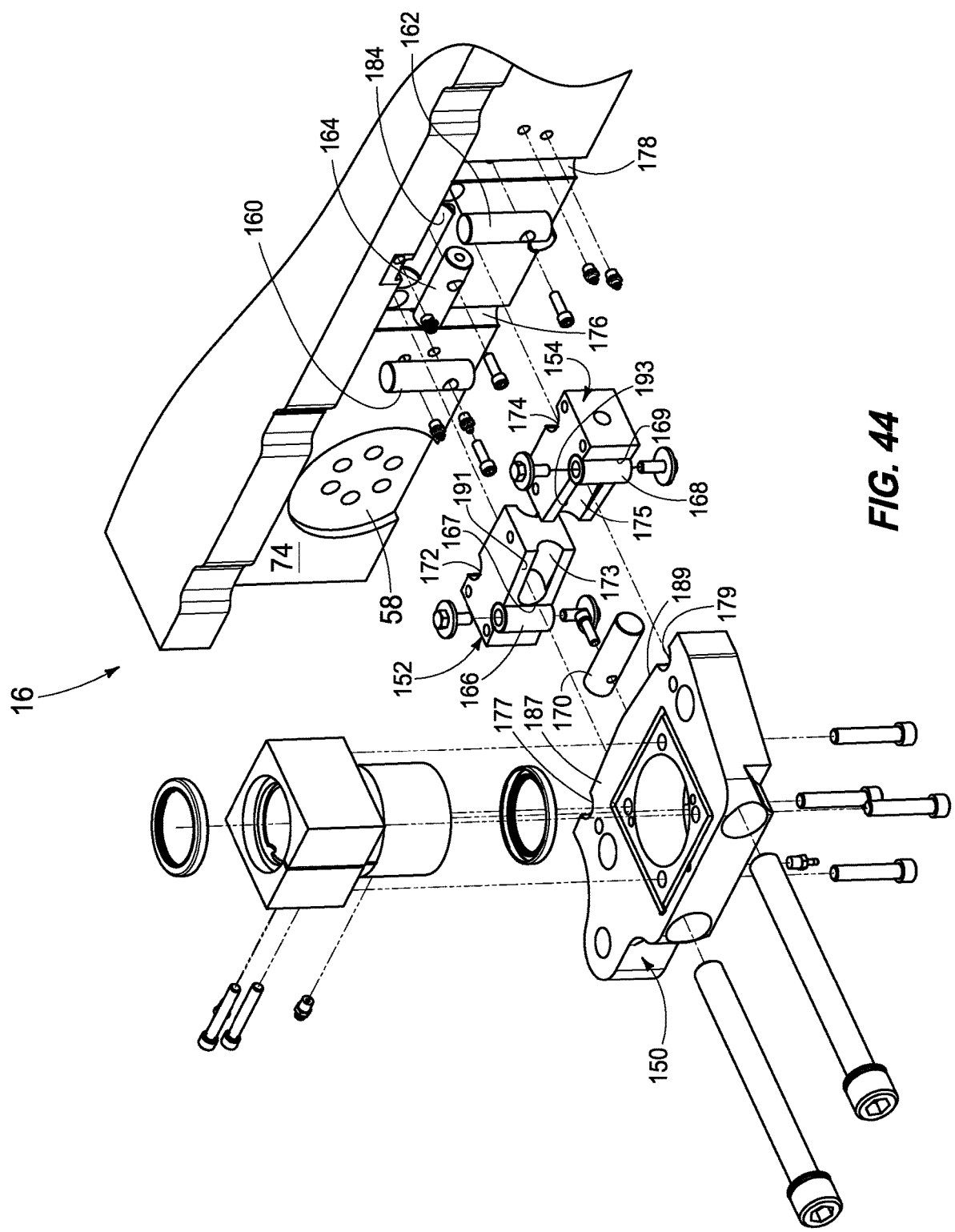
FIG. 44 is a perspective view from above looking inboard of one bushing assembly having a removable platen assembly.

FIG. 44 is a perspective view from above looking inboard of one bushing assembly having a removable platen assembly in the form of a die post alignment plate 150 supporting a busing, or bearing housing 158. Plate 150 affixes with two threaded bolts 151 through plate 150 and wedge blocks 152 and 154 (with through holes) into complementary threaded bores in side plate 74 of platen 16. Such construction is also used for the other side of platen 16. Recessed drive point 58 is also provided in side plate 74. More particularly, a pair of wedge blocks 152 and 154 are accurately affixed between die post alignment plate 150 and side plate 74 of platen 16. An array of hardened pins 166, 168 and 170 are placed in an orientation that precisely repeatedly locates blocks 152 and 154 with plate 150 when repeatedly disassembled and reassembled when changing out die plates on platens 14 and 16. Precisely sized and complementary semi-cylindrical recesses 173, 175, and 179 cooperate with an outer surface of cylindrical pin 170 on assembly. Likewise, cylindrical hardened steel pins 166 and 168 are seated between semi-cylindrical recesses 177, 167 and 179, 169. Edges 187, 189 and 191, 193 are beveled with complementary angles to facilitate disassembly from forming loading to the assembly.

As further shown in FIG. 44, wedge blocks 152 and 154 are precisely and accurately secured in a similar manner to side plate 74 using hardened steel pins 160, 162, and 164. Pin 164 is mated in complementary semi-cylindrical recesses 180, 182 and 184 in wedge blocks 152 and 154 and plate 74, respectively. Pins 160 and 162 are mated in complementary semi-cylindrical recesses 172, 176 and 174, 178, respectively. Threaded fasteners, or bolts are used to secure each pin 160, 162, 164, 166, 168, and 170 either by passing into a counter-bored hole in the pin and into an adjacent recess, or by threading into an end threaded bore at each end of the pin, as shown in FIGS. 44 and 45.

Figure 45:
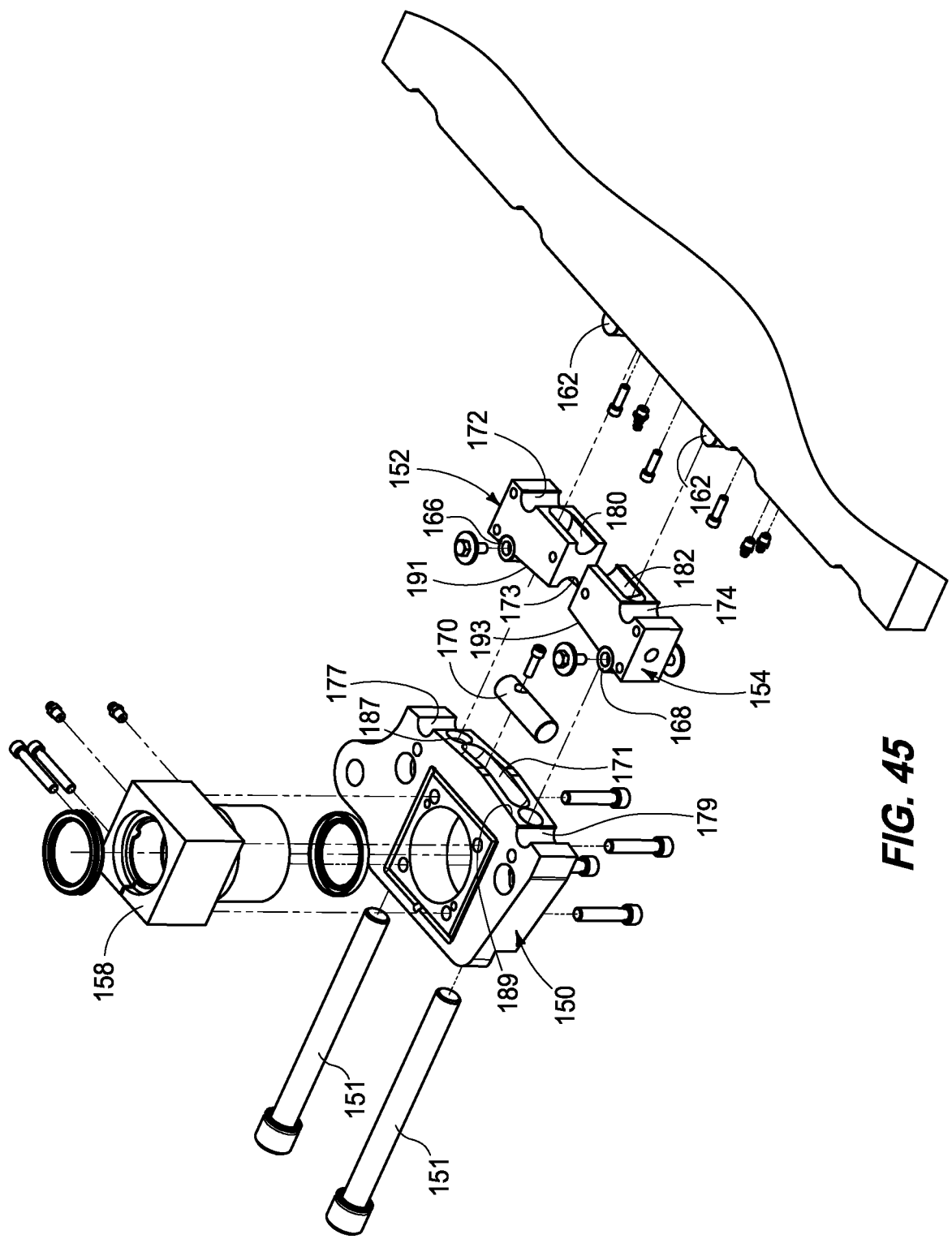
FIG. 45 is a perspective view from above looking outboard of the bushing assembly and removable platen assembly.

FIG. 45 is a perspective view from above looking outboard of the bushing assembly and removable platen assembly further illustrating the position of respective pins and recesses during assembly and disassembly to enable remove of a platen from a thermoforming machine without removing the die post bushings or die posts.

Figure 47:
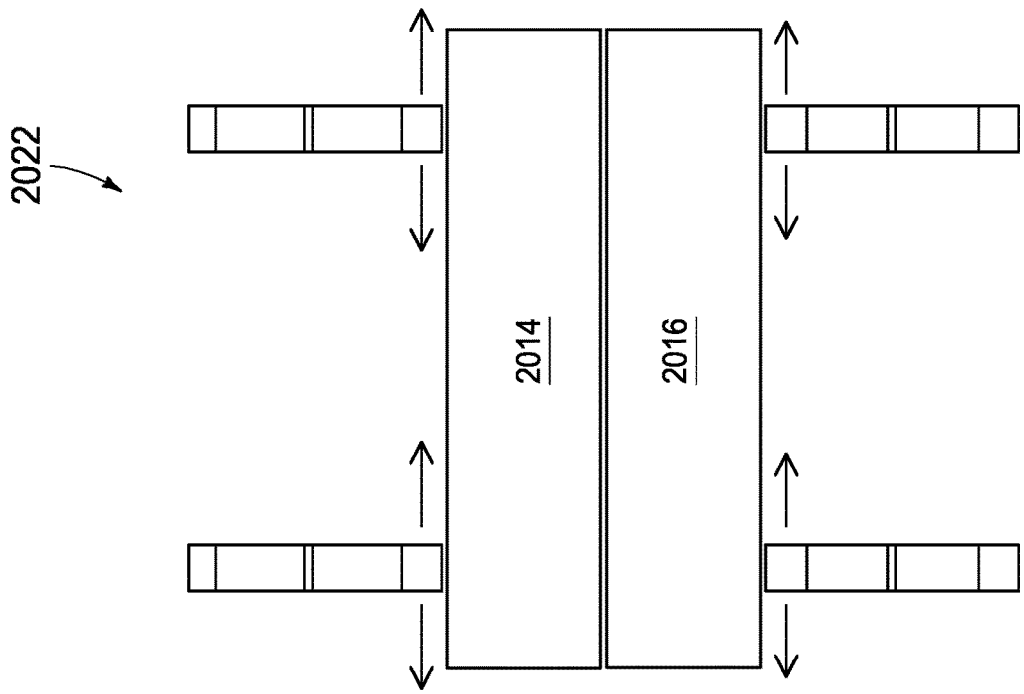
FIG. 47 is the platen and platen drive assembly of FIG. 46 viewed from an upstream end.
Figure 46:
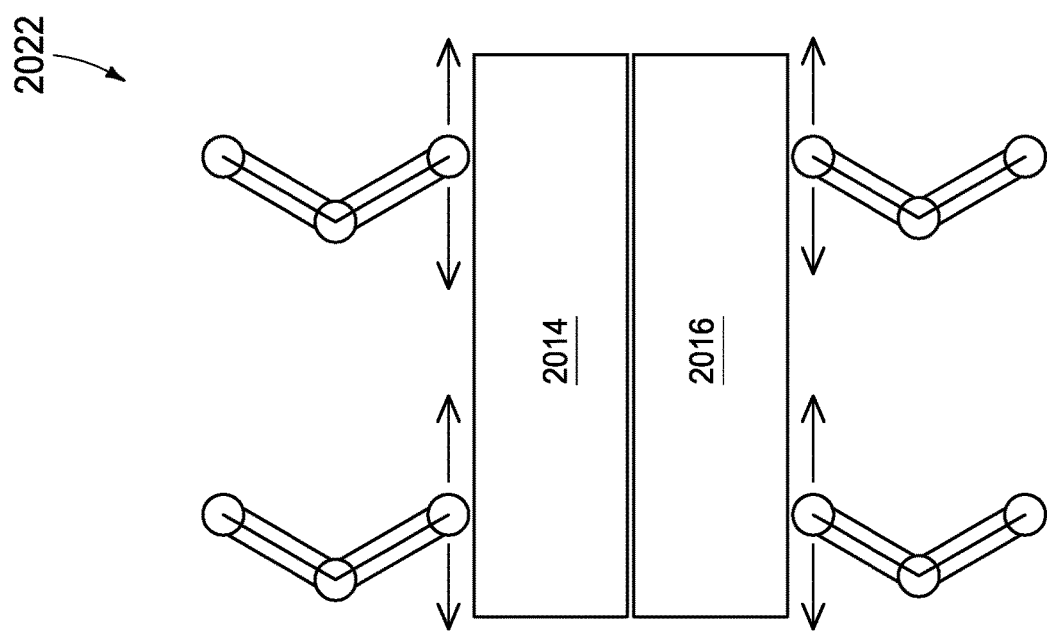
FIG. 46 is a simplified side view of an alternative construction platen and platen drive assembly having drive arms forming movable load paths from both drive assembly to the platens.

FIG. 46 is a simplified side view of an alternative construction platen and platen drive assembly 2022 having drive arms forming movable or adjustably positionable load paths from both drive assemblies to the platens 2014 and 2016. A series of adjustable threaded bores in platens 2014 and 2016 can enable repositioning of the drive assemblies and linkages to the back side of platens 2014 and 2016 in an effort to change to load paths into platens 2014 and 2106 when changing the size/configuration of die plates affixed to platens 2014 and 2016 in order to maximize resulting flatness at the die plate contact surfaces and the tooling surface of platens 2014 and 2016. FIGS. 46 and 47 show adjustable positioning of the platen drive arms and linkages in both the side and end views corresponding with the X-axis and the Y-axis. Instead of using an array of threaded bores on each platen, guide tracks can also be used to adjust position of the load paths engaging platens 2014 and 2016.

FIG. 47 is the platen and platen drive assembly of FIG. 46 viewed from an upstream end.

Figure 48:
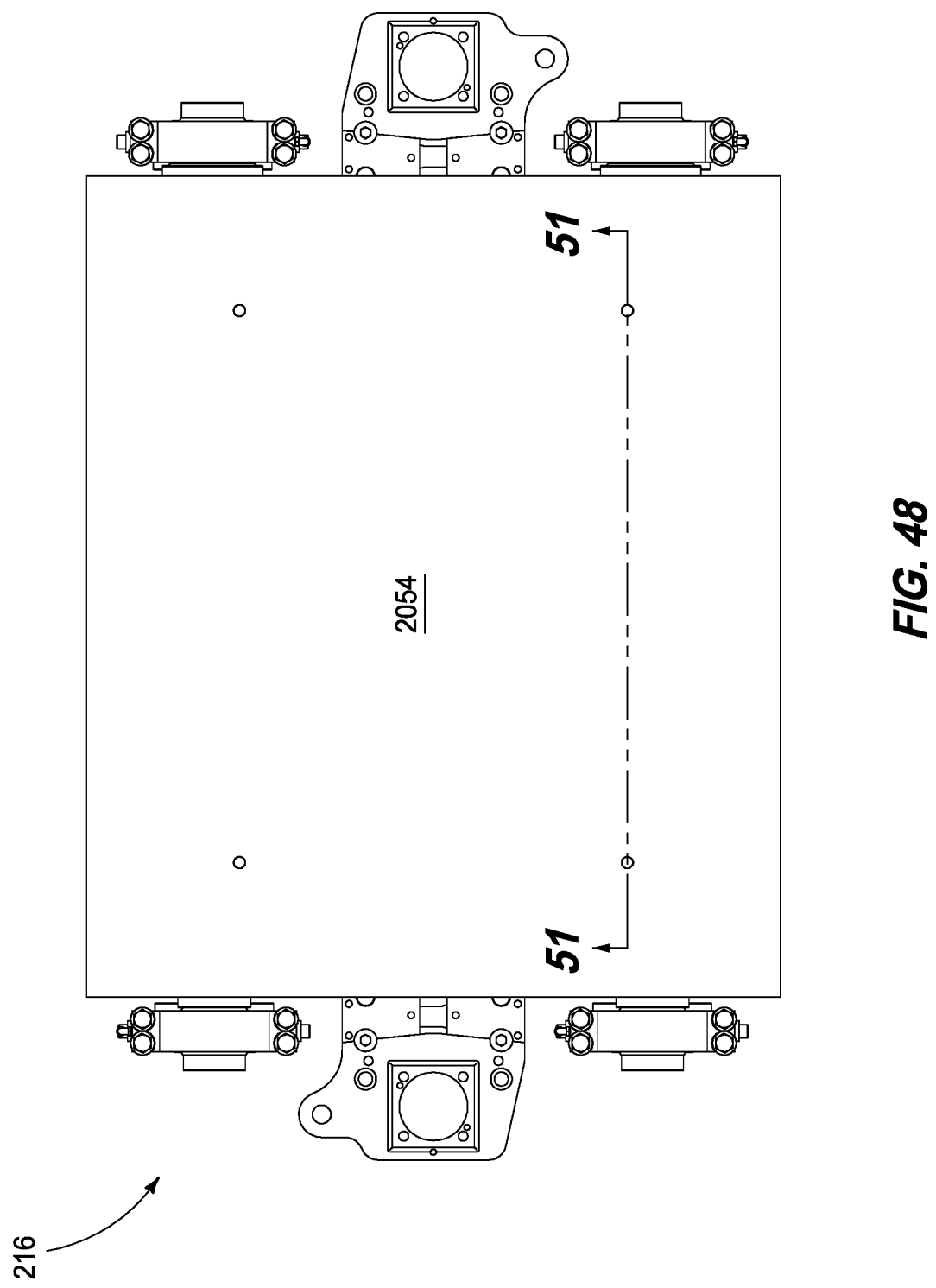
FIG. 48 is a plan view from above of an optional lower platen usable with a mirror image upper platen on the thermoforming machine of FIG. 1.
Figure 53:
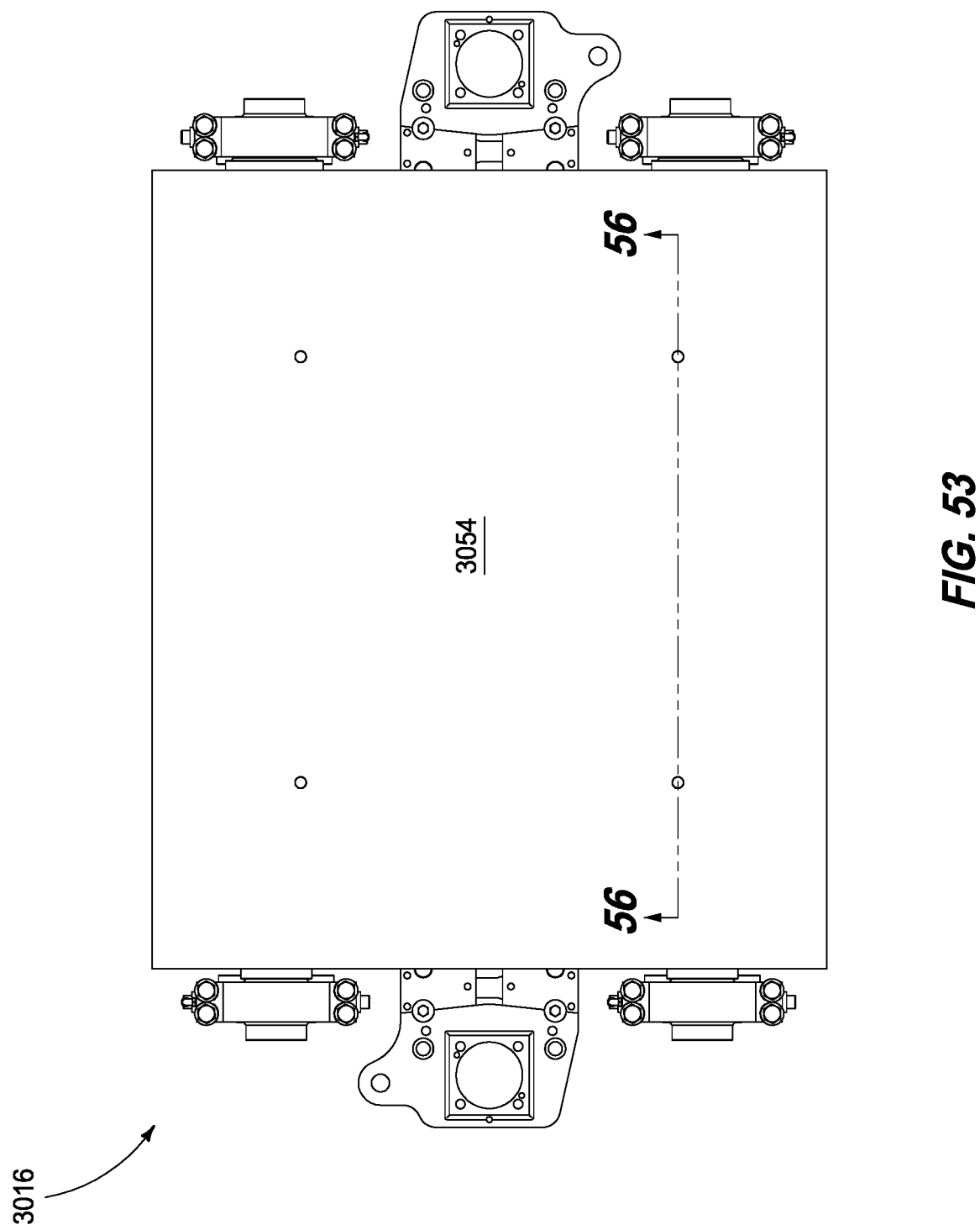
FIG. 53 a plan view from above of a further optional lower platen than shown in FIG. 48 usable with a mirror image upper platen on the thermoforming machine of FIG. 1.

FIG. 48 is a plan view from above of an optional lower platen 2016 usable with a mirror image upper platen on the thermoforming machine of FIG. 1. More particularly, a tooling support plate 3054 is shown in FIG. 53.

Figure 49:
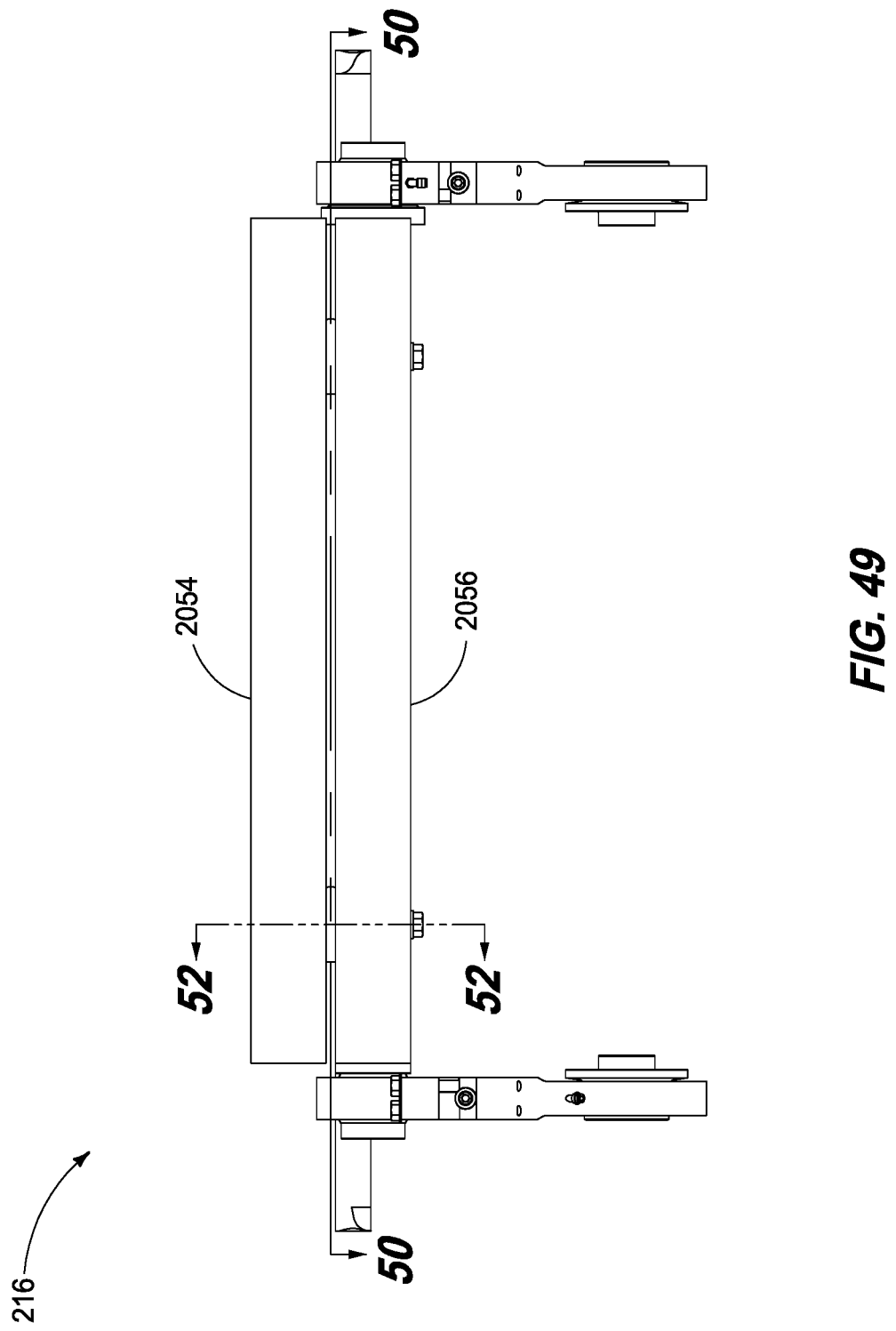
FIG. 49 is an upstream end view of the lower platen of FIG. 48.

As shown in FIG. 49, top tooling support plate 2054 of lower platen 2016 is affixed atop a back plate 2056 which is drive by four drive arms 46 (see FIG. 4).

Figure 50:
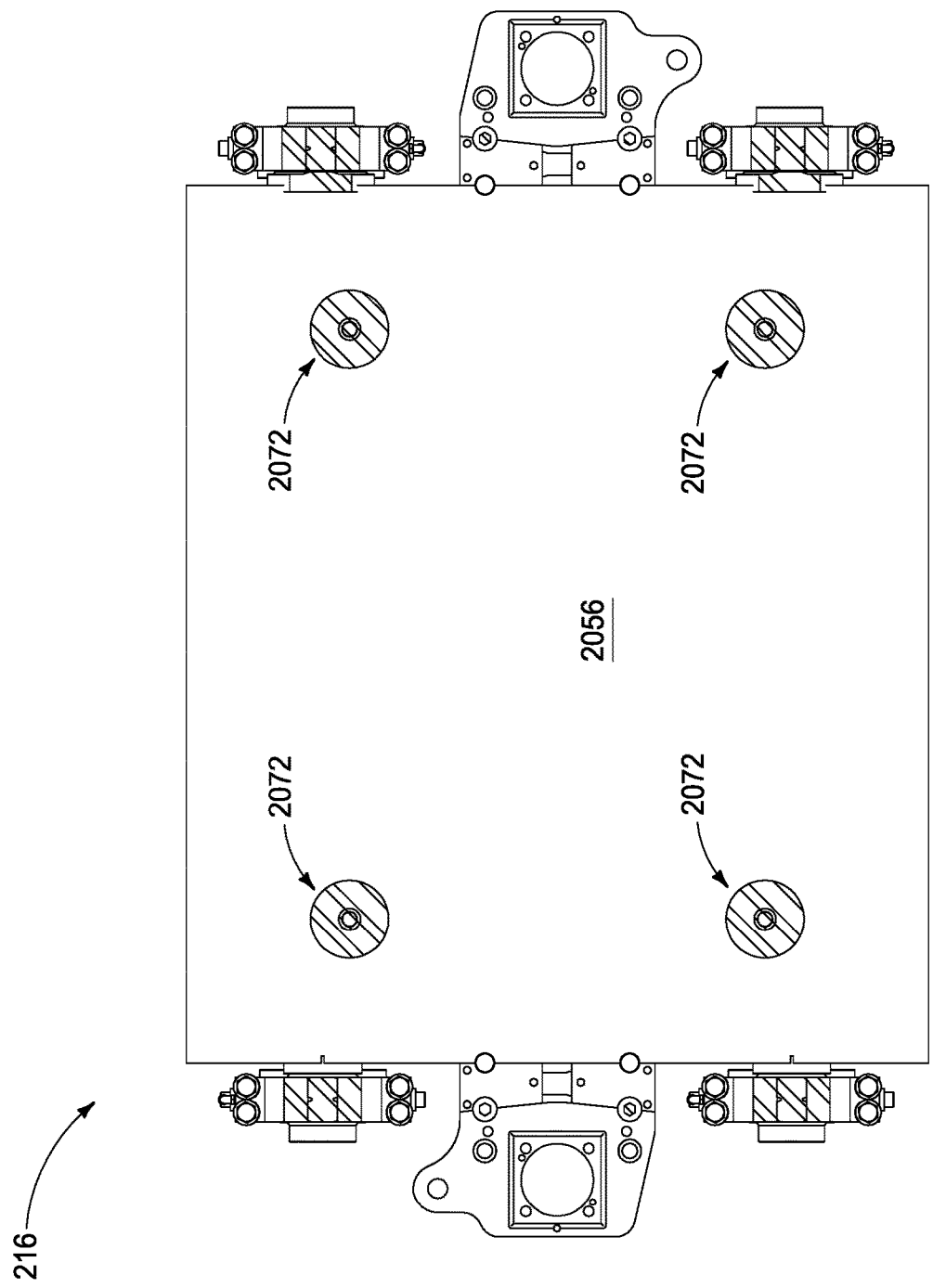
FIG. 50 is a plan view from above taken alone line 50-50 of FIG. 49.
Figure 54:
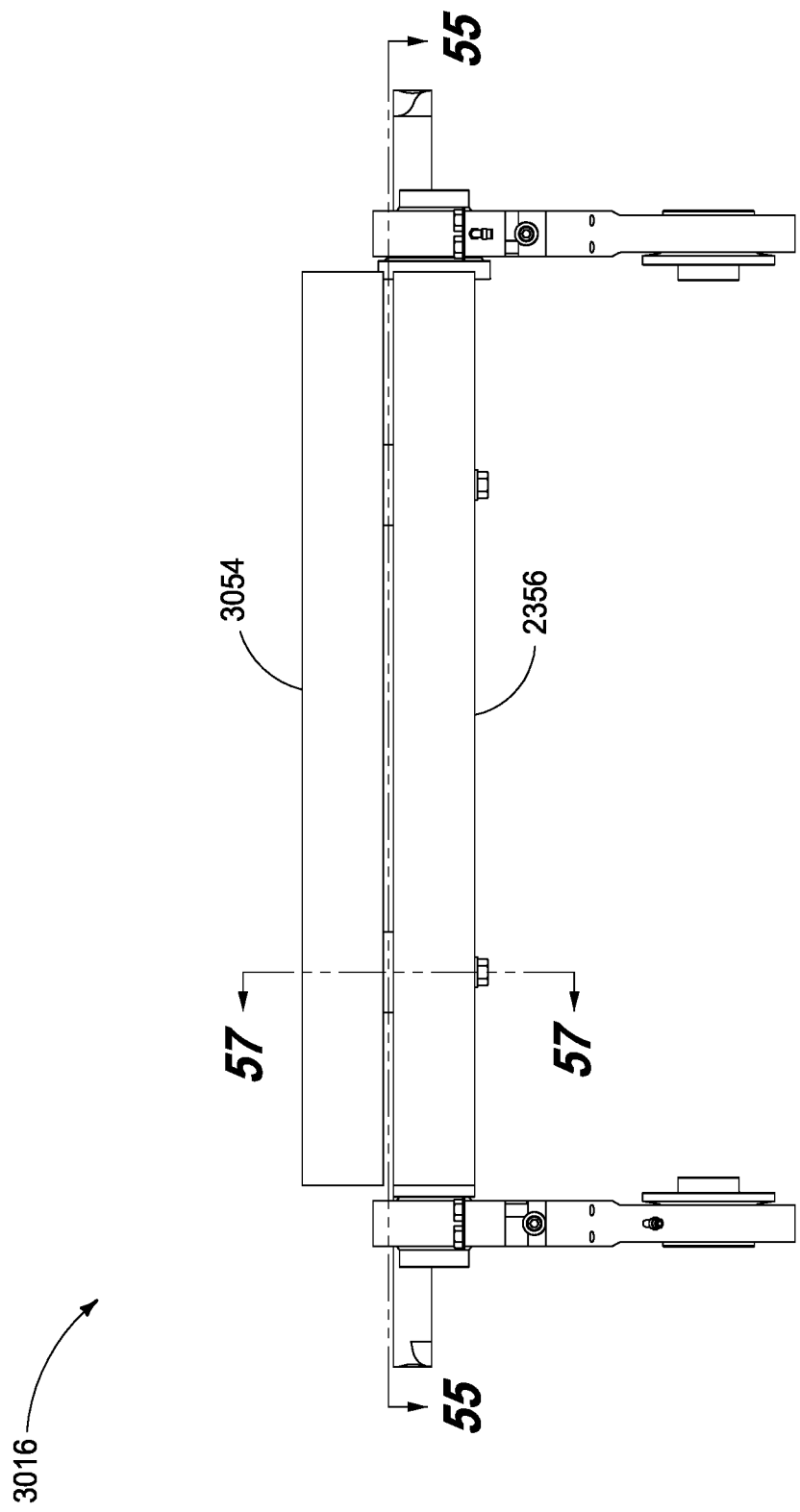
FIG. 54 is an upstream end view of the lower platen of FIG. 53.

FIG. 50 shows the position of four spaced apart load paths, or legs 2072 on lower platen 2016 that are spaced inboard from an outer periphery of plate 2056 and plate 2054 (see FIG. 54). Although each are shown in a single position on plate 2072, it is understood that optionally a square or linear array of spaced apart semicircular recesses can be provided for in each plate 2054 and 2056 (see FIG. 49) so that the load paths 2072 can be moved inboard an outboard as different sized tooling is mounted to tooling support plate 2054 (and the corresponding tooling support plate provided on the mating respective upper platen).

Figure 51:
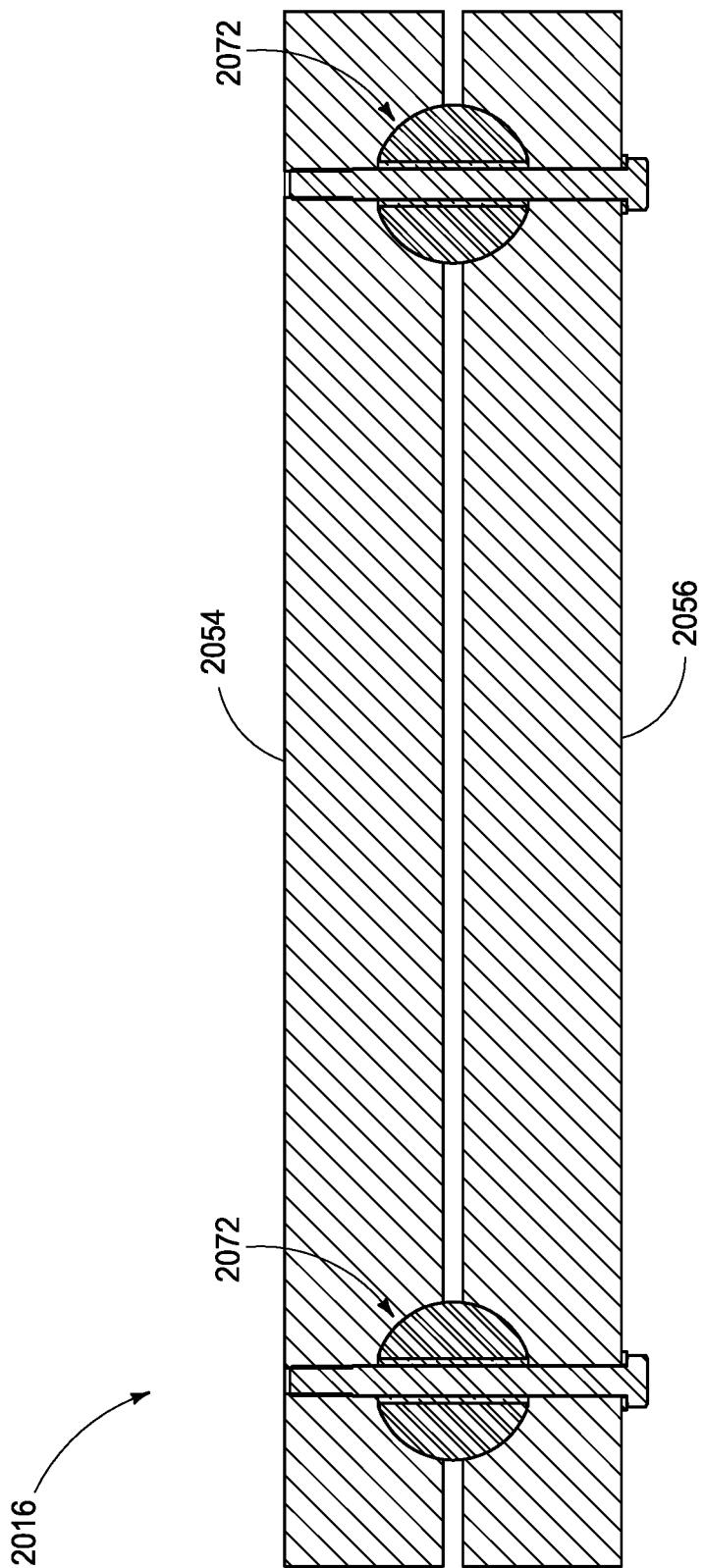
FIG. 51 is a vertical sectional view taken along line 51-51 of FIG. 48.

FIG. 51 is a vertical sectional view showing in detail two of the load paths 2072 on lower platen 2016. More particularly, each load path, or leg 2072 is affixed between tolling support plate 2054 and back plate 2056 in a manner that fixes lateral and vertical motion while providing torsional freedom that enables localized plate bending to limit transfer of torque, or bending loads between such plates 2054 and 2056 during forming load transmission through the plates. The reduction or elimination of bending load transfer simplifies and limits the elastic deformation modes transferred to tooling plate 2054 so as to provide a flatter and more even tooling and die support surface which ensures better fit-up between mating surfaces on a pair of die plates. The inboard location of load paths 2027 is placed approximately 12-25 percent inboard (compared to total width or depth dimension from an outer peripheral edge of the tooling plate), and optimally in one case to 23 percent on the legs of FIGS. 4 and 16 percent on the legs of FIG. 51.

Figure 52:
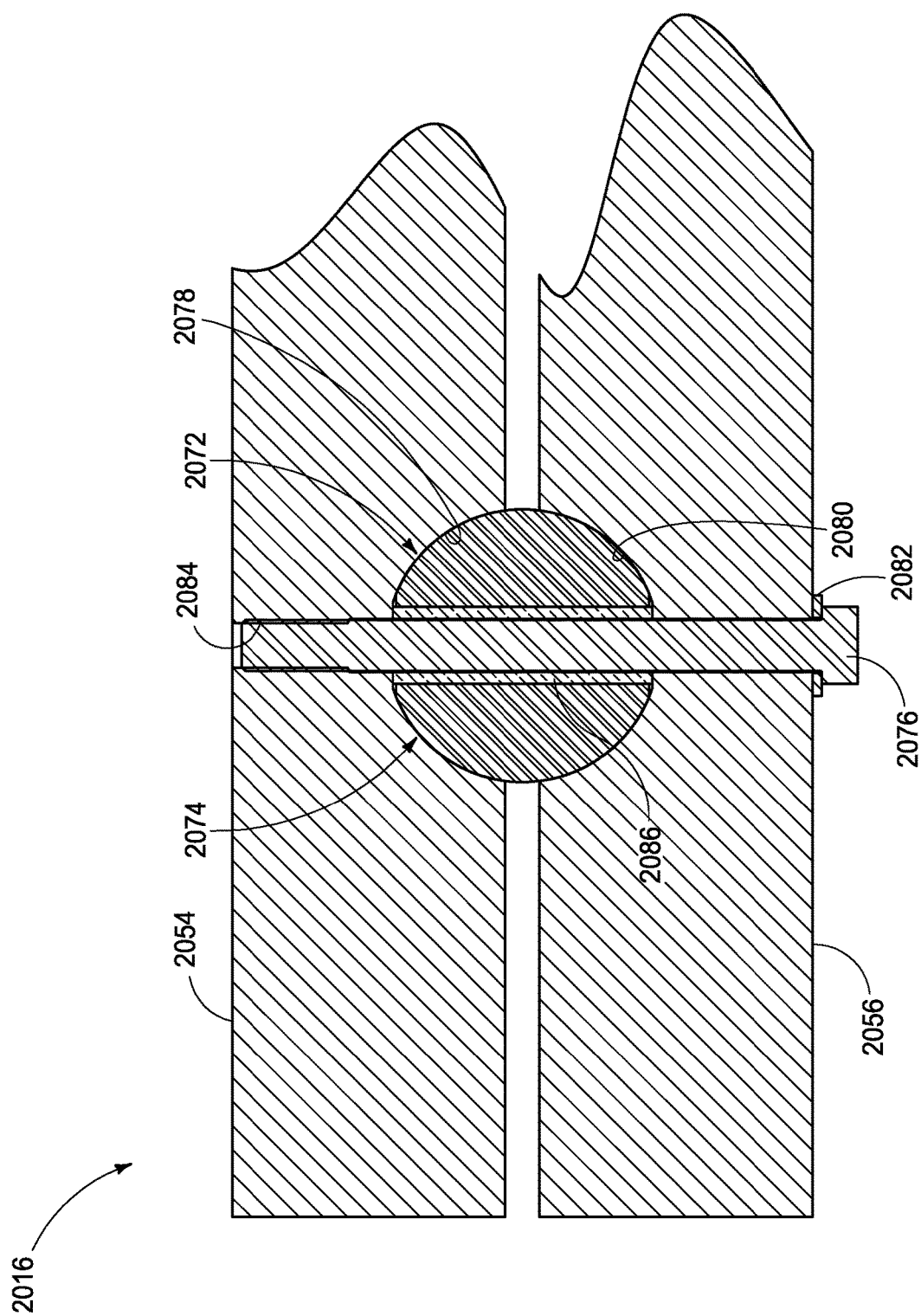
FIG. 52 is a partial vertical sectional view taken along line 52-52 of FIG. 49.

FIG. 52 is an enlarged partial vertical sectional view through one of the legs, or discrete load paths 2072 on bottom platen 2016 provided between tooling support plate 2054 and back plate 2056. Each load path, or leg 2072 includes a 4-inch diameter hardened steel ball bearing, or steel sphere 2074 fitted between a pair of complementary semi-spherical recesses, or pockets 2078 and 2080 in plates 2054 and 2056, respectively, and depth sized to provide a gap between plates 2054 and 2056 to prevent direct coupling of adjacent surfaces for any load transfer. In high load environments, sphere 2074 can be 6-8 inches in diameter. A hardened threaded steel bolt 2076 extends through a washer 2082, a bore in plate 2056, a center bore in ball bearing, or sphere 2074, and into a threaded bore 2084 in plate 2054. Bolt 2076 holds together plates 2054 and 2056 while entrapping and centering ball bearing 2074 within recesses 2072 and 2080 such that leg 2072 provides both a discrete load path and a lateral centering mechanism between plates 2054 and 2056. Furthermore, an elastically deformable cylindrical steel bushing 2086 is provided within ball bearing 2074 having a clearance fit with the recesses 2078 and 2080 and bolt 2076 to accommodate limited degrees of freedom of motion in assembly and limited rotational freedom during forming load-induced deformation. In assembly and under forming loads, it is understood that bolt 2076 can bend slightly while still retaining together plates 2054 and 2056 via axial loading there between.

FIG. 53 is a plan view from above of an optional lower platen 3016 usable with a mirror image upper platen on the thermoforming machine of FIG. 1 and similar to lower platen 2016 of FIG. 48. More particularly, a tooling support plate 3054 is shown in FIG. 53.

As shown in FIG. 54, top tooling support plate 3054 of lower platen 3016 is affixed atop a back plate 3056 which is drive by four drive arms 46 (see FIG. 4).

Figure 55:
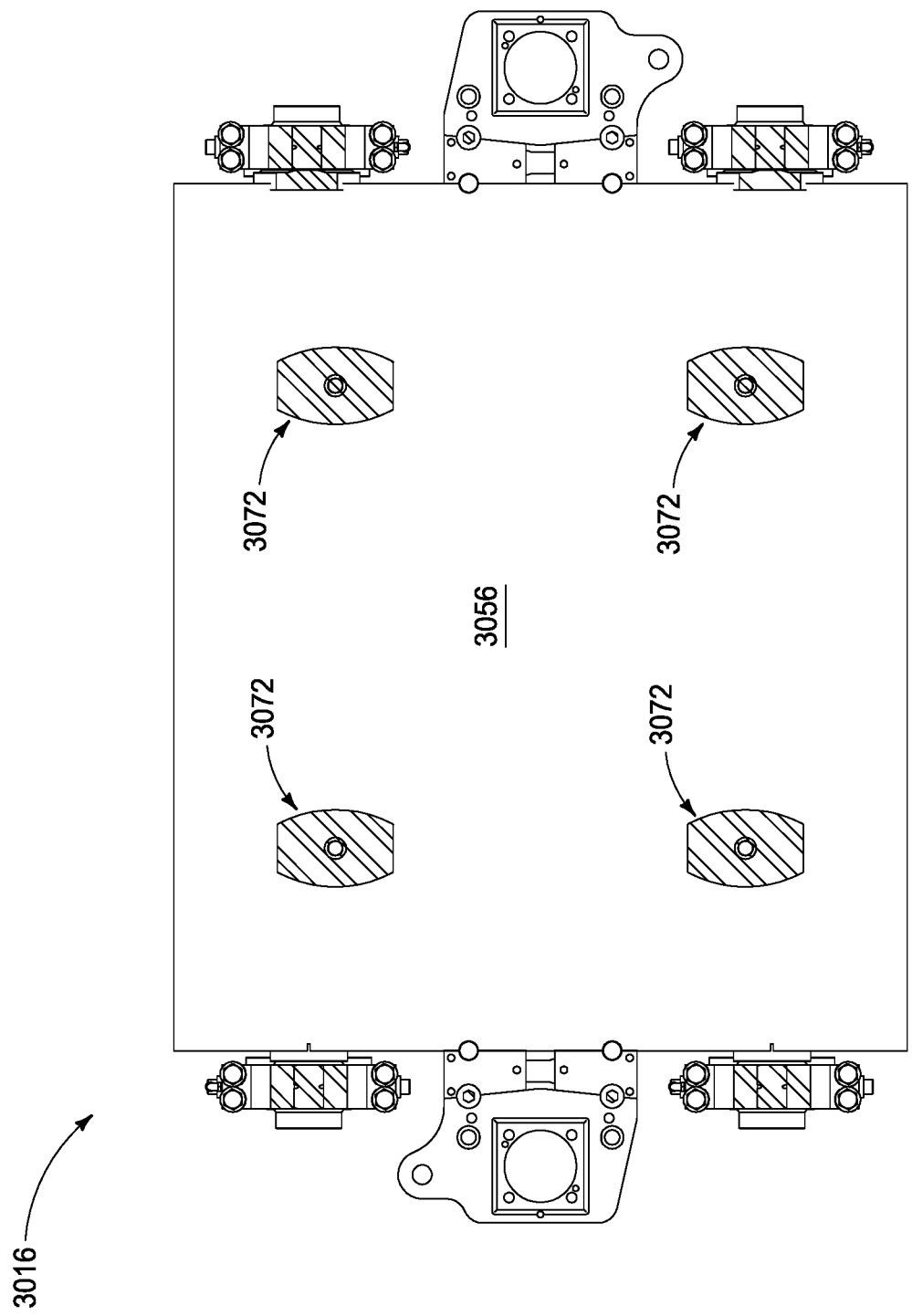
FIG. 55 is a plan view from above take alone line 55-55 of FIG. 54.

FIG. 55 shows the position of four spaced apart load paths, or legs 3072 on lower platen 3016 that are spaced inboard from an outer periphery of plate 3056 and plate 3054 (see FIG. 54). Although each are shown in a single position on plate 3072, it is understood that optionally a square, linear, or other suitable geometric array of spaced apart semicircular recesses can be provided for in each plate 3054 and 3056 (see FIG. 37 adjustment concept) so that the load paths 3072 can be moved inboard an outboard as different sized tooling is mounted to tooling support plate 3054 (and the corresponding tooling support plate provided on the mating respective upper platen).

Figure 56:
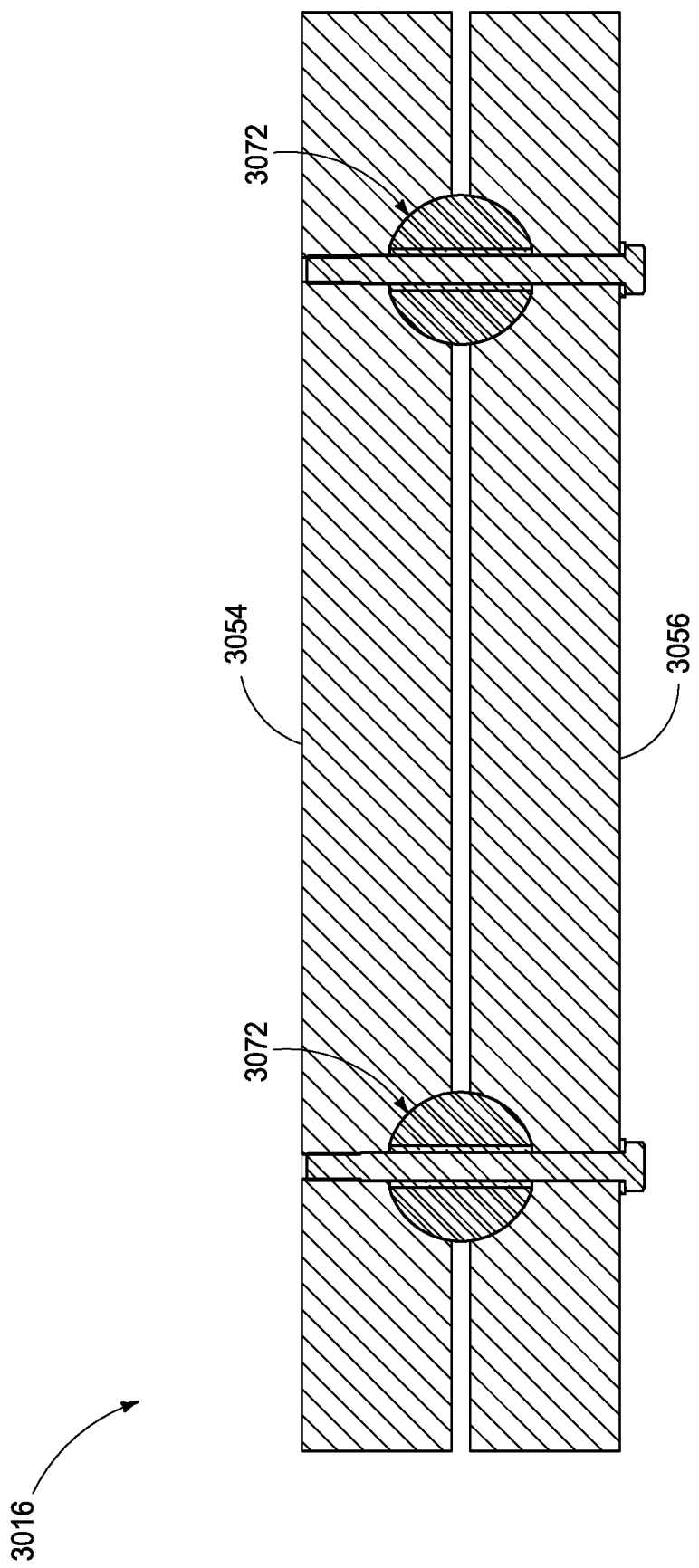
FIG. 56 is a vertical sectional view taken along line 56-56 of FIG. 53.

FIG. 56 is a vertical sectional view showing in detail two of the load paths 3072 on lower platen 3016. More particularly, each load path, or leg 3072 is affixed between tooling support plate 3054 and back plate 3056 in a manner that fixes lateral and vertical motion while providing torsional freedom that enables localized plate bending to limit transfer of torque, or bending loads, between such plates 3054 and 3056 during forming load transmission through the plates. The reduction or elimination of bending load transfer simplifies and limits the elastic deformation modes transferred to tooling plate 3054 so as to provide a flatter and more even tooling and die support surface which ensures better fit-up between mating surfaces on a pair of die plates. The inboard location of load paths 3072 is placed approximately 12-25 percent inboard (compared to total width or depth dimension from an outer peripheral edge of the tooling plate), and optimally in one case to 23 percent on the legs of FIGS. 4 and 16 percent on the legs of FIG. 55.

Figure 57:
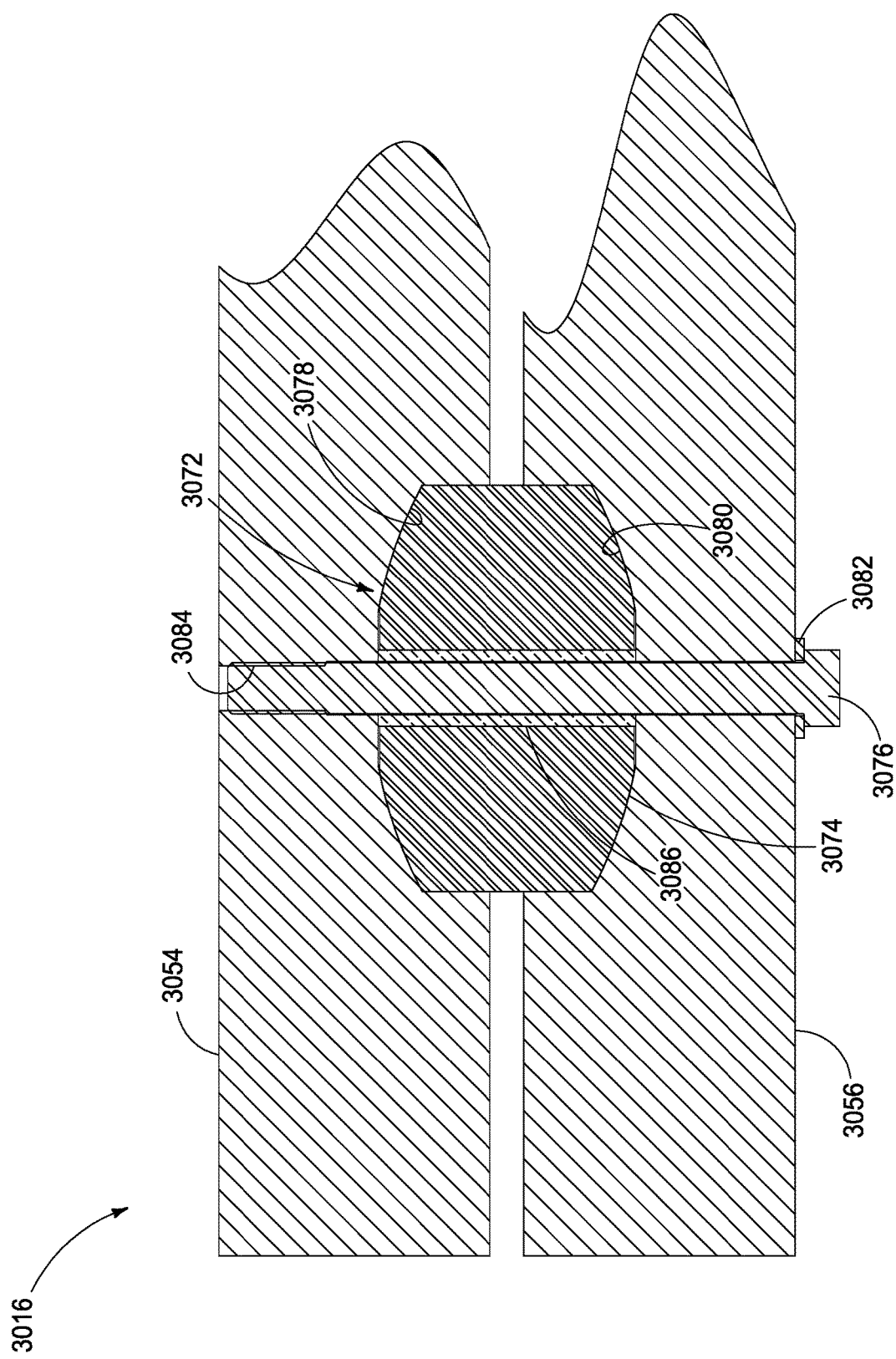
FIG. 57 is a partial vertical sectional view taken along line 57-57 of FIG. 54.

FIG. 57 is an enlarged partial vertical sectional view through one of the legs, or discrete load paths 3072 on bottom platen 3016 provided between tooling support plate 3054 and back plate 3056. Each load path, or leg 3072 includes a hardened self-aligning steel roller bearing, or steel tapered barrel 3074 fitted between a pair of complementary semi-spherical recesses, or pockets 3078 and 3080 in plates 3054 and 3056, respectively, and depth sized to provide a gap between plates 3054 and 3056 to prevent direct coupling of adjacent surfaces for any load transfer. In high load environments, roller bearing 3074 can be 6-8 inches in length, or greater. A hardened threaded steel bolt 3076 extends through a washer 3082, a bore in plate 3056, a center bore in roller bearing 3074, and into a threaded bore 3084 in plate 3054. Bolt 3076 holds together plates 3054 and 3056 while entrapping and centering roller bearing 3074 within recesses 3072 and 3080 such that leg 3072 provides both a discrete load path and a lateral centering mechanism between plates 3054 and 3056. Furthermore, an elastically deformable cylindrical steel bushing 3086 is provided within roller bearing 3074 having a clearance fit with the recesses 3078 and 3080 and bolt 3076 to accommodate limited degrees of freedom of motion in assembly and limited rotational freedom during forming load-induced deformation. In assembly and under forming loads, it is understood that bolt 3076 can bend slightly while still retaining together plates 3054 and 3056 via axial loading there between.

Figure 58:
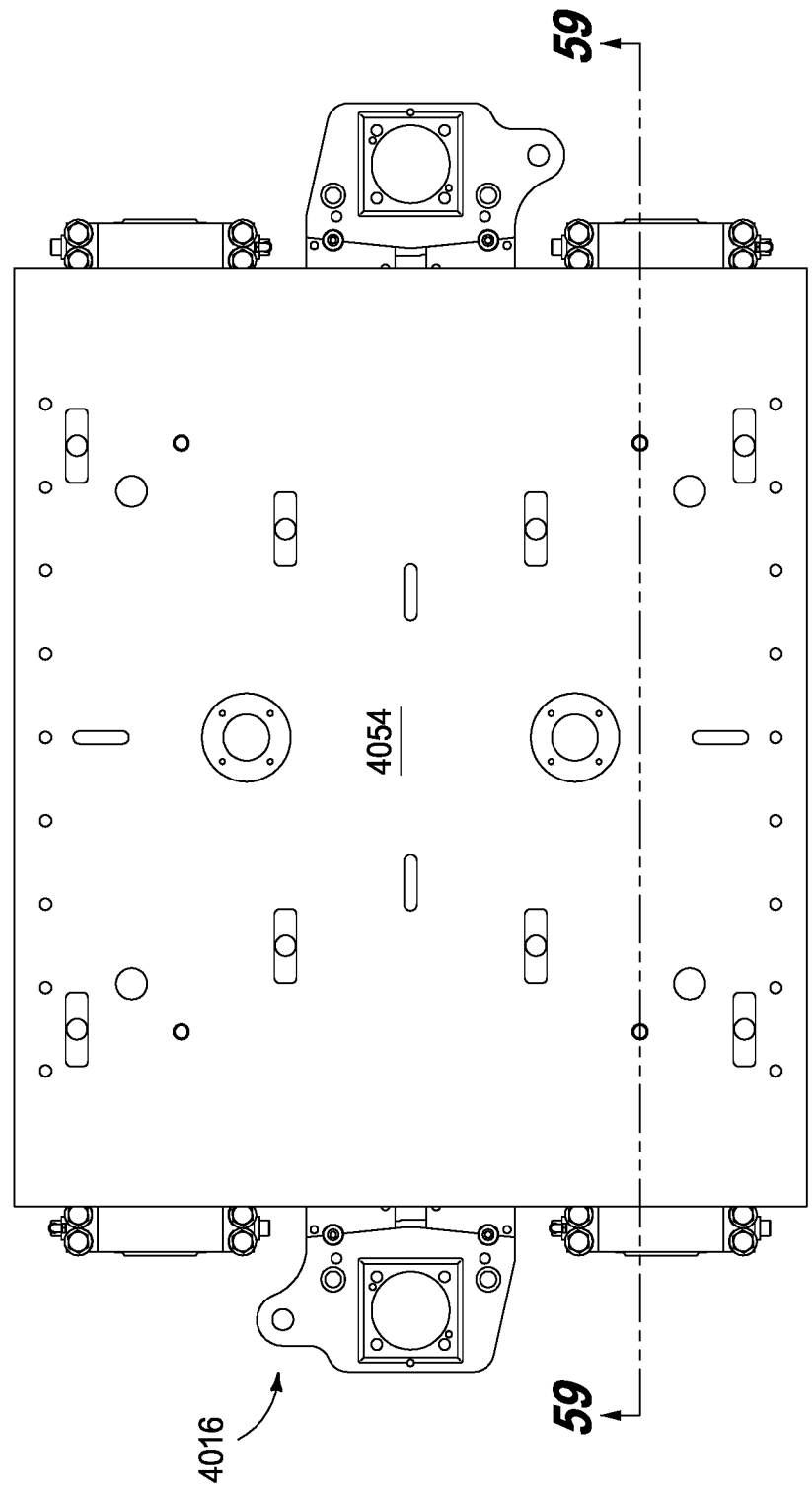
FIG. 58 is a plan view from above of yet even another optional lower platen usable with a mirror image upper platen on the thermoforming machine of FIG. 1.

FIG. 58 is a plan view from above of yet even another optional lower platen 3016 usable with a mirror image upper platen on the thermoforming machine of FIG. 1 and similar to lower platen 2016 of FIG. 48. More particularly, a tooling support plate 4054 is shown in FIG. 58.

Figure 59:
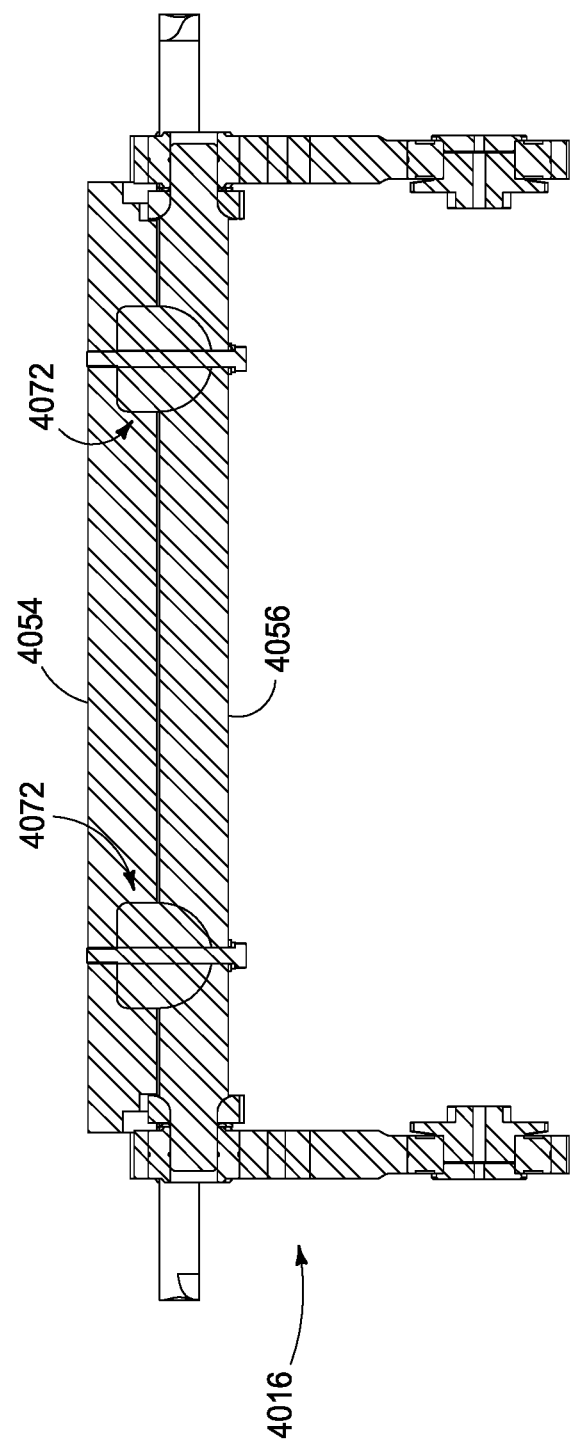
FIG. 59 is a vertical sectional view taken along line 59-59 of FIG. 58.

FIG. 59 is a vertical sectional view taken along line 59-59 of FIG. 58 showing in detail two of the load paths 4072 on lower platen 4016. More particularly, each load path, or leg 4072 is affixed between tooling support plate 4054 and back plate 4056 in a manner that fixes lateral and vertical motion while providing torsional freedom that enables localized plate bending to limit transfer of torque, or bending loads, between such plates 4054 and 4056 during forming load transmission through the plates. The reduction or elimination of bending load transfer simplifies and limits the elastic deformation modes transferred to tooling plate 4054 so as to provide a flatter and more even tooling and die support surface which ensures better fit-up between mating surfaces on a pair of die plates. The inboard location of load paths 4027 is placed approximately 12-25 percent inboard (compared to total width or depth dimension from an outer peripheral edge of the tooling plate), and optimally in one case to 23 percent on the legs of FIG. 4 and 16 percent on the legs of FIG. 61.

Figure 60:
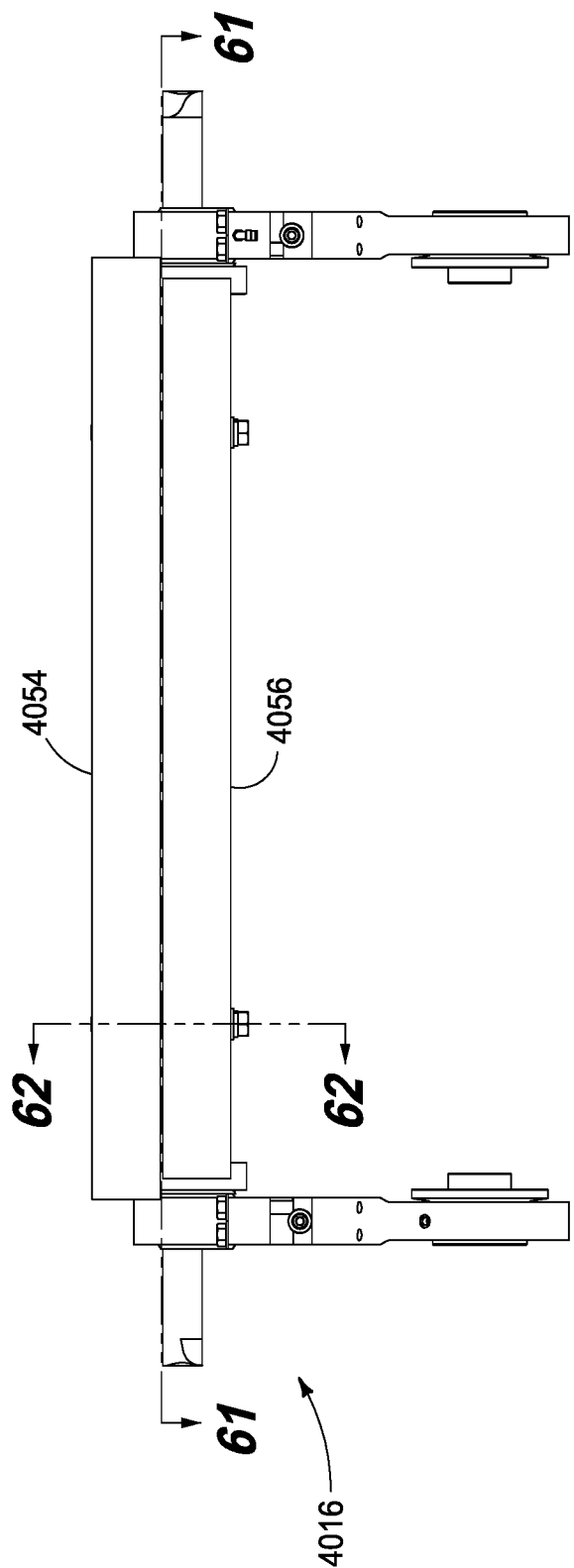
FIG. 60 is an upstream end view of the lower platen of FIG. 58.

As shown in FIG. 60, top tooling support plate 4054 of lower platen 4016 is affixed atop a back plate 4056 which is drive by four drive arms 46 (see FIG. 4).

Figure 61:
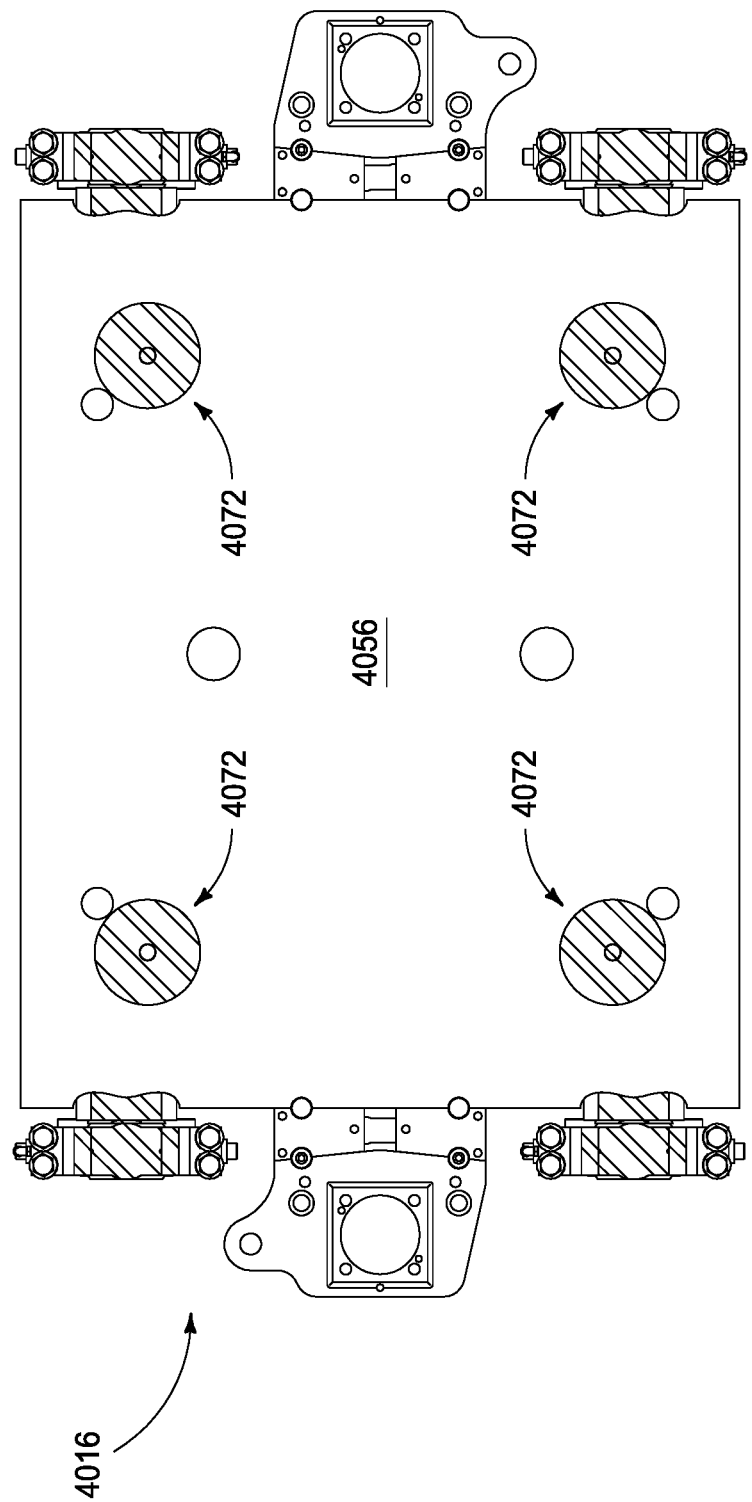
FIG. 61 is a plan view from above taken alone line 61-61 of FIG. 60.

FIG. 61 shows the position of four spaced apart load paths, or legs 4072 on lower platen 4016 that are spaced inboard from an outer periphery of plate 4056 and plate 4054 (see FIG. 60). Although each are shown in a single position on plate 4072, it is understood that optionally a square, linear, or other suitable array of spaced apart semicircular recesses can be provided for in each plate 4054 and 4056 (see FIG. 37 adjustment concept) so that the load paths 4072 can be moved inboard an outboard as different sized tooling is mounted to tooling support plate 4054 (and the corresponding tooling support plate provided on the mating respective upper platen)

Figure 62:
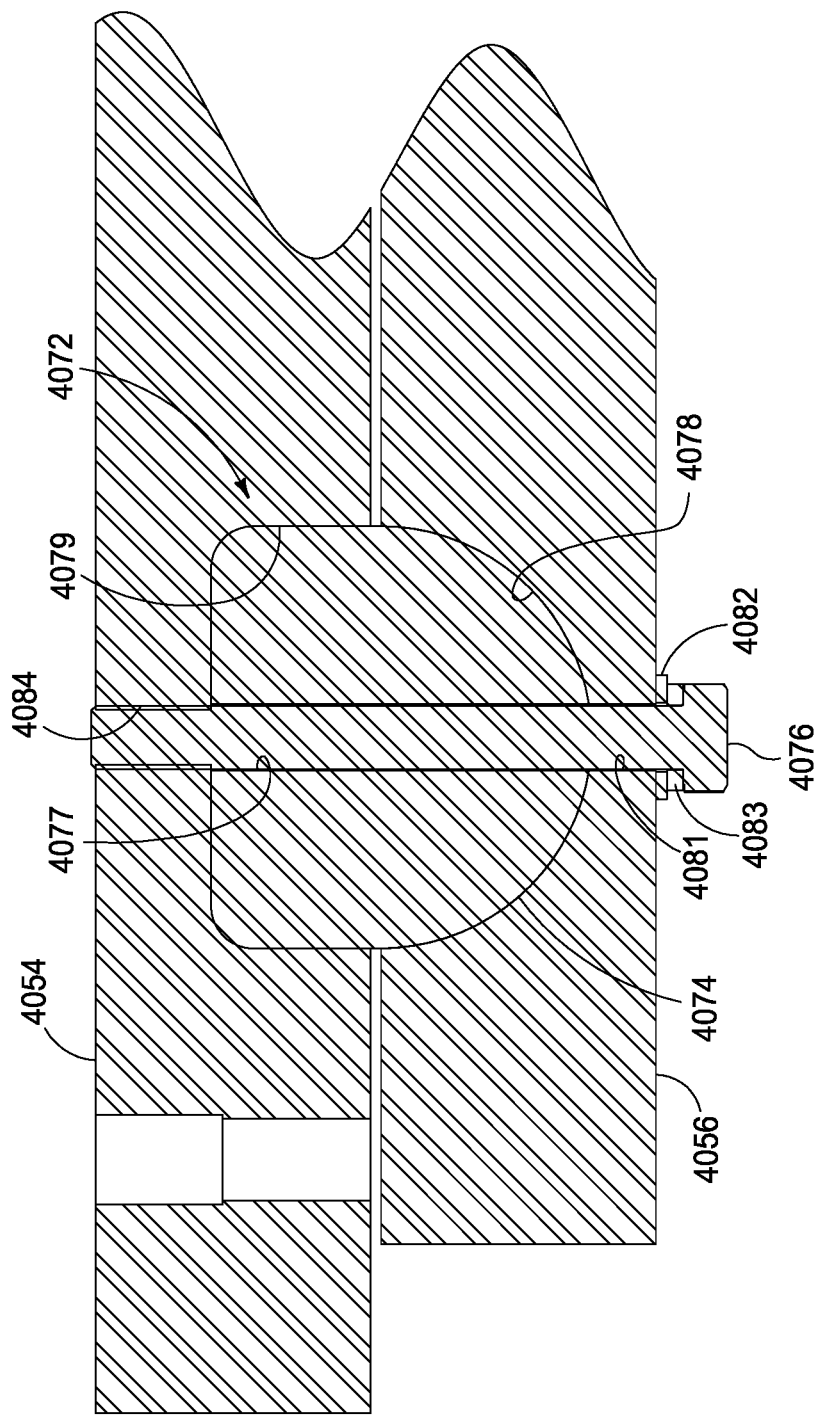
FIG. 62 is a partial vertical sectional view taken along line 62-62 of FIG. 60.

FIG. 62 is an enlarged partial vertical sectional view through one of the legs, or discrete load paths 4072 on bottom platen 4016 provided between tooling support plate 4054 and back plate 4056. Each load path, or leg 4072 includes a hardened self-aligning steel spherical headed bearing, or steel spherical headed plug body 4074 fitted between a pair of complementary semi-spherical recesses, or pockets 4079 and 4078 in plates 4054 and 4056, respectively, and depth sized to provide a gap between plates 4054 and 4056 to prevent direct coupling of adjacent surfaces for any load transfer. In high load environments, spherical headed bearing 4074 can be 6-8 inches in width across the spherical head, or greater. A hardened threaded steel bolt 4076 extends through a lock washer 4083, a washer 4082, a bore 4081 in plate 4056, a center bore 4077 in spherical headed bearing 4074, and into a threaded bore 4084 in plate 4054. Bolt 4076 holds together plates 4054 and 4056 while entrapping and centering spherical headed bearing 4074 within recesses 4072 and 4080 such that leg 4072 provides both a discrete load path and a lateral centering mechanism between plates 4054 and 4056 with pivotal movement of the spherical head on bearing 4074 within complementary spherical recess 4078 to accommodate limited degrees of freedom of motion in assembly and limited rotational freedom during forming load-induced deformation. In assembly and under forming loads, it is understood that bolt 4076 can bend slightly while still retaining together plates 4054 and 4056 via axial loading there between.

It is understood that the designs of FIGS. 48-61 enable realization of a lower total stack height by reducing stack height of a two-plate construction for a lower platen and an upper platen over the load paths provided by the earlier designs of FIGS. 1-47.

While the subject matter of this application was motivated in addressing flatness and sealing between die plates when forming using high forming loads, such as loads generated when using forming pressure, or air to help form articles during a thermoforming operation, it is in no way so limited. The disclosure is only limited by the accompanying claims as literally worded, without interpretative or other limiting reference to the specification, and in accordance with the doctrine of equivalents.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. A thermoforming platen, comprising:
 a tooling support plate having a top tooling surface, a bottom surface, and an outer periphery;
 a back plate having at least one drive arm mount, the back plate carried in spaced-apart relation relative to the tooling support plate; and
 a plurality of discrete axially extending and torsionally decoupled load legs comprising a spherical headed plug body configured to mate with a complementary semi-spherical recess provided in one of the tooling support plate and the back plate extending between the tooling support plate and the back plate in spaced-apart relation about the bottom surface of the tooling support plate with one or more external load sources configured to provide at least two degrees of freedom and operative to distribute and centralize load deformation of the tooling support plate from forming loads, the plurality of load legs provided laterally inboard of an outer periphery of the top tooling surface at one of a plurality of inboard locations to impart minimized tooling surface deformation along the top plate tooling surface.

2. The thermoforming platen of claim 1, wherein one of a plurality of the drive arm mounts is coupled with a drive arm/linkage affixed at one of a plurality of locations to the back plate.

3. The thermoforming platen of claim 1, wherein the tooling support plate comprises a top plate, further comprising the back plate having a top surface, a bottom surface and an outer periphery, and the plurality of load legs configured to extend between the bottom surface of the tooling support plate and the top surface of the back plate.

4. The thermoforming platen of claim 3, wherein a plurality of drive mounts is provided about the outer periphery of the bottom plate, and the plurality of discrete load legs interconnect the top plate bottom surface with the bottom plate top surface in spaced apart relation to distribute and centralize load deformation of the top plate from tooling loads.

5. The thermoforming platen of claim 1, wherein a plurality of discrete load paths are arranged substantially equally spaced apart between the tooling support plate and the back plate.

6. A thermoforming platen, comprising:
 a tooling support plate having a top tooling surface, a bottom surface, and an outer periphery;
 a back plate carried in space apart relation from the tooling support plate and having at least one drive arm mount; and
 a plurality of load legs provided about the bottom surface repositionable between one of a plurality of locations between the tooling support plate and the back plate, each of the load leg communicating with one of the tooling support plate and the back plate in torsionally decoupled relation, each of the plurality of load legs comprising a plug body having a semi-spherical head configured to mate with a complementary semi-spherical pocket provided in one of the tooling support plate and the back plate.

7. The thermoforming platen of claim 6, wherein each of the plurality of load legs has at least one degree of freedom between the load leg and one of the tooling support plate and the back plate.

8. The thermoforming platen of claim 6, further comprising an array of drive attachment points affixed to the outer periphery of the back plate, the plurality of drive attachment points each having a center of effort above a torsionally decoupled interface of the load leg with the back plate.

9. The thermoforming platen of claim 6, wherein the tooling support plate is a top plate having a top tooling surface, a bottom surface, and an outer periphery, and the bottom plate has a top surface, a bottom surface and an outer periphery, and the plurality of load legs extend between the bottom surface of the top plate and the top surface of the bottom plate.

10. The thermoforming platen of claim 9, wherein a plurality of drive attachment points is provided about an outer periphery of the bottom plate, and the plurality of discrete load legs interconnect the top plate bottom surface with the bottom plate top surface to distribute and centralize load deformation of the top plate from tooling loads.

11. A thermoforming platen, comprising:
 a tooling support plate having a top tooling surface, a bottom surface, and an outer periphery;
 a back plate carried in space apart relation from the tooling support plate and having at least one drive arm mount; and
 a plurality of load legs provided about the bottom surface repositionable between one of a plurality of locations between the tooling support plate and the back plate, each of the plurality of load legs communicating with one of the tooling support plate and the back plate in torsionally decoupled relation, the plurality of the load legs are arranged substantially equally spaced apart between the tooling support plate and the back plate.

12. The thermoforming platen of claim 6, wherein each of the plurality of load legs comprises one of a semi-spherical bearing portion and a roller bearing portion interposed in respective complementary recesses within the bottom surface of the tooling support plate.

13. A thermoforming platen, comprising:
 a tooling support plate having a top surface and a bottom surface;
 a back plate carried in spaced apart relation from the tooling support plate and having at least one drive mount; and
 a plurality of load legs each comprising a spherical headed bearing configured to mate with a complementary semi-spherical recess in the back plate provided in spaced apart relation between the tooling support plate and the back plate inboard of an outer periphery of the tooling support plate and the back plate, each of the plurality of load legs communicating with one of the tooling support plate and the back plate in torsionally decoupled relation to mitigate transmission of torsion loads from the back plate to the tooling support plate under a load condition.

14. The thermoforming platen of claim 13, wherein the plurality of load legs comprises a spherical interface portion configured to mate with a complementary semi-spherical recess in one of the tooling support plate and the back plate to impart torsionally decoupled axial load path transmission between the back plate and the tooling support plate.

15. The thermoforming platen of claim 13, wherein each of the plurality of load legs has at least 2 degrees of freedom with one of the tooling support plate and the back plate.

16. The thermoforming platen of claim 13, wherein the spherical headed bearing is a hardened steel cylindrical post having a semi-spherical head configured to move in at least two degrees of freedom under load with the semi-spherical recess of the back plate.

17. The thermoforming platen of claim 14, wherein four load legs are provided inboard of an outer periphery of the tooling support plate and the back plate about a central surface location of the tooling support plate and the back plate in equally-spaced apart relation from the center surface location.

18. The thermoforming platen of claim 1, wherein individual pairs of the plurality of load legs are equally spaced apart from a center position of the tooling support plate and the back plate.

19. The thermoforming platen of claim 18, wherein two pairs of the plurality of load legs form a rectangular arrangement of load legs.

20. The thermoforming platen of claim 11, wherein individual pairs of the load legs are equally spaced apart from a center position of the plurality of tooling support plate and the back plate.

21. The thermoforming platen of claim 20, wherein two pairs of the plurality of load legs form a rectangular arrangement of load legs.

* * * * *